United States Patent
Thimbleby

(10) Patent No.: US 11,481,538 B2
(45) Date of Patent: Oct. 25, 2022

(54) DEVICE, METHOD, AND GRAPHICAL USER INTERFACE FOR PROVIDING HANDWRITING SUPPORT IN DOCUMENT EDITING

(71) Applicant: Apple Inc., Cupertino, CA (US)

(72) Inventor: William J. Thimbleby, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 90 days.

(21) Appl. No.: 17/161,578

(22) Filed: Jan. 28, 2021

(65) Prior Publication Data

US 2021/0150121 A1  May 20, 2021

Related U.S. Application Data

(63) Continuation of application No. 16/445,143, filed on Jun. 18, 2019, now abandoned, which is a
(Continued)

(51) Int. Cl.
*G06F 3/0484* (2022.01)
*G06F 40/106* (2020.01)
(Continued)

(52) U.S. Cl.
CPC .......... *G06F 40/106* (2020.01); *G06F 1/1694* (2013.01); *G06F 3/0486* (2013.01);
(Continued)

(58) Field of Classification Search
CPC .. G06F 40/106; G06F 1/1694; G06F 3/04842; G06F 3/04845; G06F 3/0486;
(Continued)

(56) References Cited

U.S. PATENT DOCUMENTS

| 5,528,743 A | 6/1996 | Tou et al. |
| 5,596,350 A | 1/1997 | Capps et al. |

(Continued)

FOREIGN PATENT DOCUMENTS

| CN | 103106024 A | 5/2013 |
| CN | 103699325 A | 4/2014 |

(Continued)

OTHER PUBLICATIONS

Serrells, "Black Friday 2018 Walmart deals: PS4 and Xbox One for $200, $99 Google Home Hub and more", https://www.cnet.com/news/black-Friday-2018-walmart-deals-playstations-4-and-xbox-one-for-200--99-google-home-hub-bose-headphones-9, Nov. 13, 2018, 10 pages.

(Continued)

*Primary Examiner* — Hassan Mrabi
(74) *Attorney, Agent, or Firm* — Morgan, Lewis & Bockius LLP

(57) ABSTRACT

An electronic device, when in a first tilted state, displays a content page in a sketch mode, which includes displaying a zoomed view of a portion of the content page, and configuring the zoomed view of the portion of the content page to accept user inputs modifying content in the first portion of the content page. While displaying the content page in the sketch mode, the device detects that it is tilted from the first tilted state to a distinct second tilted state, and in response, displays the content page in an overview mode, which includes zooming out to display an overview of the content page. Optionally, displaying the content page in the overview mode includes displaying an input position indicator over the overview of the content page to indicate the portion of the content page previously displayed in the zoomed view.

18 Claims, 68 Drawing Sheets

Related U.S. Application Data continuation of application No. 14/975,556, filed on Dec. 18, 2015, now Pat. No. 10,346,510.

(60) Provisional application No. 62/234,604, filed on Sep. 29, 2015.

(51) Int. Cl.

| | |
|---|---|
| *G06F 3/04883* | (2022.01) |
| *G06F 3/0486* | (2013.01) |
| *G06F 3/04842* | (2022.01) |
| *G06F 3/04845* | (2022.01) |
| *G06F 1/16* | (2006.01) |
| *G06F 40/171* | (2020.01) |
| *G06V 30/32* | (2022.01) |
| *G06V 30/413* | (2022.01) |
| *G06V 30/142* | (2022.01) |

(52) U.S. Cl.
CPC ...... *G06F 3/04842* (2013.01); *G06F 3/04845* (2013.01); *G06F 3/04883* (2013.01); *G06F 40/171* (2020.01); *G06V 30/1423* (2022.01); *G06V 30/32* (2022.01); *G06V 30/413* (2022.01); *G06F 2200/1637* (2013.01); *G06F 2203/04806* (2013.01)

(58) Field of Classification Search
CPC ............... G06F 3/04883; G06F 40/171; G06F 2200/1637; G06F 2203/04806; G06V 30/1423; G06V 30/32; G06V 30/413
See application file for complete search history.

(56) References Cited

U.S. PATENT DOCUMENTS

| | | | |
|---|---|---|---|
| 5,698,822 | A | 12/1997 | Haneda et al. |
| 5,796,866 | A | 8/1998 | Sakurai et al. |
| 6,021,218 | A | 2/2000 | Capps et al. |
| 6,466,954 | B1 | 10/2002 | Kurosawa et al. |
| 7,774,722 | B2 | 8/2010 | Hoyer et al. |
| 8,020,093 | B2 | 9/2011 | Yalovsky |
| 9,013,428 | B2 | 4/2015 | Asano |
| 9,201,855 | B2 | 12/2015 | Yalovsky |
| 10,346,510 | B2* | 7/2019 | Thimbleby ............ G06V 30/32 |
| 2002/0059350 | A1 | 5/2002 | Iwema et al. |
| 2002/0064308 | A1 | 5/2002 | Altman et al. |
| 2002/0149630 | A1 | 10/2002 | Kitainik et al. |
| 2003/0038788 | A1 | 2/2003 | Demartines et al. |
| 2003/0214540 | A1 | 11/2003 | Huapaya et al. |
| 2004/0032415 | A1 | 2/2004 | Rimas et al. |
| 2004/0070573 | A1 | 4/2004 | Graham |
| 2005/0149856 | A1 | 7/2005 | Rimas et al. |
| 2005/0168451 | A1 | 8/2005 | Dodge et al. |
| 2007/0109281 | A1 | 5/2007 | Simmons et al. |
| 2009/0161958 | A1 | 6/2009 | Markiewicz et al. |
| 2012/0154294 | A1 | 6/2012 | Hinckley et al. |
| 2014/0184610 | A1 | 7/2014 | Shibata et al. |
| 2015/0199036 | A1 | 7/2015 | Akitomo et al. |
| 2016/0140387 | A1 | 5/2016 | Sugiura |
| 2016/0179764 | A1 | 6/2016 | Kelso et al. |
| 2016/0210037 | A1 | 6/2016 | Zhang et al. |
| 2017/0091153 | A1* | 3/2017 | Thimbleby ............ G06F 3/0486 |
| 2017/0153806 | A1 | 6/2017 | Rucine et al. |
| 2019/0303423 | A1* | 10/2019 | Thimbleby ......... G06F 3/04842 |
| 2021/0150121 | A1* | 5/2021 | Thimbleby ......... G06F 3/04845 |

FOREIGN PATENT DOCUMENTS

| | | |
|---|---|---|
| CN | 104615367 A | 5/2015 |
| DE | 103 61 511 A1 | 7/2005 |
| JP | 2013-246633 | 12/2013 |
| WO | WO 2005/064423 A2 | 7/2005 |
| WO | WO 2014/174219 A1 | 10/2014 |

OTHER PUBLICATIONS

Eslambolchilar, "Tilt-Based Automatic Zooming and Scaling in Mobile Devices—a State-Space Implementation", Hamilton Institute, NUI, Maynooth, Co. Kildare, Ireland, Jan. 1, 2004, 12 pages.
YouTube, MyScript Stylus (Beta), https://youtube.be/RpkrcEHmcPA, Sep. 25, 2013, 2 pages.
Office Action, dated Jul. 24, 2017, received in U.S. Appl. No. 14/975,556, 18 pages.
Notice of Allowance, dated Mar. 16, 2018, received in U.S. Appl. No. 14/975,556, 9 pages.
Office Action, dated Aug. 10, 2018, received in U.S. Appl. No. 14/975,556, 24 pages.
Notice of Allowance, dated Jan. 4, 2019, received in U.S. Appl. No. 14/975,556, 9 pages.
Notice of Allowance, dated Apr. 17, 2019, received in U.S. Appl. No. 14/975,556, 8 pages.
Office Action, dated Jul. 22, 2020, received in Chinese Patent Application No. 201680045215.2, which corresponds with U.S. Appl. No. 14/975,556, 16 pages.
Office Action, dated May 16, 2019, received in European Patent Application No. 16744986.7, which corresponds with U.S. Appl. No. 14/975,556, 7 pages.
Notice of Allowance, dated Aug. 5, 2019, received in Japanese Patent Application No. 2018-506549, which corresponds with U.S. Appl. No. 14/975,556, 5 pages.
Patent, dated Sep. 13, 2019, received in Japanese Patent Application No. 2018-506549, which corresponds with U.S. Appl. No. 14/975,556, 2 pages.
Office Action, dated May 6, 2020, received in U.S. Appl. No. 16/445,143, 27 pages.
Final Office Action, dated Sep. 28, 2020, received in U.S. Appl. No. 16/445,143, 30 pages.
International Search Report and Written Opinion, dated Jan. 17, 2017, received in International Patent Application No. PCT/US2016/041590, which corresponds with U.S. Appl. No. 14/975,556, 23 pages.
International Preliminary Report on Patentability, dated Apr. 3, 2018 received in International Patent Application No. PCT/US2016/041590, which corresponds with U.S. Appl. No. 14/975,556, 16 pages.
Office Action, dated Jan. 22, 2021, received in Chinese Patent Application No. 201680045215.2, which corresponds with U.S. Appl. No. 14/975,556, 9 pages.
Office Action, dated Oct. 2, 2020, received in Japanese Patent Application No. 2019-160628, which corresponds with U.S. Appl. No. 16/445,143, 7 pages.
Notice of Allowance, dated Apr. 26, 2021, received in Japanese Patent Application No. 2019-160628, which corresponds with U.S. Appl. No. 16/445,143, 1 page.
Patent, dated May 14, 2021, received in Japanese Patent Application No. 2019-160628, which corresponds with U.S. Appl. No. 16/445,143, 2 pages.
Extended European Search Report, dated May 11, 2021, received in European Patent Application No. 21154704.7, which corresponds with U.S. Appl. No. 14/975,556, 25 pages.

* cited by examiner

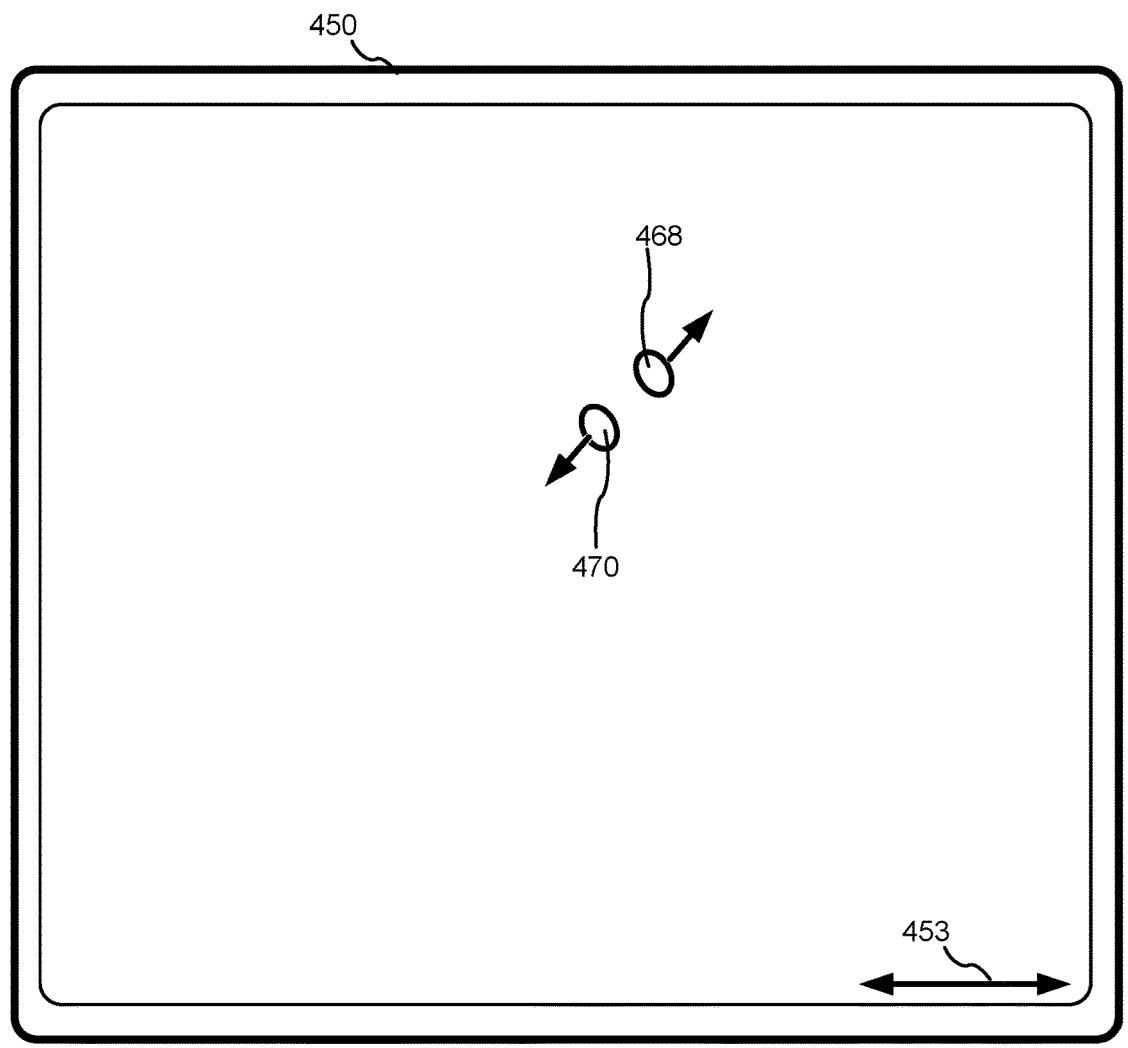
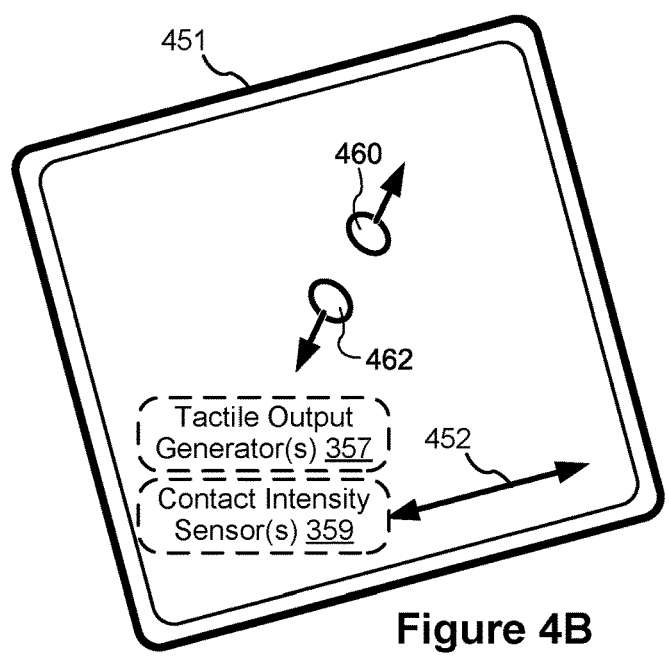
Figure 4B

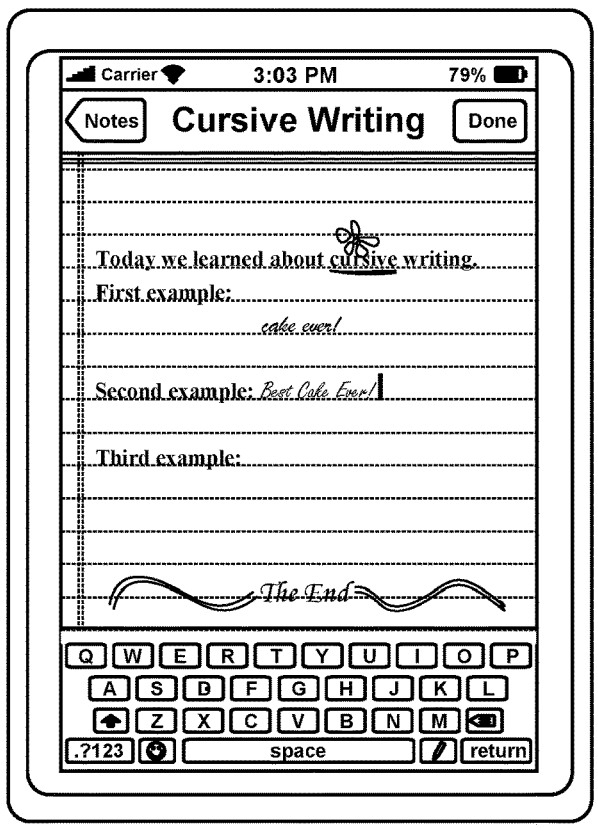
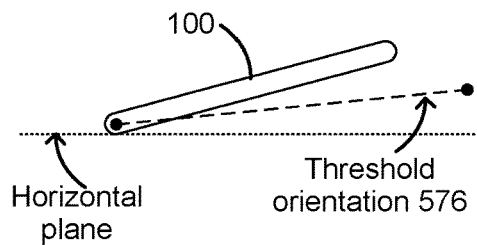
Overview Mode in Figure 5AF
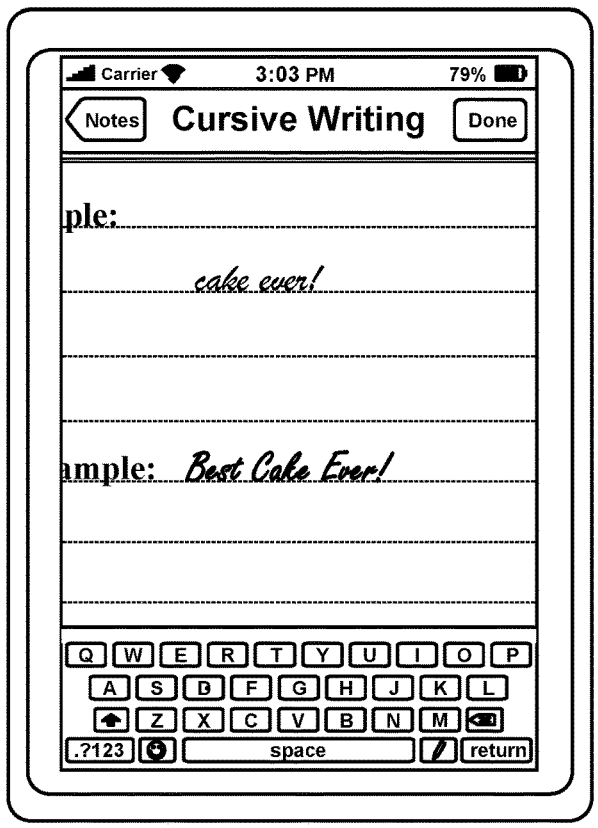
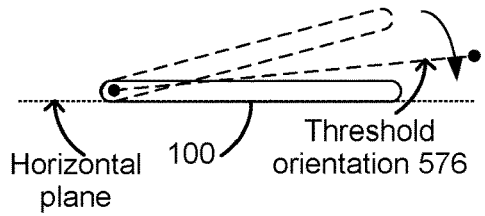
Sketch Mode in Figure 5AG
Figure 5AP

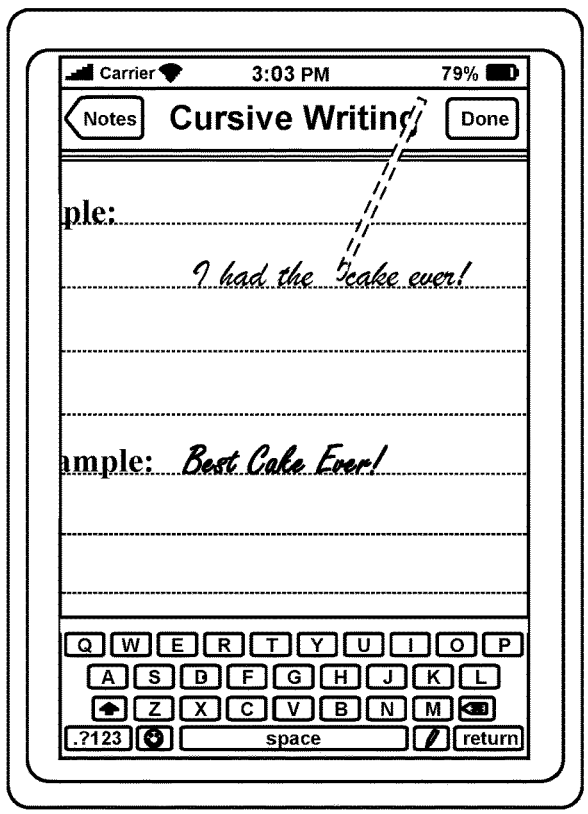
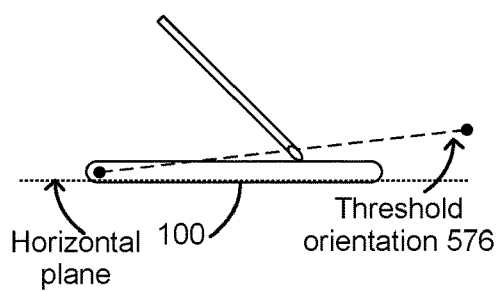
Sketch Mode in Figure 5AH
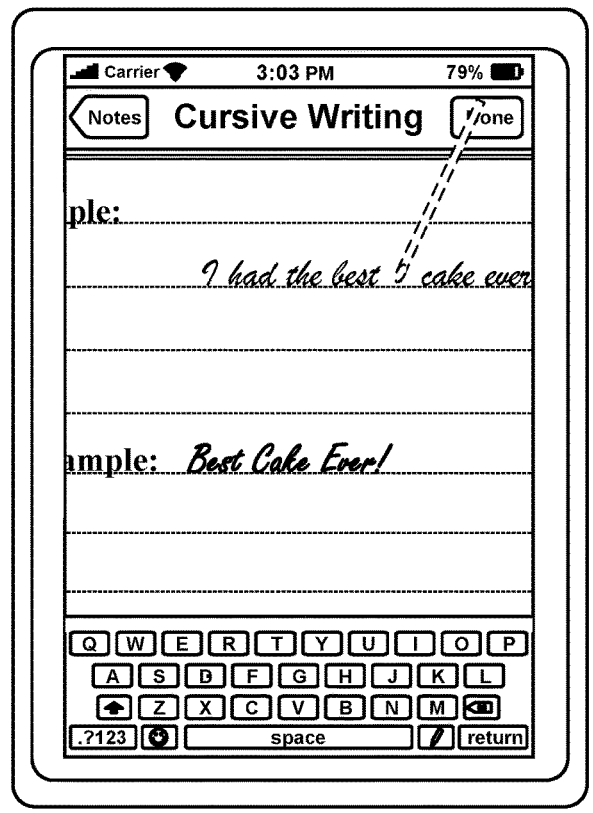
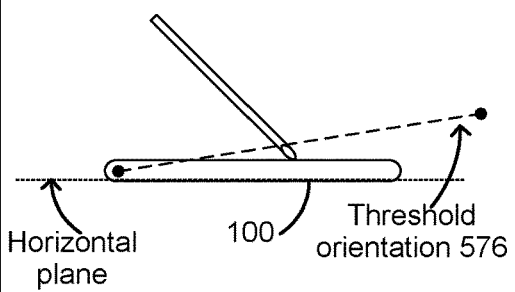
Sketch Mode in Figure 5AI
Figure 5AQ

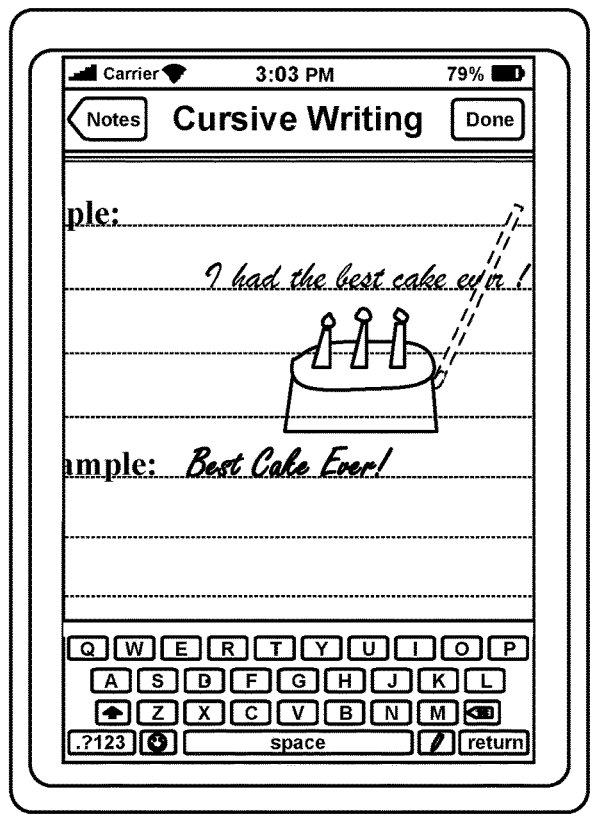
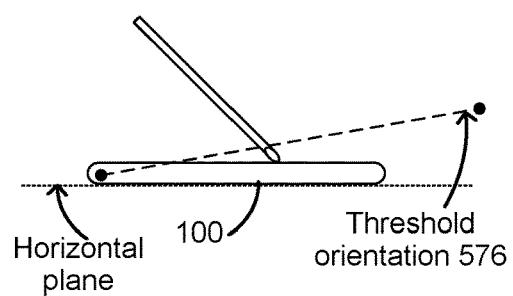
Sketch Mode in Figure 5AJ
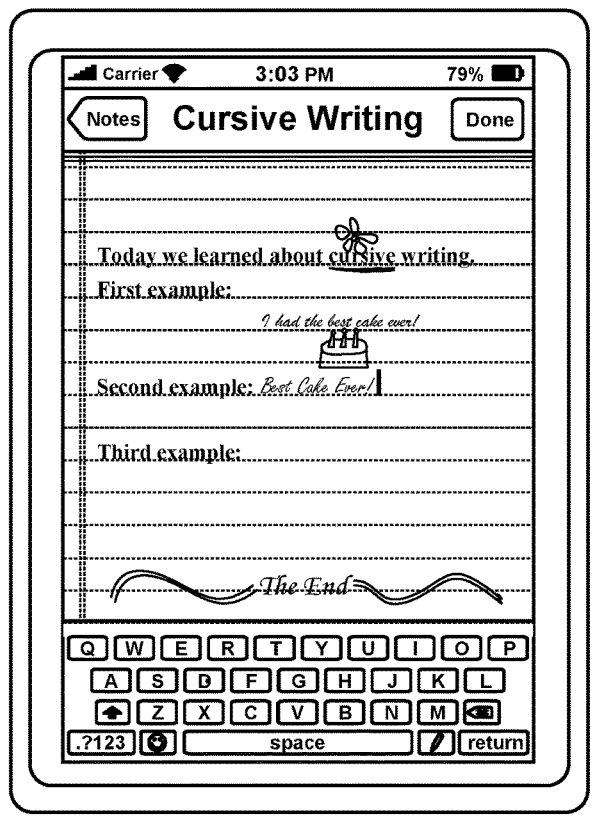
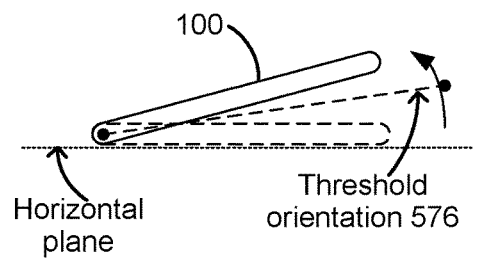
Overview Mode in Figure 5AK
Figure 5AR

600

610

Ⓑ

612 After shifting the one or more handwritten word blocks in the writing direction associated with the content presentation area by a respective amount, shift at least one of the one or more handwritten word blocks to a next line below a current line occupied by the one or more handwritten word blocks in the content presentation area 614 After positioning the one or more handwritten word blocks in the content presentation area, receive handwriting input for inserting one or more additional handwritten word blocks in the content presentation area;
In response to receiving the handwriting input, determine whether a third region to be occupied by the one or more additional handwritten word blocks in the content presentation area and the second region currently occupied by the one or more handwritten word blocks satisfy the first layout-update criteria; and
In accordance with a determination that the third region and the second region satisfy the first layout-update criteria, shift the one or more handwritten word blocks in the writing direction associated with the content presentation area to accommodate the one or more additional handwritten word blocks 616 After shifting the one or more handwritten word blocks in the writing direction associated with the content presentation area by a respective amount, shift at least one of the one or more handwritten word blocks to a next line below a current line occupied by the one or more handwritten word blocks in the content presentation area 618 Group the one or more additional handwritten word blocks and the one or more handwritten word blocks into a group that is manipulated as a unit

620 The content presentation area includes existing typed text prior to receiving the plurality of handwritten strokes.
　　Positioning the one or more handwritten word blocks in the content presentation area in accordance with the first predetermined layout criterion includes:
　　　　determining that the second region to be occupied by the one or more handwritten word blocks in the content presentation area and a fourth region currently occupied by the existing typed text in content presentation area satisfy the first layout-update criteria; and
　　　　in accordance with the determination that the second region and the fourth region satisfy the first layout-update criteria:
　　　　　　shifting the typed text in the writing direction associated with the content presentation area to accommodate the one or more handwritten word blocks; and
　　　　　　inserting the one or more word blocks in front of the existing typed text in the content presentation area 622 After shifting the existing typed text in the writing direction associated with the content presentation area by a respective amount, shift at least some of the existing typed text to a next line below a current line occupied by the existing typed text in the content presentation area 624 After positioning the sketch content object in the content presentation area, receive typed input for inserting one or more typed characters in the content presentation area;
In response to receiving the typed input, determine whether a fourth region to be occupied by the one or more typed characters in the content presentation area and a fifth region currently occupied by the sketch content object satisfy second layout-update criteria; and
In accordance with the determination that the fourth region and the fifth region satisfy the second layout-update criteria, arrange the one or more typed characters and the sketch content object in the content presentation area in accordance with the predetermined second layout criteria (D)

626 After positioning the sketch content object in the content presentation area, receive handwriting input for inserting one or more additional handwritten word blocks in the content presentation area;
In response to receiving the handwriting input, determine whether a sixth region to be occupied by the one or more additional handwritten word blocks in the content presentation area and the fifth region currently occupied by the sketch content object satisfy the second layout-update criteria; and
In accordance with the determination that the sixth region and the fifth region satisfy the second layout-update criteria, arrange the one or more additional handwritten word blocks and the sketch content object in the content presentation area in accordance with the predetermined second layout criteria 628 The content presentation area includes existing typed text prior to receiving the plurality of handwritten strokes, and positioning the sketch content object in the content presentation area in accordance with the second predetermined layout criterion includes overlaying at least a portion of the sketch content object on the existing typed text in the content presentation area 630 Group the sketch content object and at least the portion of the existing typed text into a group that is manipulated as a unit 632 Positioning the one or more handwritten word blocks in the content presentation area includes positioning the one or more handwritten word blocks in a respective line in the content presentation area.
Detect selection of at least one of the one or more handwritten word blocks;
While the at least one of the one or more handwritten word blocks is selected, receive a drag input directed to the selected at least one of the one or more handwritten word blocks;
In accordance with a determination that the drag input meets content-reflow criteria, where the content-reflow criteria includes a criterion that is met when the drag input includes a movement of a focus selector along the respective line currently occupied by the one or more handwritten word blocks in the content presentation area, shift the one or more handwritten word blocks along the respective line in accordance with the drag input (E)

634 The one or more handwritten word blocks are shifted in the writing direction in accordance with the drag input.
After shifting the one or more handwritten word blocks along the respective line in the writing direction associated with the content presentation area by a respective amount, shift at least one of the one or more handwritten word blocks to a next line below the respective line in the content presentation area 636 Maintain space previously occupied by the one or more handwritten word blocks in the respective line as white space during the shifting of the one or more handwritten word blocks 638 The one or more handwritten word blocks are shifted in the reverse writing direction along the respective line.
After shifting the one or more handwritten word blocks along the respective line in the reverse writing direction associated with the content presentation area by a respective amount, shift at least one of the one or more handwritten word blocks to a previous line above the respective line in the content presentation area 640 Shift content positioned after the one or more handwritten word blocks in the reverse writing direction into space previously occupied by the one or more handwritten word blocks in the respective line during the shifting of the one or more handwritten word blocks 642 In accordance with a determination that the drag input meets content-move criteria, the content-move criteria includes a criterion that is met when the drag input includes a movement of a focus selector from the respective line currently occupied by the one or more handwritten word blocks to a location outside of the respective line, move the selected at least one of the one or more handwritten word blocks from a first location to a second location in the content presentation area in accordance with the drag input (F)

644 Moving the selected at least one of the one or more handwritten word blocks includes:
moving the selected at least one of the one or more handwritten word blocks to a location after first existing typed text in the content presentation area; and
shifting content between the selected at least one of the one or more handwritten word blocks and the first existing typed text in the reverse writing direction in the content presentation area to fill in the space created by the movement of the selected at least one of the one or more handwritten word blocks 646 Moving the selected at least one of the one or more handwritten word blocks includes:
moving the selected at least one of the one or more handwritten word blocks to a location in front of second existing typed text; and
shifting the second existing typed text in the writing direction in the content presentation area to create space to accommodate the selected at least one of the one or more handwritten word blocks 648 Determining whether the plurality of handwritten strokes is a textual input or a sketch in accordance with predetermined criteria for distinguishing between handwritten textual inputs and sketch inputs includes determining that the plurality of handwritten strokes is a textual input when the plurality of handwritten strokes fit within a single line height represented in the content input area (G)

650 Generating one or more handwritten word blocks based on the plurality of handwritten strokes includes generating one or more handwritten word blocks based on temporal and spatial relationships between the plurality of handwritten strokes 652 Determining whether the plurality of handwritten strokes is a textual input or a sketch is not based on handwriting recognition 654 Generating one or more handwritten word blocks based on the plurality of handwritten strokes is not based on handwriting recognition

702 Concurrently display, a handwriting input area separate from a content page, and an input position indicator overlaid on the content page. The input position indicator encloses an area of the content page that is shown in the handwriting input area

↓

704 Receive one or more inputs that cause scrolling of content in the handwriting input area in a first direction

↓

706 In response to detecting that the scrolling of the content in the handwriting input area in the first direction meets a predetermined threshold condition, move the input position indicator to a first new position over the content page that is displaced from a previous position of the input position indicator in a second direction distinct from the first direction

---

708 The first direction is a direction along a predetermined writing direction associated with the content page, and the second direction is a direction perpendicular to the predetermined writing direction associated with the content page

---

710 Receiving the one or more inputs that cause the scrolling of the content in the handwriting input area in the first direction further comprises receiving a plurality of handwritten strokes in the handwriting input area. The handwritten strokes fill the handwriting input area in a direction opposite the first direction and cause the scrolling of the content in the handwriting input area in the first direction

712 In response to receiving the plurality of handwritten strokes in the handwriting input area:
    display one or more handwritten word blocks generated in accordance with the plurality of handwritten strokes in the content page; and
    move the input position indicator on the content page in a direction opposite the first direction in accordance with the scrolling of the handwriting input area, before moving the input position indicator to the first new position that is displaced from the previous position in the second direction (A)

714 Receiving the one or more inputs that cause the scrolling of the content in the handwriting input area in the first direction further comprises: receiving one or more inputs that drag the area of the content page that is shown in the handwriting input area in the first direction 716 Receiving the one or more inputs that drag the area of the content page that is shown in the handwriting input area in the first direction includes detecting movement of a focus selector in a reverse writing direction. The movement passes a scroll boundary indicator presented in the handwriting input area 718 The predetermined threshold condition includes a condition that is met when the one or more inputs cause the input position indicator to reach within a threshold distance from an edge of the content page in the first direction 720 The first new position is at the beginning of a new line on the content page 722 Present a representation of the edge of the content page and a scroll boundary indicator in the handwriting input area before moving the input position indicator to the first new position that is displaced from the previous position in the second direction 724 The first direction is the horizontal direction associated with the content page and the second direction is the vertical direction associated with the content page 726 The first direction is from right to left and the second direction is from top to bottom of the content page 728 The first direction is from left to right and the second direction is from bottom to top of the content page

802 Receive a plurality of handwritten strokes in an input area

---

804 In response to receiving the plurality of handwritten strokes: generate one or more handwritten word blocks; and position the one or more handwritten word blocks in a content presentation area along a writing direction associated with the content presentation area

---

806 Receive a first drag input that drags a first handwritten word block of the one or more handwritten word blocks horizontally in the writing direction

---

808 In response to the first drag input, insert an amount of white space in front of the first handwritten word block along the writing direction in accordance with a distance that the first handwritten word block is dragged in the writing direction

---

810 When the first drag input is received, the content presentation area includes one or more content objects positioned after the first handwritten word block along the writing direction.

In response to the first drag input, reposition the one or more content objects located after the first handwritten word block in the content presentation area, such that a sequential order of the first handwritten word block and the one or more content objects located after the first handwritten word block is preserved during the dragging of the first handwritten word block and the repositioning of the one or more content objects in the content presentation area

812 The one or more content objects located after the first handwritten word block includes one or more of: a handwritten word block and a typed character

814 Repositioning of the one or more content objects located after the first handwritten word block in the content presentation area includes reflowing the one or more content objects in the content presentation area such that at least one of the one or more content object is repositioned into a new line below a respective line currently occupied by the first handwritten word block (A)

816 After inserting an amount of white space in front of the first handwritten word block along the writing direction in accordance with a distance that the first handwritten word block is dragged in the writing direction:
   detect a second drag input that drags the first handwritten word block horizontally in a reverse writing direction associated with the content presentation area; and
   in response to the second drag input, shift the first handwritten word block along the reverse writing direction in accordance with a distance that the first handwritten word block is dragged along the reverse writing direction by the second drag input

818 Receive typed input inserting one or more typed characters at a position before the first handwritten word block in the writing direction; and
In response to receiving the typed input, reflow the first handwritten word and one or more content objects located after the first handwritten word block in the writing direction in the content presentation area to accommodate the one or more typed characters

820 Receive a third drag input that drags the one or more typed characters horizontally in the writing direction in the content presentation area; and
In response to the third drag input, insert an amount of white space in front of the one or more typed characters along the writing direction in accordance with a distance that the one or more typed characters are dragged in the writing direction

822 In response to the third drag input, reposition the first handwritten word located after the one or more typed characters in the content presentation area, such that a sequential order of the one or more typed characters and first handwritten word block located after the one or more typed characters is preserved during the dragging of the one or more typed characters and the repositioning of the first handwritten word block in the content presentation area (B)

902 While the device is in a first titled state, display a content page in a sketch mode, the displaying comprising:
    displaying a zoomed view of a first portion of the content page, and
    configuring the zoomed view of the first portion of the content page to accept user inputs modifying content in the portion of the content page

904 While displaying the content page in the sketch mode, detect that the device is tilted from the first tilted state to a second titled state distinct from the first titled state

906 In response to detecting that the device is titled from the first tilted state to the second tilted state, display the content page in an overview mode, the displaying comprising: zooming out to display an overview of the content page

908 Displaying the content page in the overview mode includes displaying an input position indicator over the overview of the content page to indicate the first portion of the content page previously displayed in the zoomed view

910 While displaying the content page in the overview mode:
    detect a user input moving the input position indicator to a second portion of the content page that is different from the first portion of the content page; and while the input position indicator is located at the second portion of the content page, detect that the device is tilted from the second tilted state to a third tilted state;
    In response to detecting that the device is tilted from the second tilted state to the third tilted state, displaying the content page in the sketch mode, the displaying comprising: displaying a zoomed view of the second portion of the content page; and configuring the zoomed view of the second portion of the content page to accept user inputs modifying content in the second portion of the content page

912 The first tilted state and the third titled state are on the same side of the second tilted state (A)

914 The second tilted state and the third tilted state are on different sides of the first tilted state 916 Prior to displaying the content page in the sketch mode while the device is in the first tilted state:
    display the content page in the overview mode; and
    while displaying the content page in the overview mode, detect a reverse pinch gesture directed to the first portion of the content page; and
    enter the sketch mode in response to detecting the reverse pinch gesture directed to the first portion of the content page 918 After entering the sketch mode in response to detecting the reverse pinch gesture directed to the first portion of the content page:
    while displaying the content page in the sketch mode, detect a pinch gesture directed to the first portion of the content page; and
    enter the overview mode in response to detecting the pinch gesture directed to the first portion of the content page 920 Determine a threshold orientation for switching between the overview mode and the sketch mode based on an orientation of the device at a time when the reverse pinch gesture is detected

Figure 9B

DEVICE, METHOD, AND GRAPHICAL USER INTERFACE FOR PROVIDING HANDWRITING SUPPORT IN DOCUMENT EDITING

RELATED APPLICATION

This application is a continuation of U.S. patent application Ser. No. 16/445,143, filed Jun. 18, 2019, which is a continuation of U.S. patent application Ser. No. 14/975,556, filed Dec. 18, 2015, now U.S. Pat. No. 10,346,510, which claims priority to U.S. Provisional Patent Application Ser. No. 62/234,604, filed Sep. 29, 2015, each of which is incorporated by reference herein in its entirety.

TECHNICAL FIELD

This disclosure relates generally to electronic devices with touch-sensitive surfaces, including but not limited to electronic devices with touch-sensitive surfaces that provide handwriting support in document editing.

BACKGROUND

Computer-programs that provide handwriting and sketching capabilities in a document editing environment (e.g., a notes application) have wide applicability in both industrial and personal use settings. Some applications provide sketching capabilities that allow a user to draw lines and objects based on free-hand movement of a contact (e.g., a contact made by a finger or stylus) on a touch-sensitive surface (e.g., a trackpad or touch-screen display). Some applications provide handwriting input capabilities that recognize and transform handwritten strokes into typed characters in a document. Providing sketching and handwriting capabilities along with keyboard-based document editing capabilities in a computer program will improve the functionality of the computer program. It is challenging to provide an integrated document editing environment that supports sketching, handwriting, and keyboard inputs in a way that are functional, efficient, and ease to use.

SUMMARY

Accordingly, the present disclosure provides electronic devices with faster, more efficient methods and interfaces for providing handwriting support in a document editing environment (e.g., in a notes application). Such methods and interfaces optionally complement or replace conventional methods for providing handwriting support in a document editing environment. Such methods and interfaces reduce the burden on a user and produce a more efficient human-machine interface. Further, such methods reduce the processing power consumed to process user inputs, conserve power, reduce unnecessary/extraneous/repetitive inputs, and potentially reduce memory usage. For battery-operated devices, such methods and interfaces conserve battery power and increase the time between battery charges.

In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include note-taking, image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors. Alternatively, or in addition, executable instructions for performing these functions are, optionally, included in a transitory computer-readable storage medium or other computer program product configured for execution by one or more processors.

In accordance with some embodiments, a method is performed at a device with one or more processors, memory, a touch-sensitive surface, and a display. The method includes: receiving a plurality of handwritten strokes in an input area; in response to receiving the plurality of handwritten strokes, determining whether the plurality of handwritten strokes is a textual input or a sketch in accordance with predetermined criteria for distinguishing between handwritten textual inputs and sketch inputs; in accordance with a determination that the plurality of handwritten strokes is a textual input: generating one or more handwritten word blocks based on the plurality of handwritten strokes; and positioning the one or more handwritten word blocks in a content presentation area in accordance with first predetermined layout criteria; and in accordance with a determination that the plurality of handwritten strokes is a sketch: generating a sketch content object based on the plurality of handwritten strokes; and positioning the sketch content object in the content presentation area in accordance with second predetermined layout criteria that is distinct from the first predetermined layout criteria.

In accordance with some embodiments, an electronic device includes a display unit; a touch-sensitive surface unit, and a processing unit coupled with the display unit and the touch-sensitive surface unit. The processing unit is configured to: receive a plurality of handwritten strokes in an input area; in response to receiving the plurality of handwritten strokes, determine whether the plurality of handwritten strokes is a textual input or a sketch in accordance with predetermined criteria for distinguishing between handwritten textual inputs and sketch inputs; in accordance with a determination that the plurality of handwritten strokes is a textual input: generate one or more handwritten word blocks based on the plurality of handwritten strokes; and position the one or more handwritten word blocks in a content presentation area in accordance with first predetermined layout criteria; and in accordance with a determination that the plurality of handwritten strokes is a sketch: generate a sketch content object based on the plurality of handwritten strokes; and position the sketch content object in the content presentation area in accordance with second predetermined layout criteria that is distinct from the first predetermined layout criteria.

In accordance with some embodiments, a method is performed at a device with one or more processors, memory, a touch-sensitive surface, and a display. The method includes: concurrently displaying, a handwriting input area separate from the content page, and an input position indicator overlaid on the content page, wherein the input position indicator encloses an area of the content page that is shown in the handwriting input area; receiving one or more inputs that cause scrolling of content in the handwriting input area in a first direction; and, in response to detecting that the scrolling of the content in the handwriting input area in the first direction meets a predetermined threshold condition, moving the input position indicator to a first new position over the content page that is displaced from a previous position of the input position indicator in a second direction distinct from the first direction.

In accordance with some embodiments, an electronic device includes a display unit; a touch-sensitive surface unit, and a processing unit coupled with the display unit and the touch-sensitive surface unit. The processing unit is configured to: concurrently display, a handwriting input area separate from the content page, and an input position indicator overlaid on the content page, wherein the input position indicator encloses an area of the content page that is shown in the handwriting input area; receive the one or more inputs that cause scrolling of content in the handwriting input area in a first direction; and, in response to detecting that the scrolling of the content in the handwriting input area in the first direction meets a predetermined threshold condition, move the input position indicator to a first new position over the content page that is displaced from a previous position of the input position indicator in a second direction distinct from the first direction.

In accordance with some embodiments, a method is performed at a device with one or more processors, memory, a touch-sensitive surface, and a display. The method includes: receiving a plurality of handwritten strokes in an input area; in response to receiving the plurality of handwritten strokes: generating one or more handwritten word blocks based on the plurality of handwritten strokes; and positioning the one or more handwritten word blocks in a content presentation area along a writing direction associated with the content presentation area; receiving a first drag input that drags a first handwritten word block of the one or more handwritten word blocks horizontally in the writing direction; and in response to the first drag input, inserting an amount of white space in front of the first handwritten word block along the writing direction in accordance with a distance that the first handwritten word block is dragged in the writing direction.

In accordance with some embodiments, an electronic device includes a display unit; a touch-sensitive surface unit, and a processing unit coupled with the display unit and the touch-sensitive surface unit. The processing unit is configured to: receive a plurality of handwritten strokes in an input area; in response to receiving the plurality of handwritten strokes: generate one or more handwritten word blocks based on the plurality of handwritten strokes; and position the one or more handwritten word blocks in a content presentation area along a writing direction associated with the content presentation area; receive a first drag input that drags a first handwritten word block of the one or more handwritten word blocks horizontally in the writing direction; and in response to the first drag input, insert an amount of white space in front of the first handwritten word block along the writing direction in accordance with a distance that the first handwritten word block is dragged in the writing direction.

In accordance with some embodiments, a method is performed at a device with one or more processors, memory, a touch-sensitive surface, and a display. The method includes: while the device is in a first titled state, displaying a content page in a sketch mode, comprising: displaying a zoomed view of a first portion of the content page, and configuring the zoomed view of the first portion of the content page to accept user inputs modifying content in the portion of the content page; while displaying the content page in the sketch mode, detecting that the device is tilted from the first tilted state to a second titled state distinct from the first titled state; and in response to detecting that the device is titled from the first tilted state to the second tilted state, displaying the content page in an overview mode, comprising: zooming out to display an overview of the content page.

In accordance with some embodiments, an electronic device includes a display unit; a touch-sensitive surface unit, and a processing unit coupled with the display unit and the touch-sensitive surface unit. The processing unit is configured to: while the device is in a first titled state, display the content page in a sketch mode, the displaying comprising: displaying a zoomed view of a first portion of the content page, and configuring the zoomed view of the first portion of the content page to accept user inputs modifying content in the portion of the content page; while displaying the content page in the sketch mode, detect that the device is tilted from the first tilted state to a second titled state distinct from the first titled state; and in response to detecting that the device is titled from the first tilted state to the second tilted state, display the content page in an overview mode, the displaying comprising: zooming out to display an overview of the content page.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein.

In accordance with some embodiments, a computer readable storage medium (e.g., a non-transitory computer readable storage medium, or alternatively, a transitory computer readable storage medium) has stored therein instructions which when executed by an electronic device with a display, a touch-sensitive surface, and optionally one or more sensors to detect intensity of contacts with the touch-sensitive surface, cause the device to perform or cause performance of the operations of any of the methods described herein.

In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods described above, which are updated in response to inputs, as described in any of the methods described herein.

In accordance with some embodiments, an electronic device includes: a display, a touch-sensitive surface, and optionally one or more sensors to detect intensity of contacts with the touch-sensitive surface; and means for performing or causing performance of the operations of any of the methods described herein.

In accordance with some embodiments, an information processing apparatus, for use in an electronic device with a display and a touch-sensitive surface, and optionally one or more sensors to detect intensity of contacts with the touch-sensitive surface, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for providing and interacting with a drawing aid, thereby increasing the effectiveness, efficiency, and user satisfaction with such devices. Such methods and interfaces may complement or replace conventional methods for providing and interacting with a virtual drawing aid.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5AP-5AR illustrate switching of user interface modes (e.g., a magnified sketch mode and an unmagnified overview mode) based on device rotational states (e.g., on a first side of a threshold device orientation, and on a second side of the threshold device orientation) in accordance with some embodiments.

FIGS. 6A-6G are flow diagrams illustrating a method of displaying handwritten content on a content page in accordance with some embodiments.

FIG. 7A-7B is a flow diagram illustrating a method of displaying handwritten content on a content page in accordance with some embodiments.

FIGS. 8A-8C are flow diagrams illustrating a method of displaying handwritten content on a content page in accordance with some embodiments.

FIGS. 9A-9B are flow diagrams illustrating a method of displaying handwritten content on a content page in accordance with some embodiments.

DESCRIPTION OF EMBODIMENTS

In an application that provides free-hand sketching capabilities, such as a note-taking application, a sketching application, a scrapbooking application, etc., drawing tools are provided to a user to draw lines and objects of various colors and textures. In addition to free-hand sketching, textual input by way of handwriting and keyboard is also a desired function of such an application. The present disclosure describes devices, methods, and user interfaces that provide various support features than enable sketching, textual input by handwriting, and textual input by keyboard in the same document editing environment in an efficient and user friendly manner.

Figure 2:
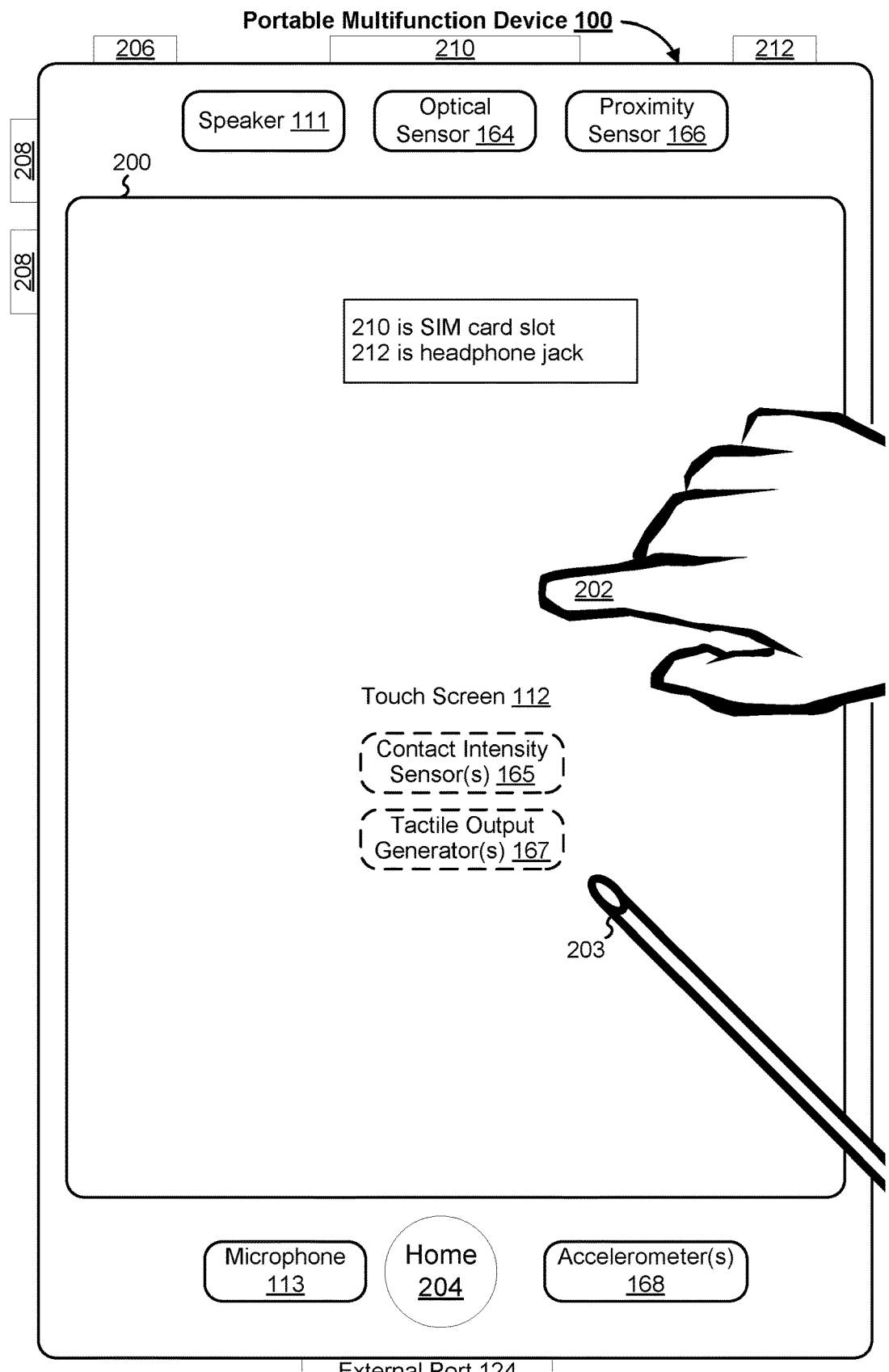
FIG. 2 illustrates a portable multifunction device having a touch screen in accordance with some embodiments.
Figure 3:
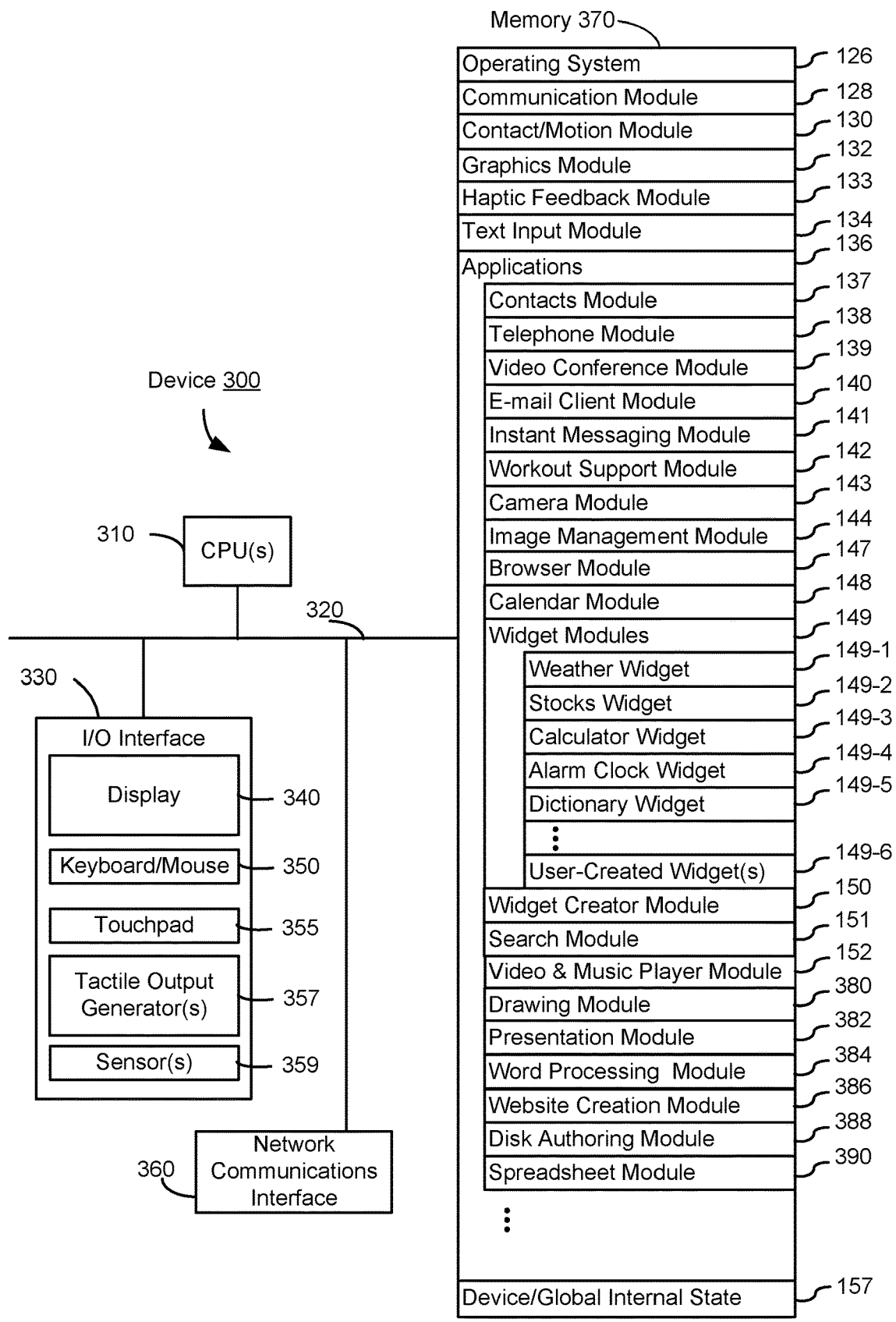
FIG. 3 is a block diagram of an exemplary multifunction device with a display and a touch-sensitive surface in accordance with some embodiments.
Figure 4A:
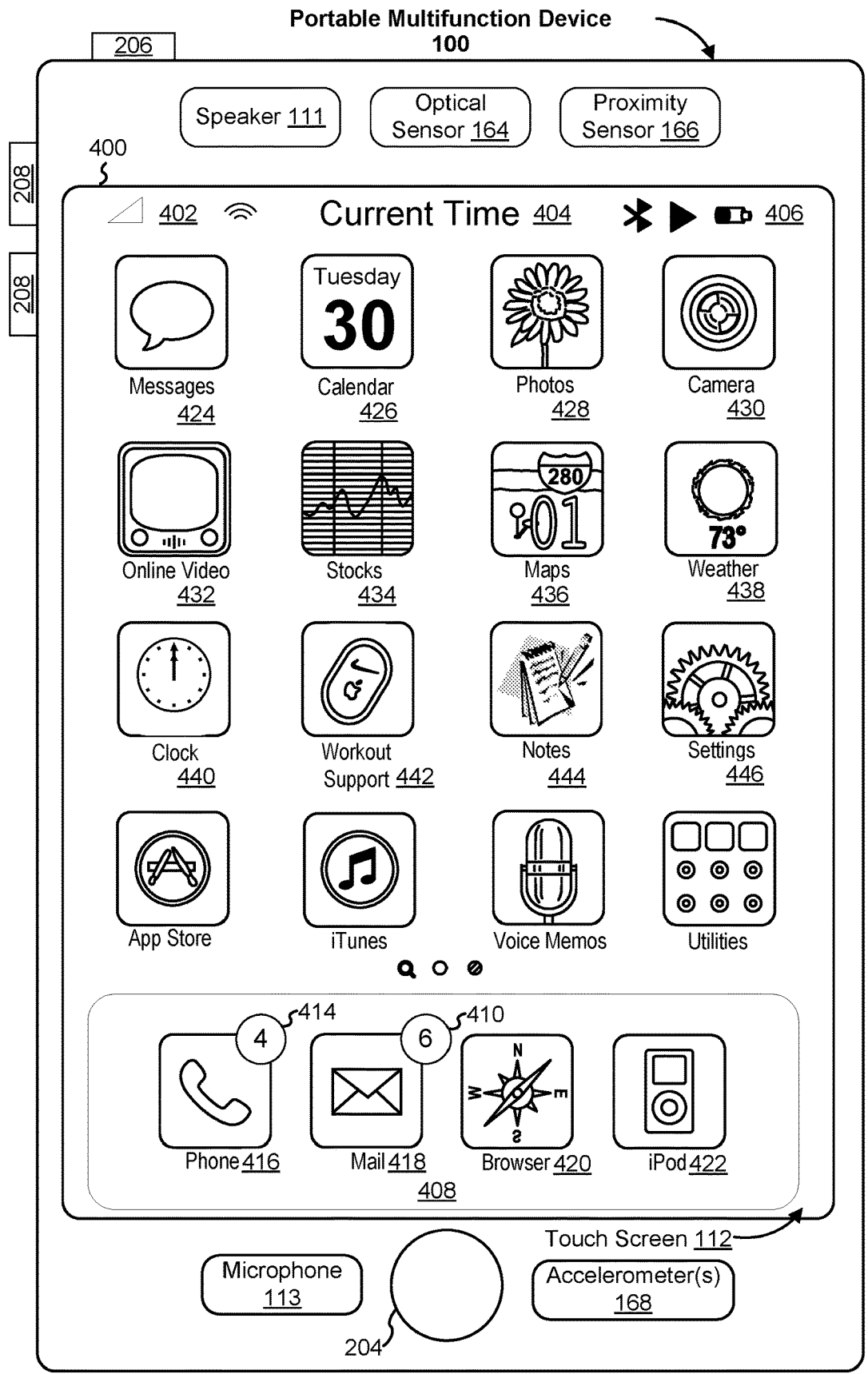
FIG. 4A illustrates an exemplary user interface for a menu of applications on a portable multifunction device in accordance with some embodiments.
Figure 5A:
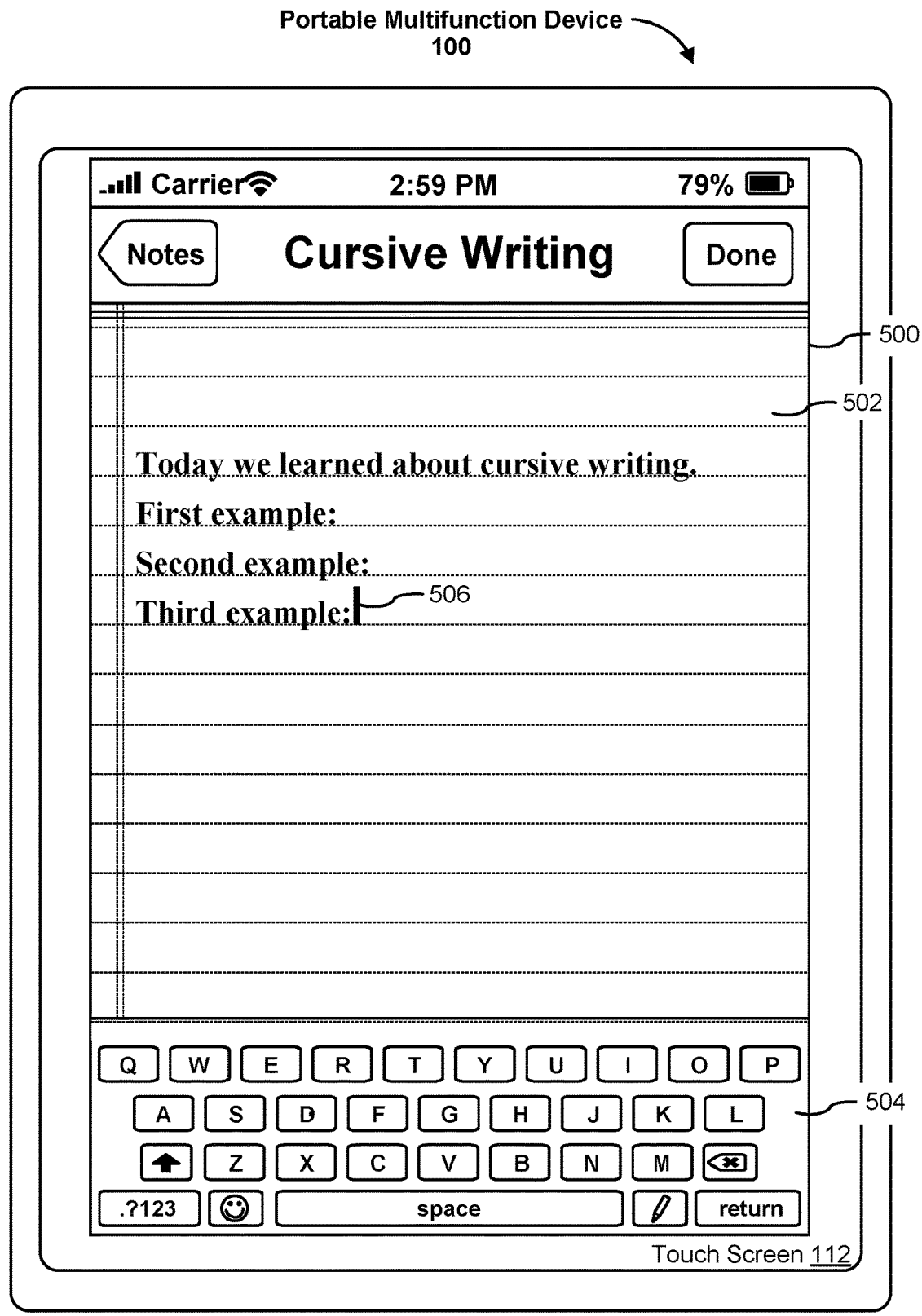
FIGS. 5A-5AO illustrate exemplary user interfaces for providing handwriting support in a document editing environment (e.g., a notes application) in accordance with some embodiments.

Below, FIGS. 1A-1B, 2, and 3 provide a description of exemplary devices. FIGS. 4A-4B and 5A-5AR illustrate exemplary user interfaces and device configurations for providing handwriting support in a document editing environment. FIGS. 6A-6G, 7A7B, 8A-8C, and 9A-9B illustrate flow diagrams of methods of displaying handwritten content in a content page in accordance with various embodiments. The user interfaces in FIGS. 5A-5AR are used to illustrate the processes in FIGS. 6A-6G, 7A-7B, 8A-8C, and 9A-9B. FIGS. 10-13 illustrate exemplary electronic devices that implement the user interfaces in FIGS. 5A-5AR and the processes in FIGS. 6A-6G, 7A-7B, 8A-8C, and 9A-9B.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
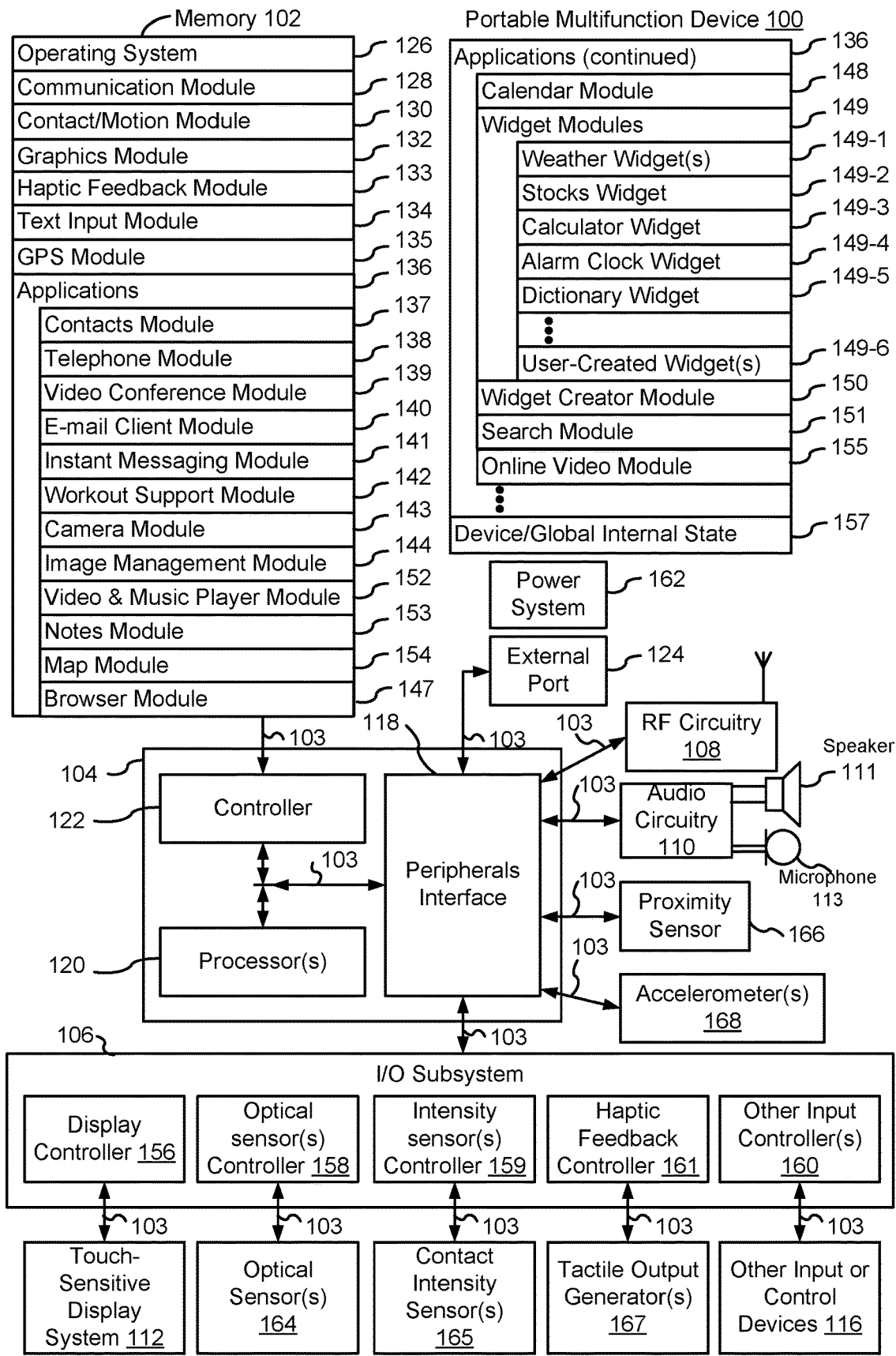
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an exemplary embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an exemplary embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back-and-forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
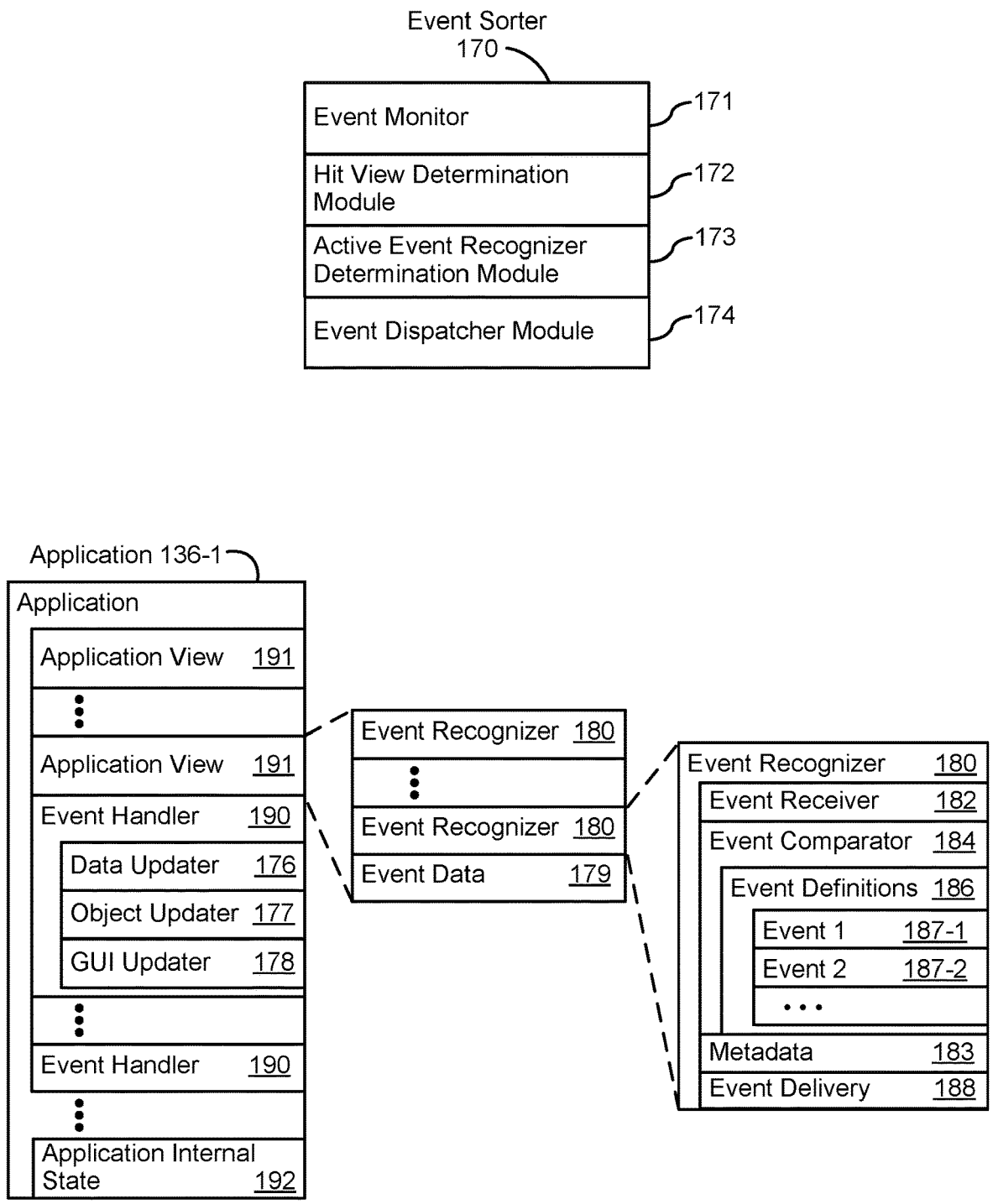
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Text;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

FIG. 4B illustrates an exemplary user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and one or more sensors to detect intensity of contacts with the touch-sensitive surface.

FIGS. 5A-5AO illustrate exemplary user interfaces for providing sketching and handwriting support in a document editing environment in accordance with some embodiments. FIGS. 5AP-5AR illustrate exemplary user interfaces and corresponding device rotational states for providing sketching and handwriting support in a document editing environment in accordance with some embodiments. The exemplary user interfaces in these figures are used to illustrate the processes described below, including the processes in FIGS. 6A-6G, 7A-7B, 8A-8C, and 9A-9B. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIG. 5A illustrates user interface 500 of an application (e.g., a notes application, a sketch application, a word processing application, a scrapbooking application, etc.) that provides sketching and handwriting input functions for a portable electronic device (e.g., device 100, 1A). In some embodiments, the sketching and handwriting input functions are provided along with a keyboard input function (e.g., character input via a virtual or hardware keyboard, or both) in the application.

As shown in FIG. 5A, in some embodiments, user interface 500 includes a document region (e.g., note page 502) that displays at least a portion of a document that is being edited in the application. The document region is also referred to as a content presentation area. In some embodiments, the portion of the document that is displayed in the document region (e.g., note page 502) is shown in one of several possible views, such as a multi-page view, a full-page view, a full-width view, a zoomed view, an outline view, and a webpage view, etc. In FIG. 5A, the document is presented in a full-width view. In some embodiments, metadata (e.g., a title, date of creation, author, etc.) associated with the document is optionally displayed with the document (e.g., above the document region) in the user interface.

In some embodiments, the application is configured to receive typed inputs, and displays the received typed inputs in the portion of the document that is displayed in the document region (e.g., note page 502). As shown in FIG. 5A, virtual keyboard 504 is displayed in user interface 500 (e.g., overlaid on a lower portion of node page 502). When touch inputs (e.g., tap gestures) are detected on one or more keys of virtual keyboard 504, characters corresponding to the touched keys are inserted into the document at predetermined locations (e.g., at locations indicated by insertion cursor 506).

In some embodiments, guidelines 508 (e.g., evenly spaced horizontal lines) are optionally displayed in the document region (e.g., on note page 502) to visually indicate the line spacing and writing direction of text input in the document.

In some embodiments, insertion cursor 506 is repositioned in the document region in accordance with the current location of a focus selector on the display (e.g., in accordance with the contact location of a tap input on touch screen 112) and/or in accordance with movement of the focus selector (e.g., in accordance with a drag gesture that grabs and drags insertion cursor 506 from one location to another in the document region). In some embodiments, insertion cursor 506 is snapped to predefined permitted insertion positions prescribed by guidelines 508 and predefined character spacing when insertion cursor 506 is moved in the document region. In some embodiments, insertion cursor 506 is optionally placed anywhere in the document region (e.g., across a guideline) in accordance with the current location of a focus selector on the display (e.g., in accordance with the contact location of a tap gesture on touch screen 112) and/or in accordance with movement of the focus selector (e.g., in accordance with a drag gesture that grabs and drags insertion cursor 506 from one location to another in the document region).

In some embodiments, default guidelines (e.g., guidelines 508) are not provided in the document region and the vertical position of a new line in the document region is optionally defined based on the position of insertion cursor 506 when insertion cursor 506 is moved to a new vertical location in the document region, e.g., either by a tap gesture or a drag and drop gesture. In some embodiments, after the vertical position of the new line is defined based on the position of insertion cursor 506, the vertical position of the next line is defined based on the vertical position of the new line and the regular line spacing used for the document. When a new line character (e.g., a carriage return) is received through virtual keyboard 504, insertion cursor 506 is moved to the next line as defined.

FIG. 5A illustrates that some typed text (e.g., typed characters on four consecutive lines) has been entered into the document region through virtual keyboard 504 and insertion cursor 506 is now located at the end of the text input.

Figure 5B:
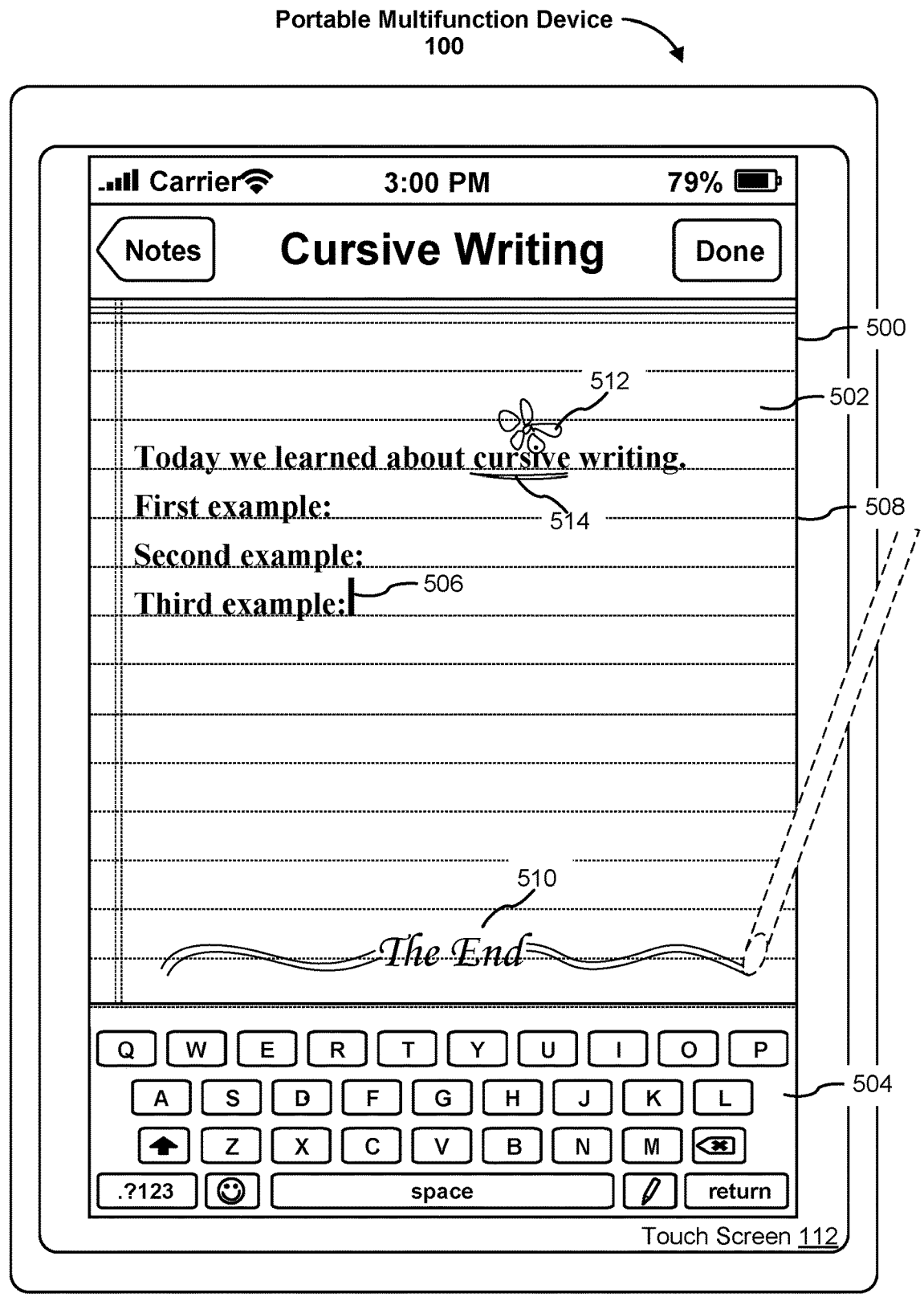

FIG. 5B illustrates that, in some embodiments, direct sketching and handwriting in the document region are supported. As shown in FIG. 5B, in some embodiments, a sketch input includes one or more strokes drawn directly on the displayed portion of the document page by movement of a focus selector on the document page (e.g., the movement of the focus selector is caused by movement of a contact on a touchpad or touch screen 112). In some embodiments, sketching and handwriting inputs are accepted at any location on the document page, and do not need to be snapped to predefined permitted insertion locations (e.g., between guidelines 508). For example, in FIG. 5B, handwritten characters 510 (e.g., "The End") are written cross a respective guideline. In some embodiments, sketching and handwriting inputs are accepted at locations currently occupied by one or more previously typed characters (e.g., as illustrated by sketch 512 and underline 514). In some embodiments, when a sketch (e.g., sketch 512 and underline 514) is sufficiently close to one or more typed characters (e.g., typed characters "cursive") in the document region, the sketch is grouped with the typed characters (e.g., the typed characters "cursive") into an object that can be manipulated (e.g., dragged, re-flown, deleted, etc.) as a unit.

Figure 5C:
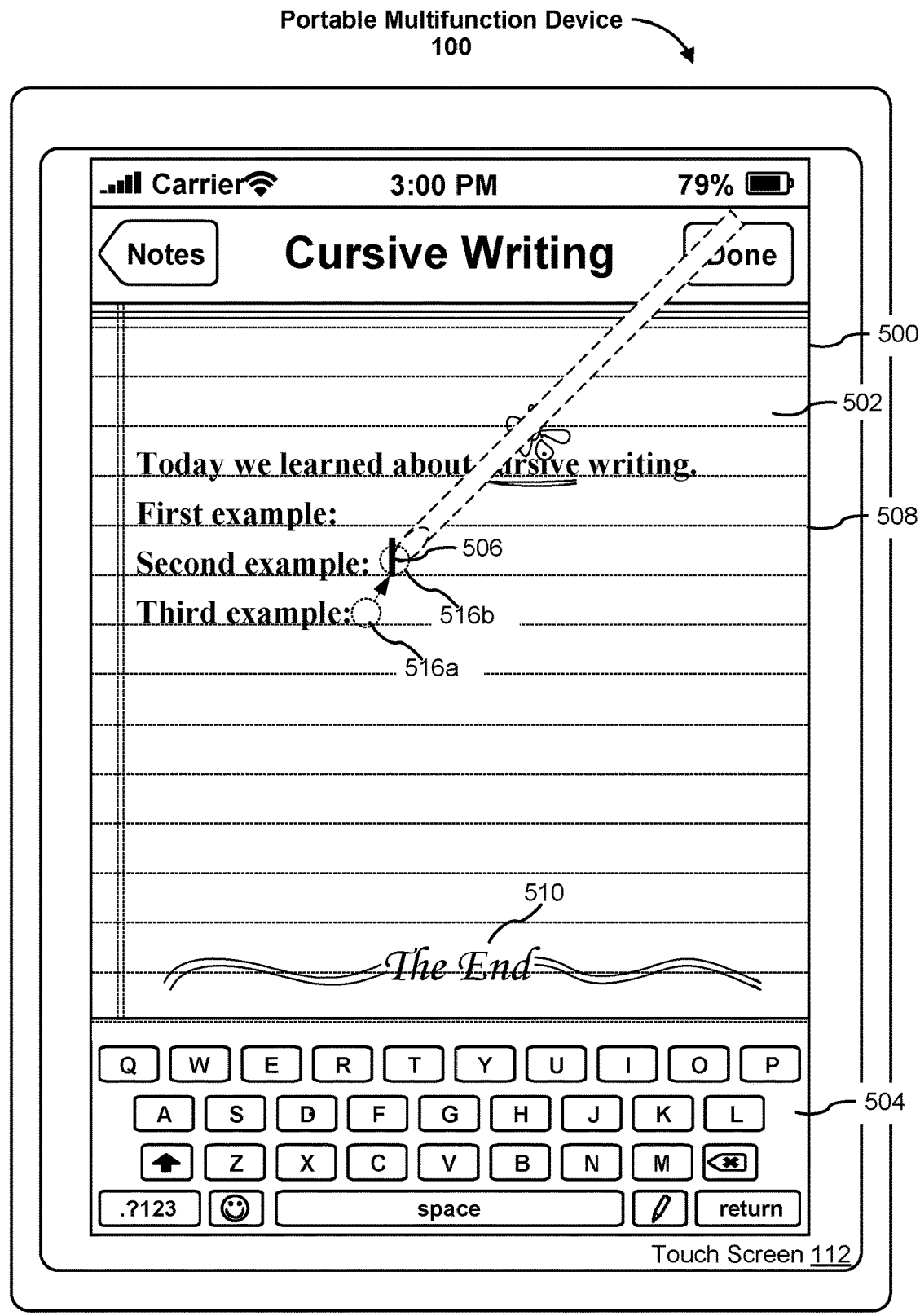

FIG. 5C illustrate that, in some embodiments, insertion cursor 506 is dragged by a contact (e.g., a contact of a stylus or finger on touch screen 112 or a touch pad) from a first location (e.g., location 516*a*) to a second location (e.g., location 516*b*) in note page 502. In some embodiments, insertion cursor 506 snaps to a closest permitted insertion location to a lift-off location (e.g., location 516*b*) of the contact on touch screen 112 (or to a corresponding onscreen location of the lift-off location of the contact on the touch-sensitive surface coupled to the display).

Figure 5D:
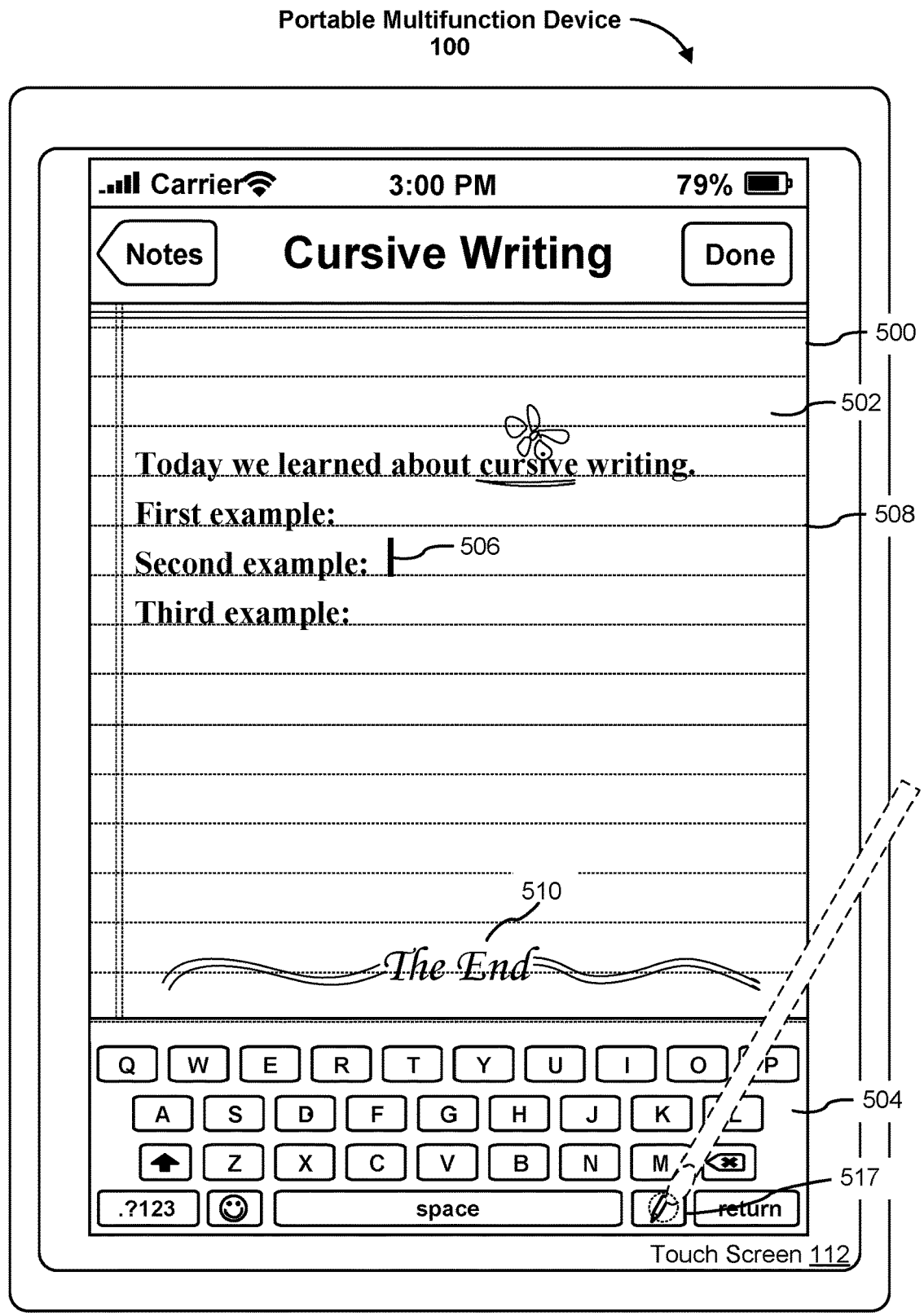
Figure 5E:
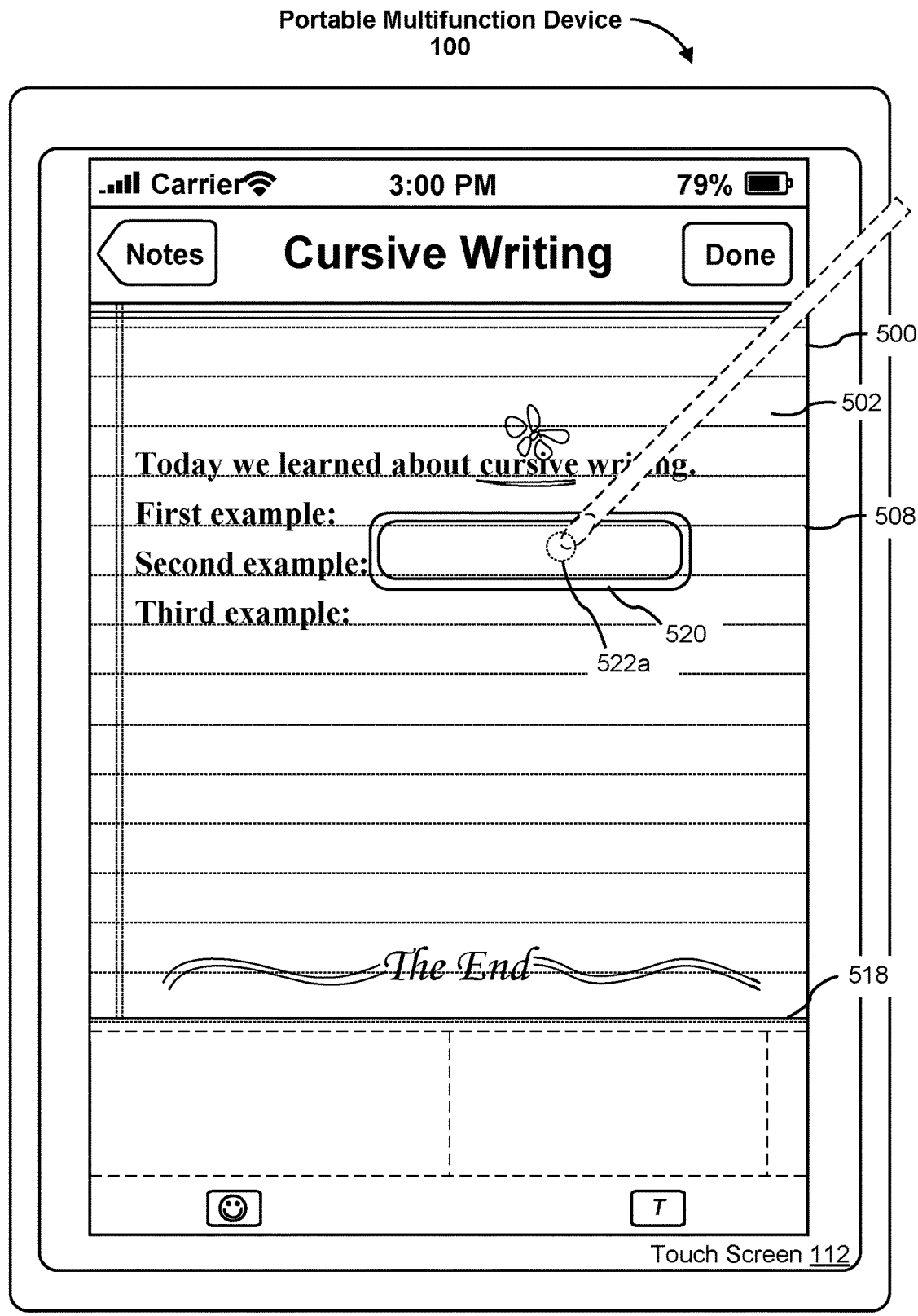

FIGS. 5D-5E illustrate that, in some embodiments, a sketch/handwriting input mode is optionally selected by invoking a corresponding affordance displayed on user interface 500 (e.g., by selecting button 517 for the sketch/handwriting input mode). In some embodiments, a sketch/handwriting input area (e.g., sketch/handwriting input area 518) is displayed (e.g., replacing virtual keyboard 504) in user interface 500. In some embodiments, sketch/handwriting input area 518 is configured to accept sketching and handwriting strokes (e.g., strokes defined by movement of one or more contacts within sketch/handwriting input area 518), and display them within sketch/handwriting input area 518. In some embodiments, an insertion position indicator (e.g., insertion position indicator 520) is overlaid on the displayed document page (e.g., note page 502). The insertion position indicator indicates the position where sketch/handwriting inputs that are accepted in sketch/handwriting input area 518 will be inserted in the displayed document page. For example, in some embodiments, the space shown within sketch/handwriting input area 518 is a zoomed version of the space enclosed within insertion position indicator 520.

Figure 5F:
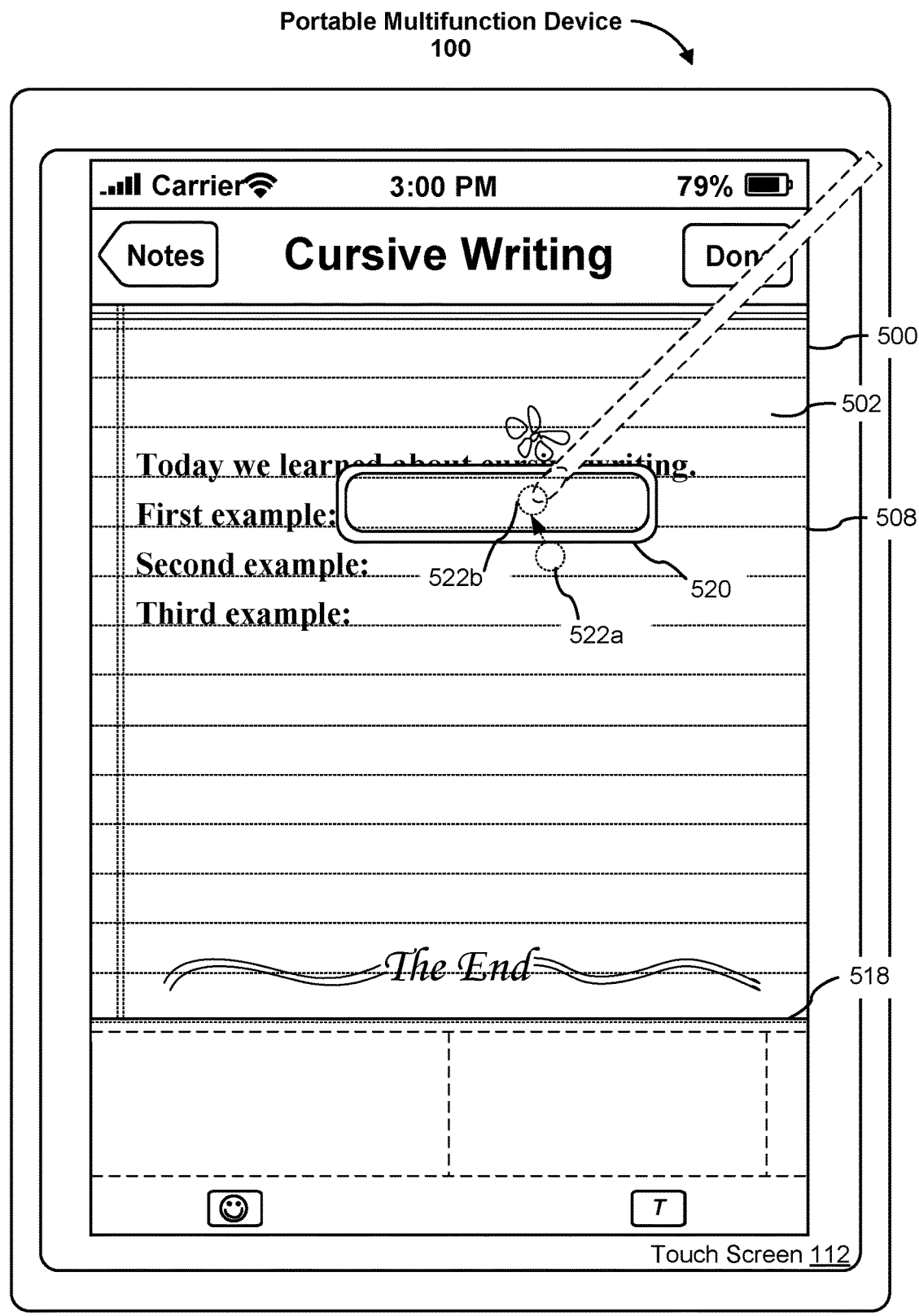

FIGS. 5E-5F illustrate that, in some embodiments, insertion position indicator 520 is dragged (e.g., by a contact of a stylus or finger on touch screen 112 on insertion position indicator 520) from one location (e.g., location 522*a* next to typed text "Second example:") to another location (e.g., location 522*b* next to typed text "First example:) within the displayed document page. In some embodiments, insertion position indicator 520 can be placed at anywhere in the document page in accordance with the movement of the contact of the drag gesture, and need not be placed between two adjacent guidelines (e.g., guidelines 508).

Figure 5G:
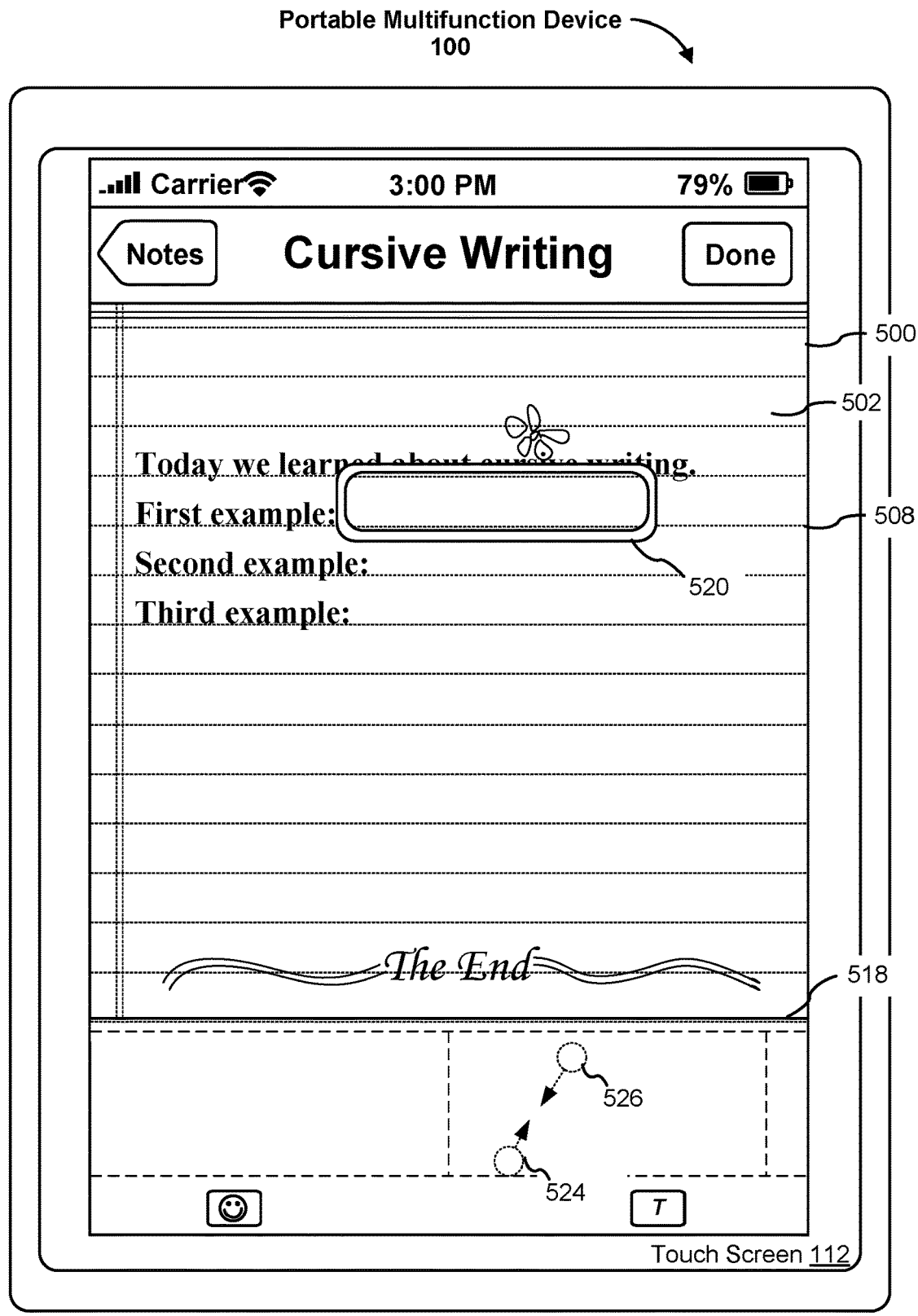
Figure 5H:
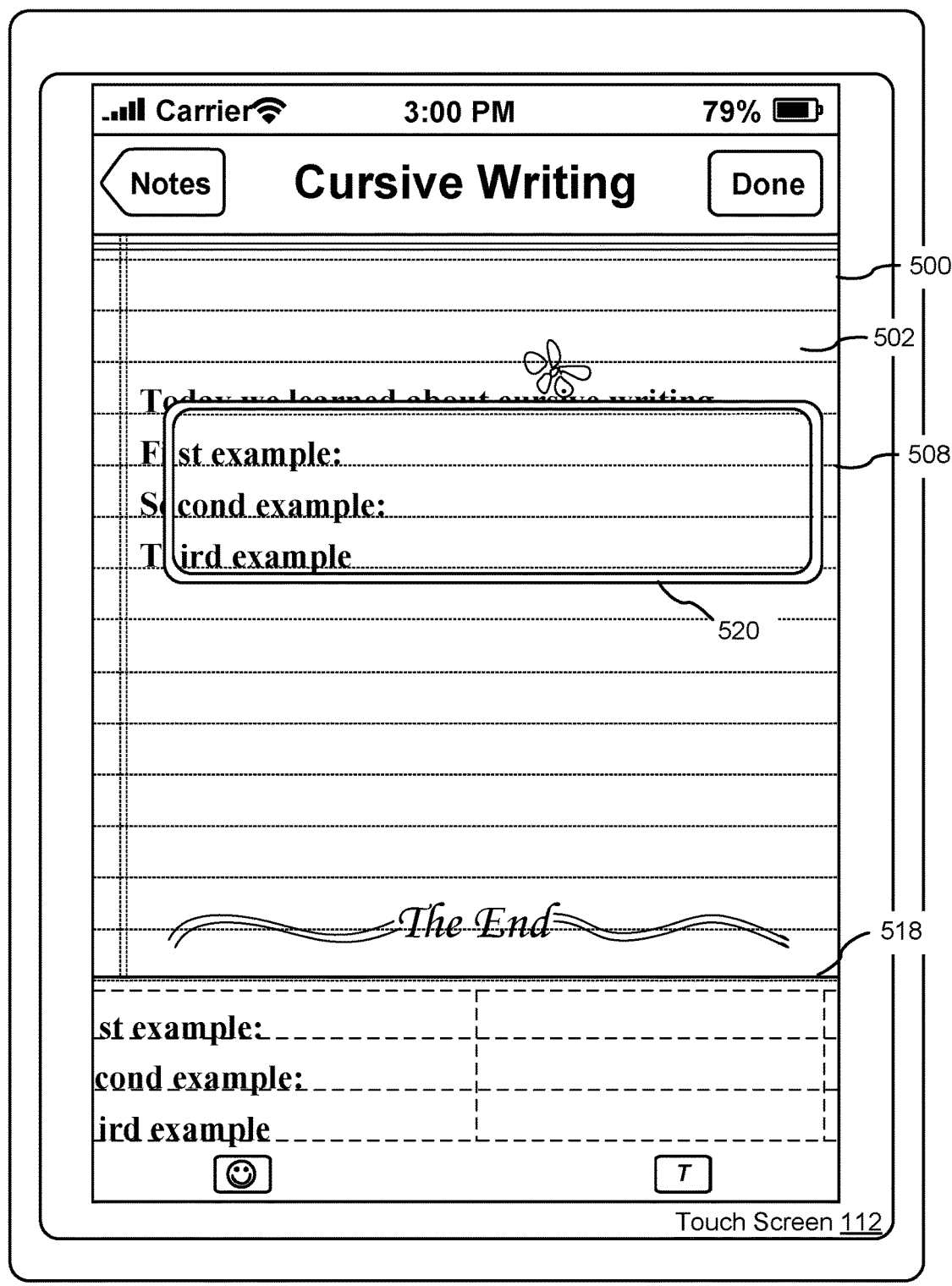

FIGS. 5G-5H illustrate that, in some embodiments, in response to detecting a pinch gesture directed to sketch/handwriting input area 518 (e.g., two contacts 524 and 526 moving toward each other within sketch/handwriting input area 518), insertion position indicator 520 is enlarged to enclose a larger portion of the displayed document page. As shown in FIG. 5H, in response to the pinch gesture, insertion position indicator 520 is enlarged (e.g., enlarged three times) to enclose three lines on the displayed document page (e.g., note page 502), and correspondingly, a zoomed version of the space enclosed within insertion position indicator 520 is displayed in sketch/handwriting input area 518.

Figure 5I:
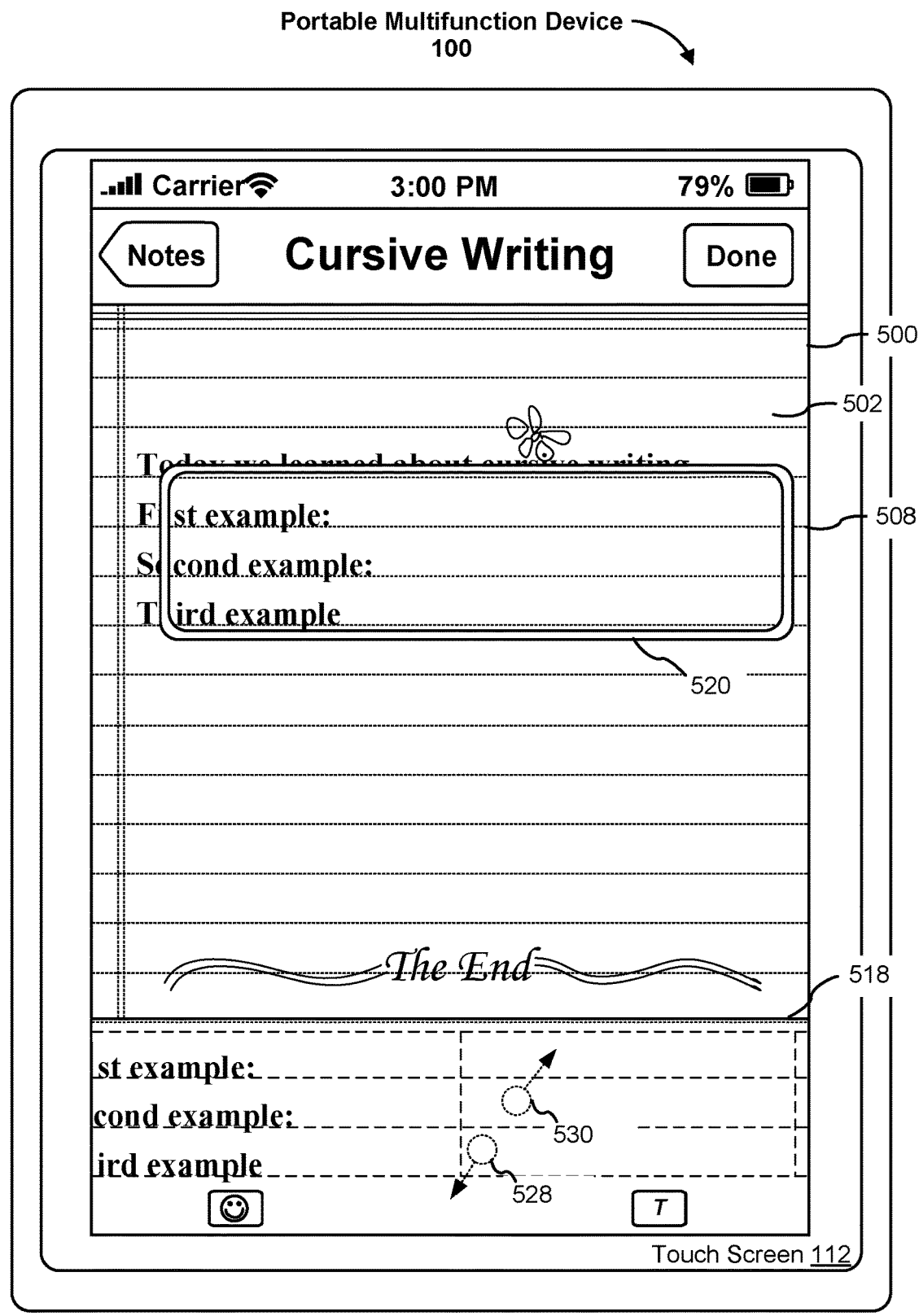
Figure 5J:
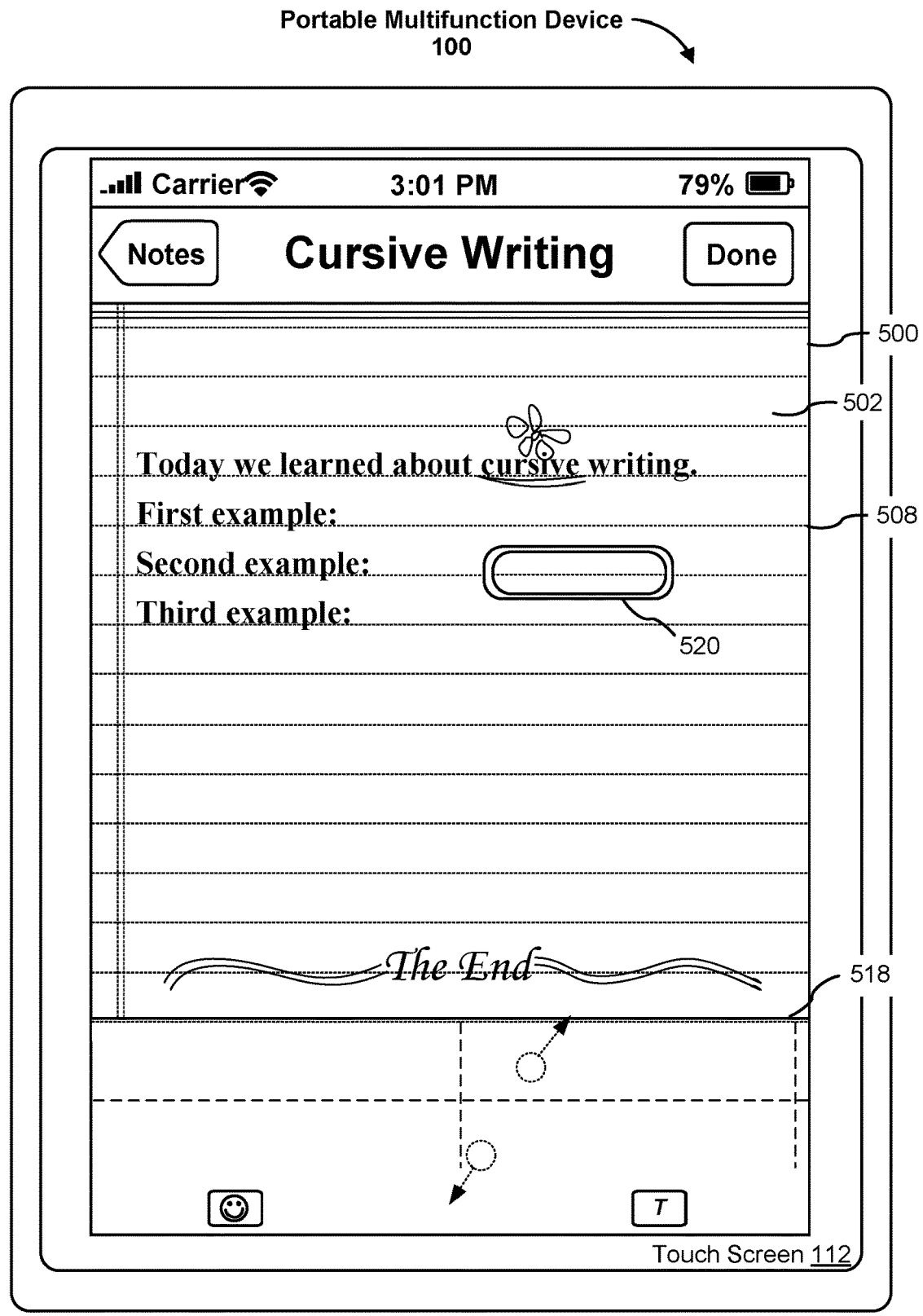

FIGS. 5I-5J illustrate that, in some embodiments, in response to detecting a reverse pinch gesture directed to sketch/handwriting input area 518 (e.g., two contacts 528 and 530 moving away from each other within sketch/handwriting input area 518), insertion position indicator 520 is shrunken to enclose a smaller portion of the displayed document page (e.g., note page 502). As shown in FIG. 5J, in response to the reverse pinch gesture, insertion position indicator 520 is shrunken (e.g., reduced in size by a predetermined factor, e.g., 3) to enclose roughly one line on the displayed document page, and correspondingly, a zoomed version of the space enclosed within insertion position indicator 520 is displayed in sketch/handwriting input area 518.

In some embodiments, the location of the gesture within sketch/handwriting input area 518 is used to determine the center location of insertion position indicator 520 after the enlargement or reduction of insertion position indicator 520 in the document page. As is also illustrated in FIGS. 5I-5J, the location of the reverse pinch gesture in sketch/handwriting input area 518 is used to reposition insertion position indicator 520 on the displayed document page (e.g., note page 502).

Figure 5K:
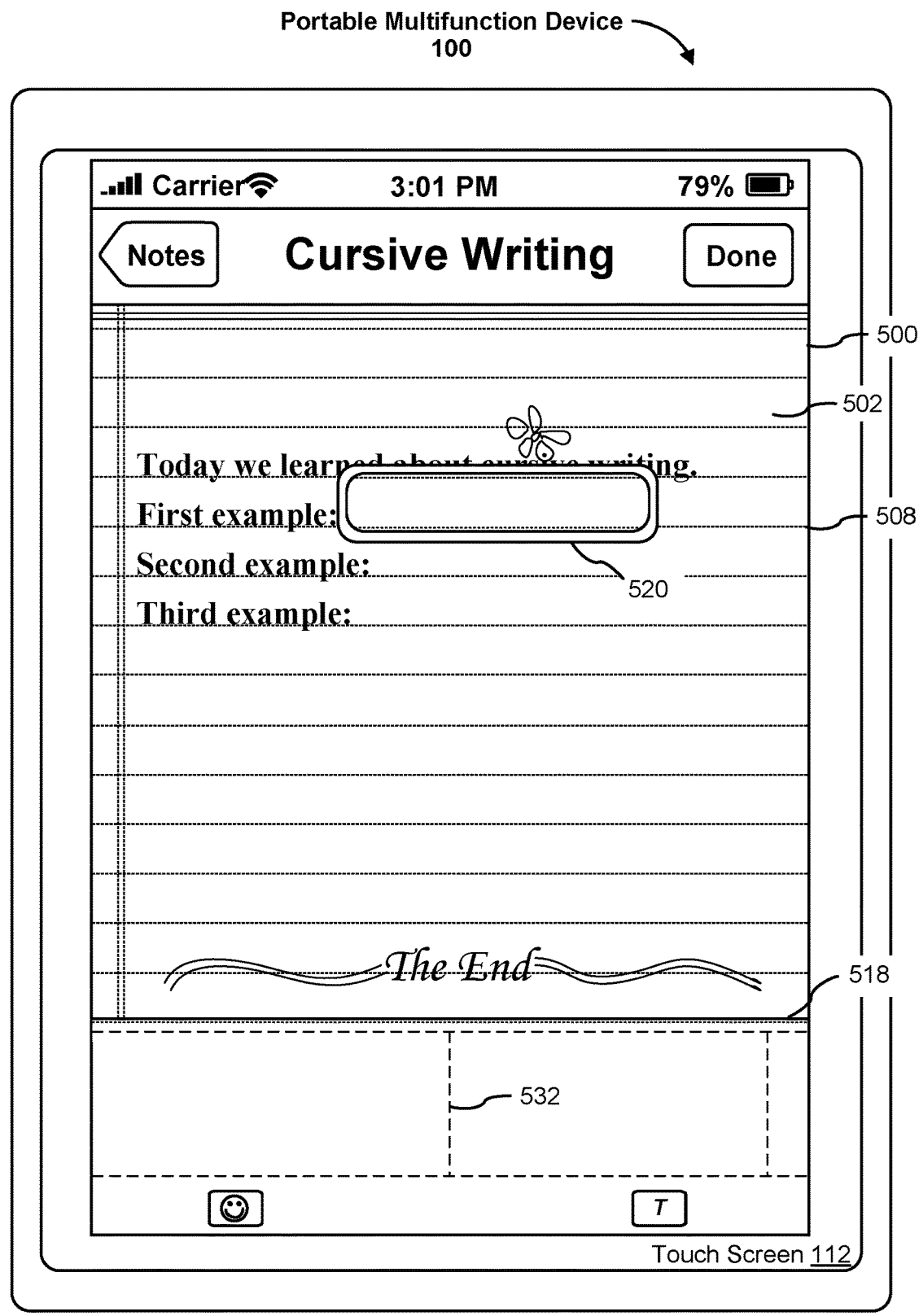
Figure 5L:
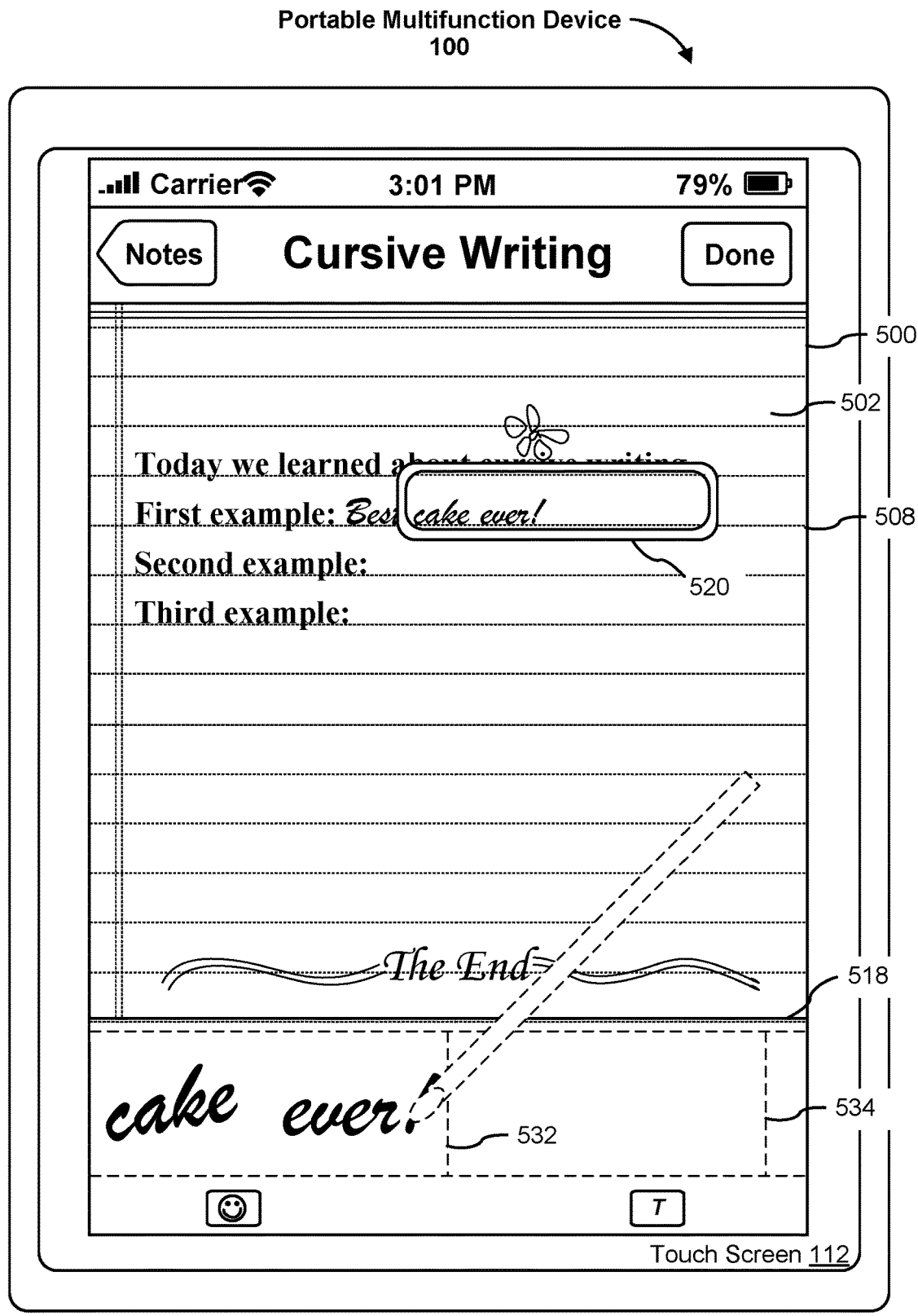

FIGS. 5K-5L illustrate that, in some embodiments, a default height of sketch/handwriting input area 518 corresponds to one full line height in the document. Thus, any handwriting that fit within the height of sketch/handwriting input area 518 fits within vertical spacing of a single line in the document page. In some embodiments, a heuristic for distinguishing handwritten textual inputs from sketch inputs is based on whether all of the strokes of the handwriting input fit within the height of a single line in the document page. Thus, regardless of whether the handwritten strokes are provided directly in the document page (e.g., by a contact of a stylus or finger in note page 502) or indirectly through the use of handwriting/sketch input area 518 (e.g., by a contact of a stylus or finger in handwriting/sketch input area 518), if all of a sequence of strokes that make up the content object are confined within the height of a single line in the document page or a single line in handwriting/sketch input area 518, the sequence of strokes are determined to be strokes within a sequence of one or more handwritten words, rather than strokes within a sketch. In other words, in some embodiments, no handwriting recognition need to be performed to determine whether a sequence of handwritten strokes form one or more handwritten words. Furthermore, in some embodiments, when handwritten word blocks are generated based on the handwritten strokes and presented in the document page, no handwriting recognition needs to be performed to convert the word blocks to typed text or words in a corpus.

FIGS. 5K-5L further illustrate that, as handwritten strokes are accepted in sketch/handwriting input area 518, the content and space enclosed in sketch/handwriting input area 518 is automatically scrolled in a direction opposite the default writing direction associated with the content presentation area (e.g., content and space moves horizontally from the right to the left, when the default writing direction goes horizontally from the left to the right). In some embodiments, the automatic scrolling within sketch/handwriting input area 518 occurs when a temporal break (e.g., a pause or lift-off of the contact for at least a threshold amount of time, e.g., 30 ms) is detected during the handwriting input. In some embodiments, the automatic scrolling within sketch/handwriting input area 518 occurs when the boundary of the current handwriting input (e.g., the input up to the temporal or spatial break) has crossed (or is within a threshold distance of) a scrolling threshold mark (e.g., scroll boundary indicator 532). In some embodiments, the automatic scrolling within sketch/handwriting input area 518 occurs when both a temporal break and crossing of the scrolling threshold mark (e.g., scroll boundary indicator 532) are detected. In some embodiments, scroll boundary indicator 532 is placed in the center of the sketch/handwriting input area 518. In some embodiments, when the right edge of insertion position indicator 520 has reached the right edge of the document page, the automatic scrolling is temporarily suspended until the handwriting input fills to the right side portion of sketch/handwriting input area 518. Then, the whole sketch/handwriting input area 518 is refreshed to show the beginning of the next line, and correspondingly, insertion position indicator 520 is moved down to the beginning of the next line in the document page as well.

As shown in FIG. 5L, in some embodiments, when the content and space within sketch/handwriting input area 518 is automatically scrolled in response to continued writing detected within sketch/handwriting input area 518, insertion position indicator 520 moves forward in the writing direction (e.g., from left to right) in the document page in accordance with the scrolling occurring within sketch/handwriting input area 518.

As shown in FIG. 5L, in some embodiments, the handwritten strokes received within sketch/handwriting input area 518 are grouped into one or more word blocks, e.g., in accordance with their temporal and/or spatial proximity to one another. In some embodiments, the size, spacing, orientation, and/or alignment of the identified word blocks are adjusted before they are presented in the document page. For example, as shown in FIG. 5L, within sketch/handwriting input area 518, the word block "cake" is slanted upward relative to the horizontal writing direction, while the word block "ever!" is slanted slightly downward relative to the horizontal writing direction. When the handwritten word blocks "cake" and "ever!" are presented in the document page (e.g., note page 502), their orientations are adjusted slightly, such that both word blocks are aligned (e.g., horizontally) with the horizontal writing direction.

In addition, as shown in FIG. 5L, the spacing between the word blocks for "cake" and "ever!" is also adjusted, such that the spacing between the handwritten word blocks is consistent with (e.g., equal to) the regular word spacing between typed words in the document page.

As shown in FIG. 5L, the sizes of the handwritten word blocks (e.g., "cake" and "ever!") are optionally adjusted (e.g., enlarged or reduced) in accordance with the font size for adjacent typed text, such that when the handwritten word blocks and typed text are presented in the same line in the document page, they have roughly the same size.

Furthermore, as shown in FIG. 5L, the vertical alignment of the handwritten word blocks is optionally adjusted when the word blocks are presented in the document page, so that the handwritten word blocks follow the same alignment preferences as typed text in the same line. In this example, even though the handwritten words have roughly a centered vertical alignment in sketch/handwritten input area 518, the vertical alignment for the handwritten word blocks is changed to bottom-alignment when the handwritten word blocks are presented in the document page, because typed text in the same line are bottom-aligned in the document page.

Figure 5M:
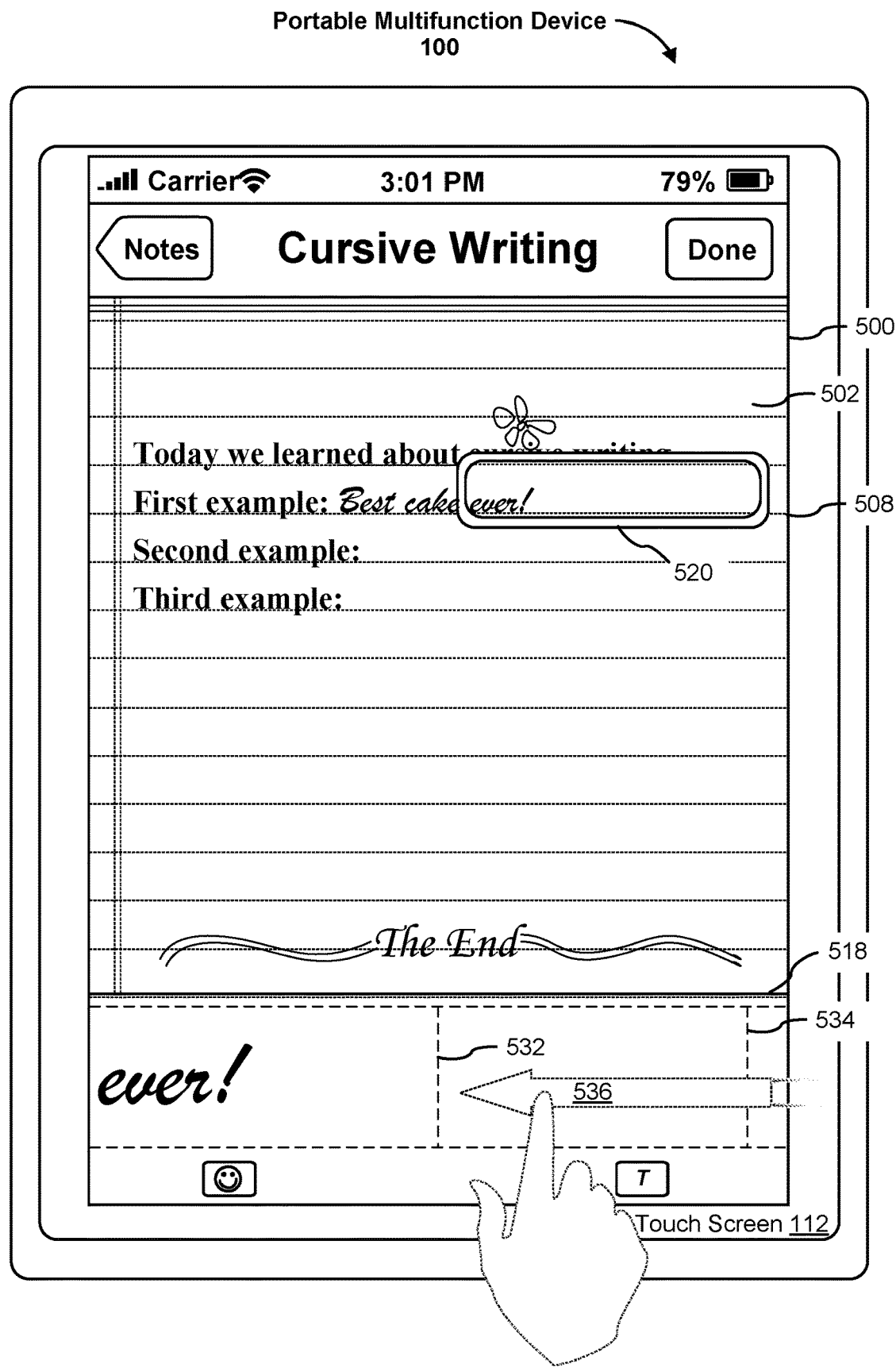
Figure 5N:
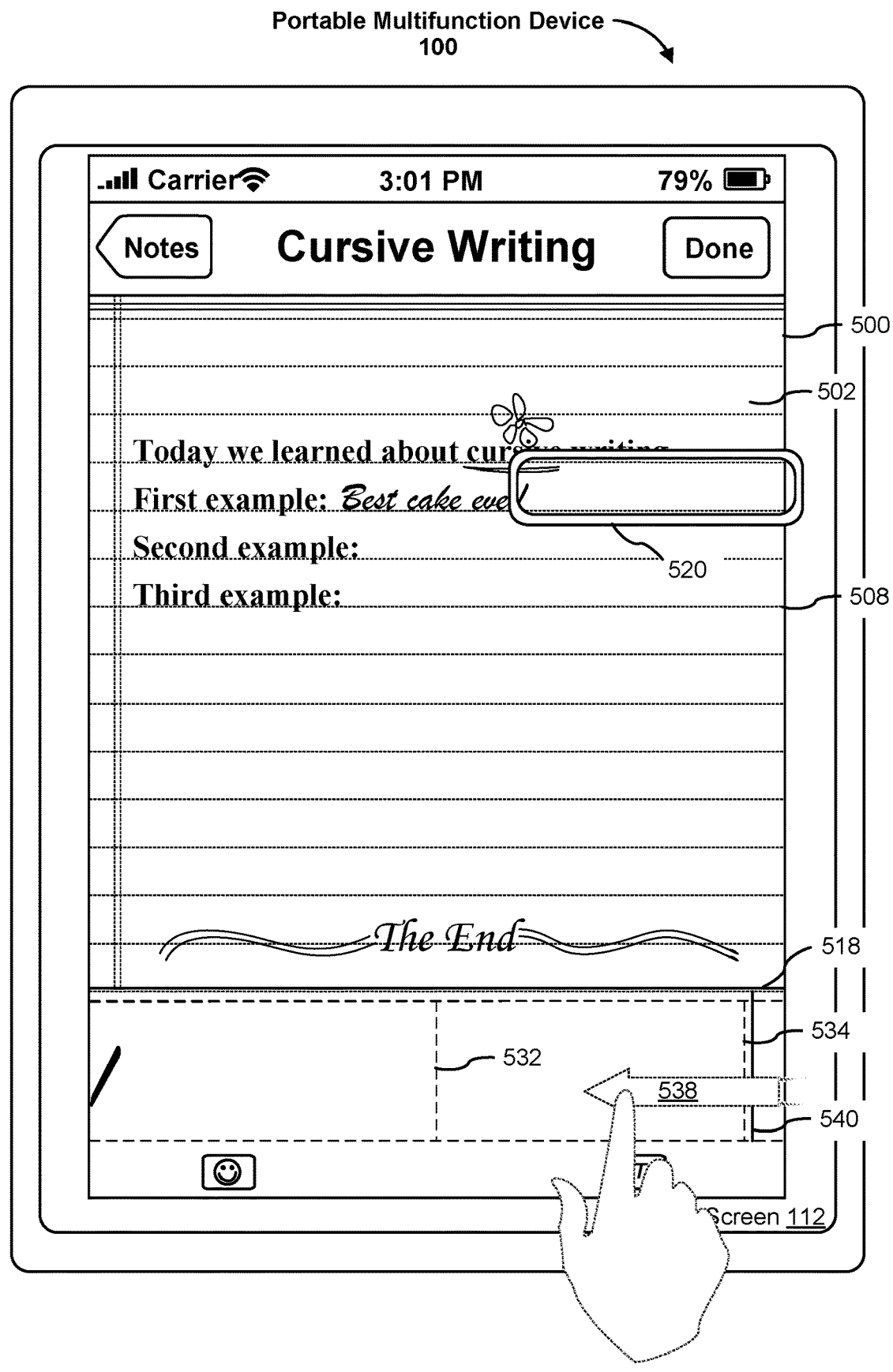

FIGS. 5M-5N illustrate that, in some embodiments, in addition to automatic scrolling in response to continued writing within sketch/handwriting input area 518, space and/or content in sketch/handwriting input area 518 are also manually scrollable along the writing direction in response to various predetermined scrolling inputs.

In some embodiments, a scroll bar is optionally presented (not shown in FIG. 5M) within sketch/handwriting input area 518, and the space and/or content within sketch/handwriting input area 518 is scrolled forward and backward along the writing direction in response to manual movement of a position indicator in the scroll bar.

In some embodiments, as shown in FIG. 5M, no scroll bar is presented with sketch/handwriting input area 518, and the predetermined scrolling input is a swipe gesture detected at least partially within sketch/handwriting input area 518 (e.g., a swipe gesture detected based on one or more contacts synchronously moving forward or backward substantially along the writing direction within sketch/handwriting input area 518).

In some embodiments, in order to distinguish between a swipe gesture for scrolling (e.g., contact movement for dragging the content within sketch/handwriting input area 518) and a swipe gesture for handwriting input (e.g., contact movement for drawing a horizontal stroke), a swipe gesture with two simultaneous contacts moving in synchronization is used for scrolling, and a swipe gesture with a single contact is used for drawing a handwritten stroke. In some embodiments, another way for distinguishing a scrolling input and a handwriting input is used. For example, if a moving contact is accompanied by another stationary contact on touch screen 112, the movement of the contact is interpreted as a scrolling input; otherwise, the movement of the contact is interpreted as handwriting input for drawing a stroke.

In some embodiments, if movement of the contact starts from (or end at) a predefined region in user interface 500 (e.g., start from (or end on) the right side of scroll boundary indicator 534), the movement of the contact is interpreted as a scrolling input; otherwise, the movement of the contact is interpreted as handwriting input for drawing a stroke. As shown in FIG. 5M, a swipe gesture (e.g., swipe gesture 536) by a single contact in sketch/handwriting input area 518 starts from a location on the right side of scroll boundary indicator 534 and moves from right to left (e.g., a swipe in the reverse writing direction, which is the opposite direction of a writing direction associated with the content presentation area). In response to detecting swipe gesture 536, the content and space within sketch/handwriting input area 518 is scrolled in the reverse writing direction (e.g., scrolled from the right to the left). In accordance with the scrolling of the content and space within sketch/handwriting input area 518, insertion position indicator 520 moves in the writing direction in synchronization with the scrolling that is occurring within sketch/handwriting input area 518.

Figure 5O:
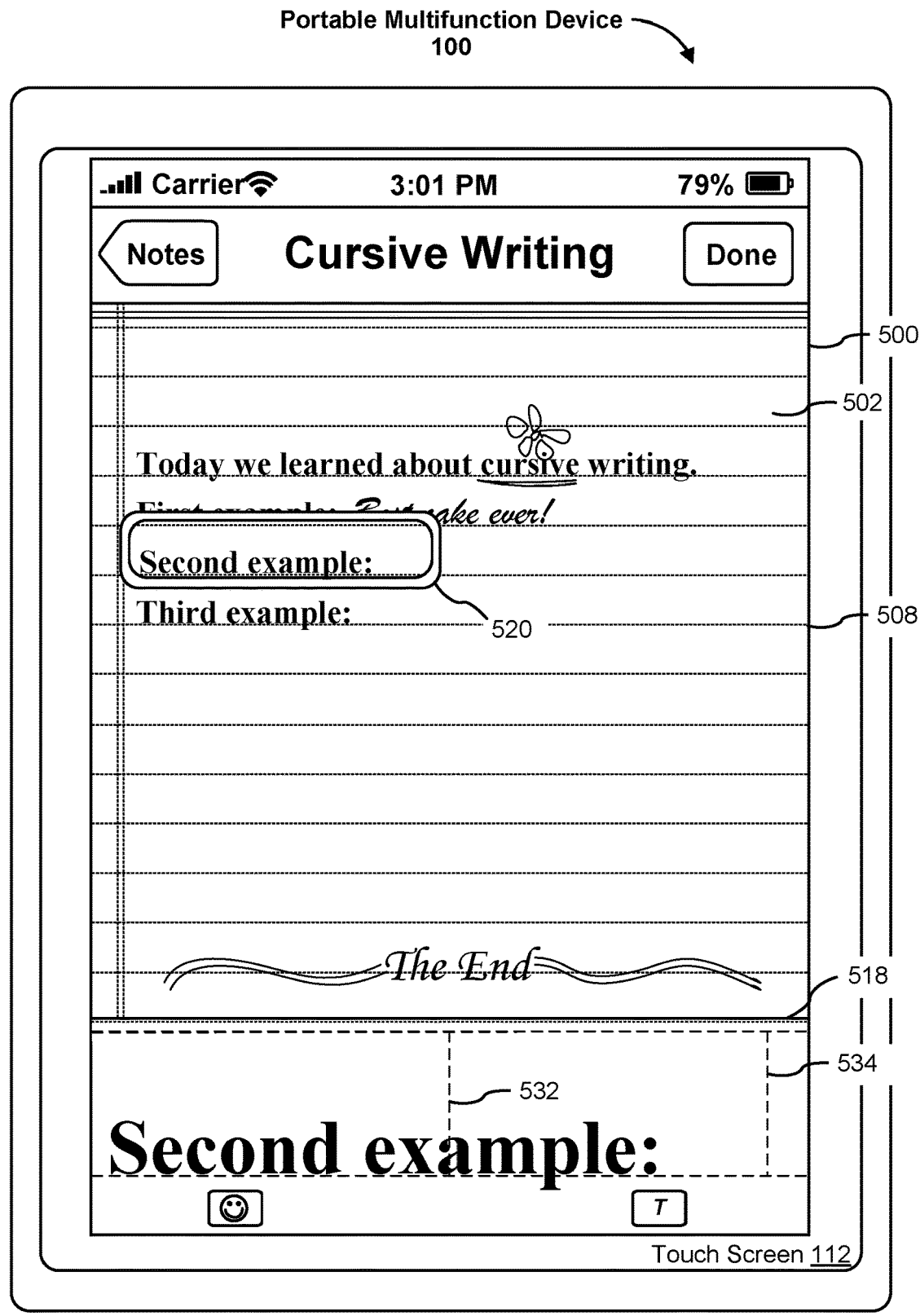

FIGS. 5N-5O illustrate that, in some embodiment, continued scrolling of content in the reverse writing direction within sketch/handwriting input area 518 (e.g., in response to swipe gesture 538, as shown in FIG. 5N) has caused insertion position indicator 520 to reach the end of a current line in the document page (e.g., right edge 540 of the document page has passed scroll boundary indicator 534 in sketch/handwriting input area 518, as shown in FIG. 5N) and to automatically move down to the beginning of the next line (as shown in FIG. 5O).

As shown in FIG. 5N, in response to swipe gesture 538 (e.g., a swipe gesture in the reverse writing direction), the content and space within sketch/handwriting input area 518 is scrolled in the reverse writing direction (e.g., scrolled from the right to the left). In accordance with the scrolling of the content and space within sketch/handwriting input area 518, insertion position indicator 520 moves in the writing direction in synchronization with the scrolling occurring within sketch/handwriting input area 518.

Figure 5P:
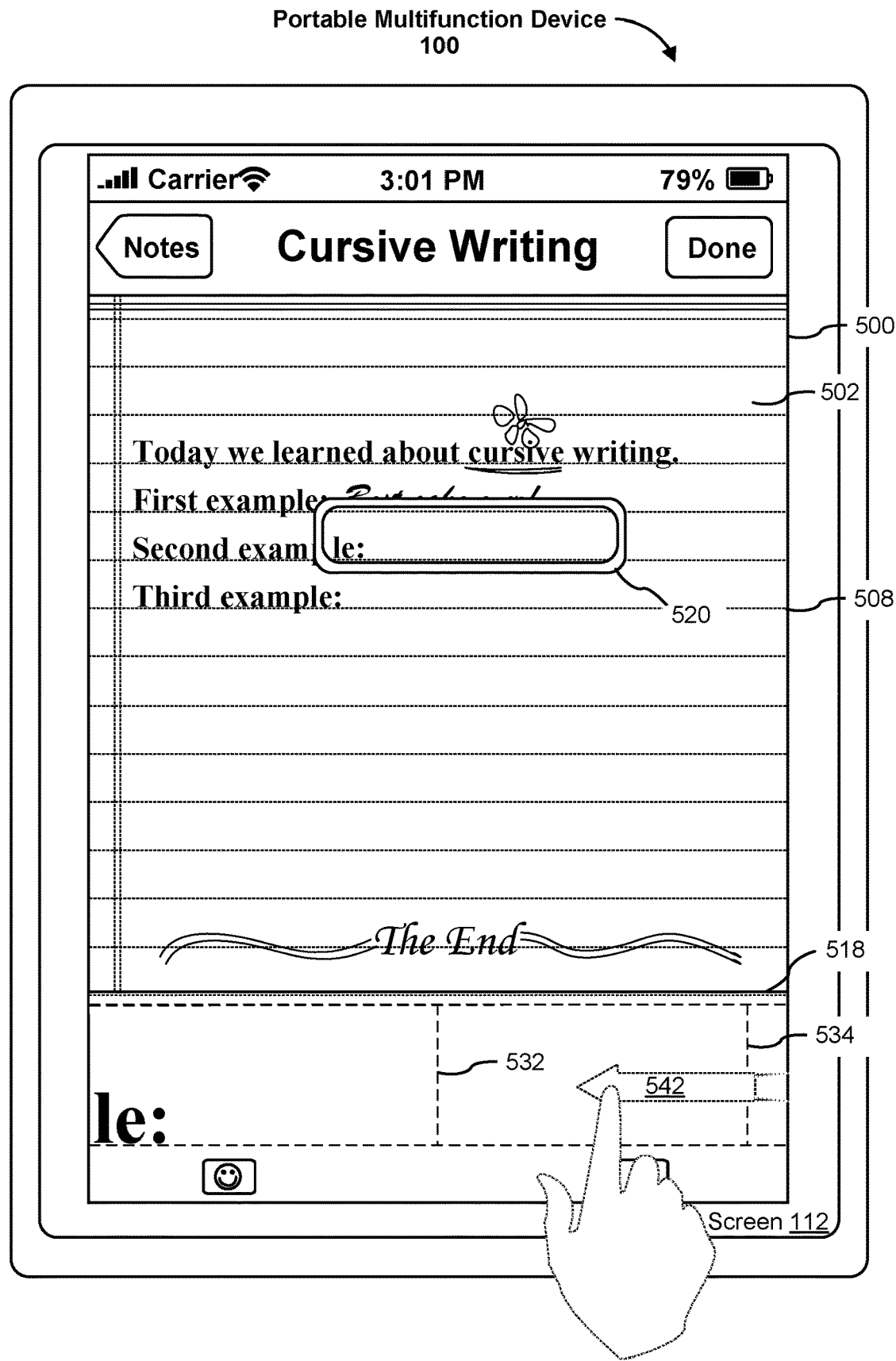

As shown in FIG. 5P, another swipe gesture (e.g., swipe gesture 542) in the reverse writing direction that starts from the right side of scroll boundary indicator 534 causes the space and content within sketch/handwriting input area 518 to scroll further in the reverse writing direction. Correspondingly, insertion position indicator 520 moves in the writing direction in synchronization with the scrolling occurring within sketch/handwriting input area 518.

In some embodiments, a swipe gesture in the writing direction that ends on the right side of scroll boundary indicator 534 will cause the space and content within sketch/handwriting input area 518 to move in the writing direction. Correspondingly, insertion position indicator 520 will move in the reverse writing direction in synchronization with the scrolling occurring within sketch/handwriting input area 518. For example, if a swipe gesture in the writing direction was received in sketch/handwriting input area 518 shown in FIG. 5O, and the swipe gesture ended on the right side of scroll boundary indicator 534, the content in sketch/handwriting input area 518 will be scrolled to the right, and insertion position indicator 520 will move to the left to the beginning of the current line of the document page and then up to the end of the line above the current line. Another swipe gesture in the writing direction that ends on the right side of scroll boundary indicator 534 would cause the space and content within sketch/handwriting input area 518 to scroll further in the writing direction. Correspondingly, insertion position indicator 520 would move in the reverse writing direction in synchronization with the scrolling occurring within sketch/handwriting input area 518.

In some embodiments, instead of or in addition to interpreting a swipe gesture that ends on the right side of scroll boundary indicator 534 (e.g., positioned near the right edge of sketch/handwriting input area 518) as a scrolling input to move the insertion position indicator in the reverse writing direction, a mirror scroll boundary indicator can be place near the left edge of the sketch/handwriting input area 518, and a swipe gesture that ends on the left side of the mirror scroll boundary indicator will be interpreted as a scrolling input to move the insertion position indicator in the writing direction (e.g., from left to right, and down the document page). Correspondingly, a swipe gesture that starts on the left side of the mirror scroll boundary indicator will be interpreted as a scrolling input to move the insertion position indicator in the reverse writing direction (e.g., from right to left, and up the document page).

Figure 5Q:
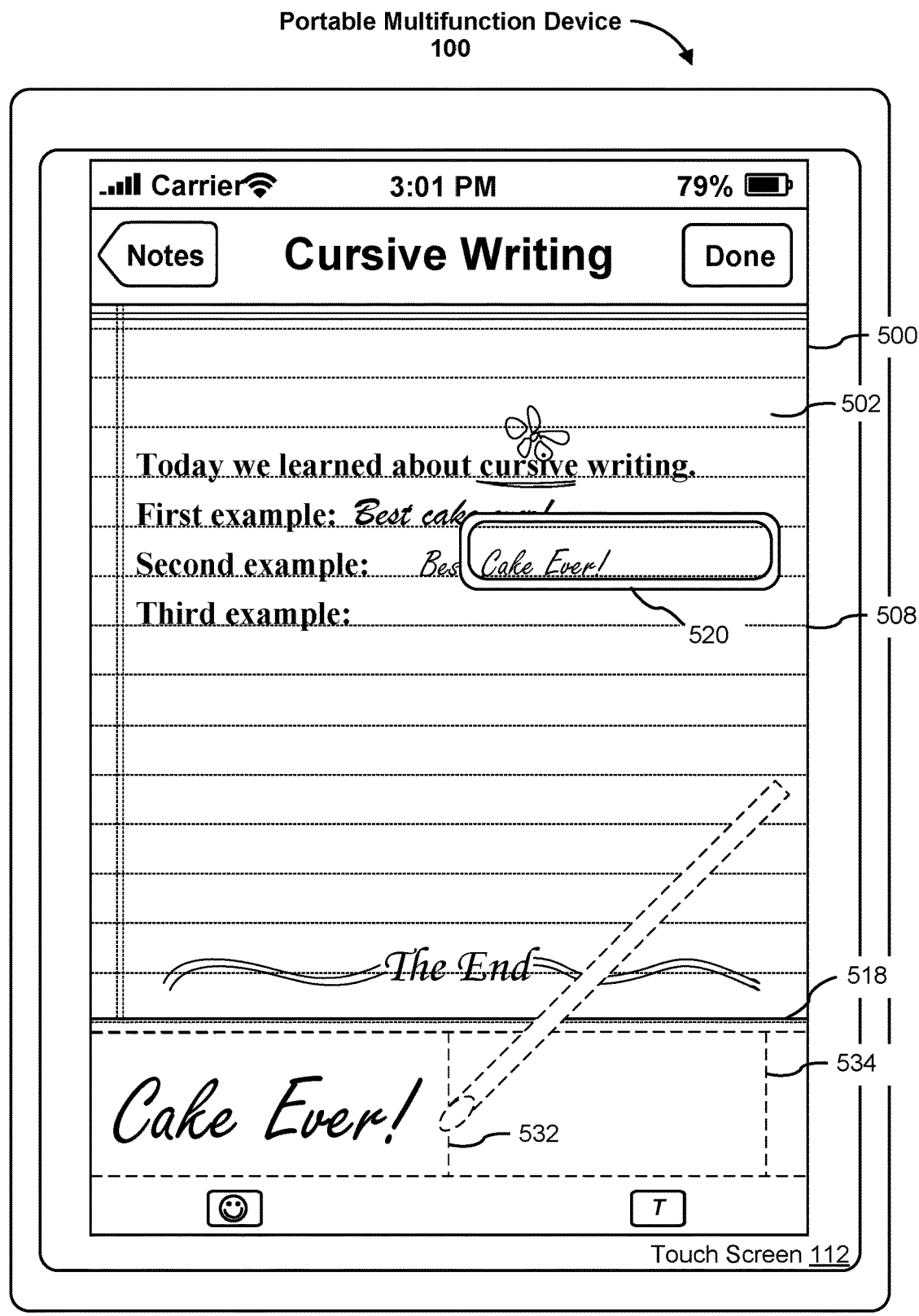

FIG. 5Q shows that, after insertion position indicator 520 has moved to the next line and to a position with unoccupied space, the user can provide more handwriting inputs (e.g., handwritten words "Best Care Ever!") in sketch/handwriting input area 518 to cause the handwritten word blocks ("Best", "Cake", and "Ever!") to be presented in the document page (e.g., after typed text "Second example:") and insertion position indicator 520 to move in the writing direction accordingly.

Figure 5R:
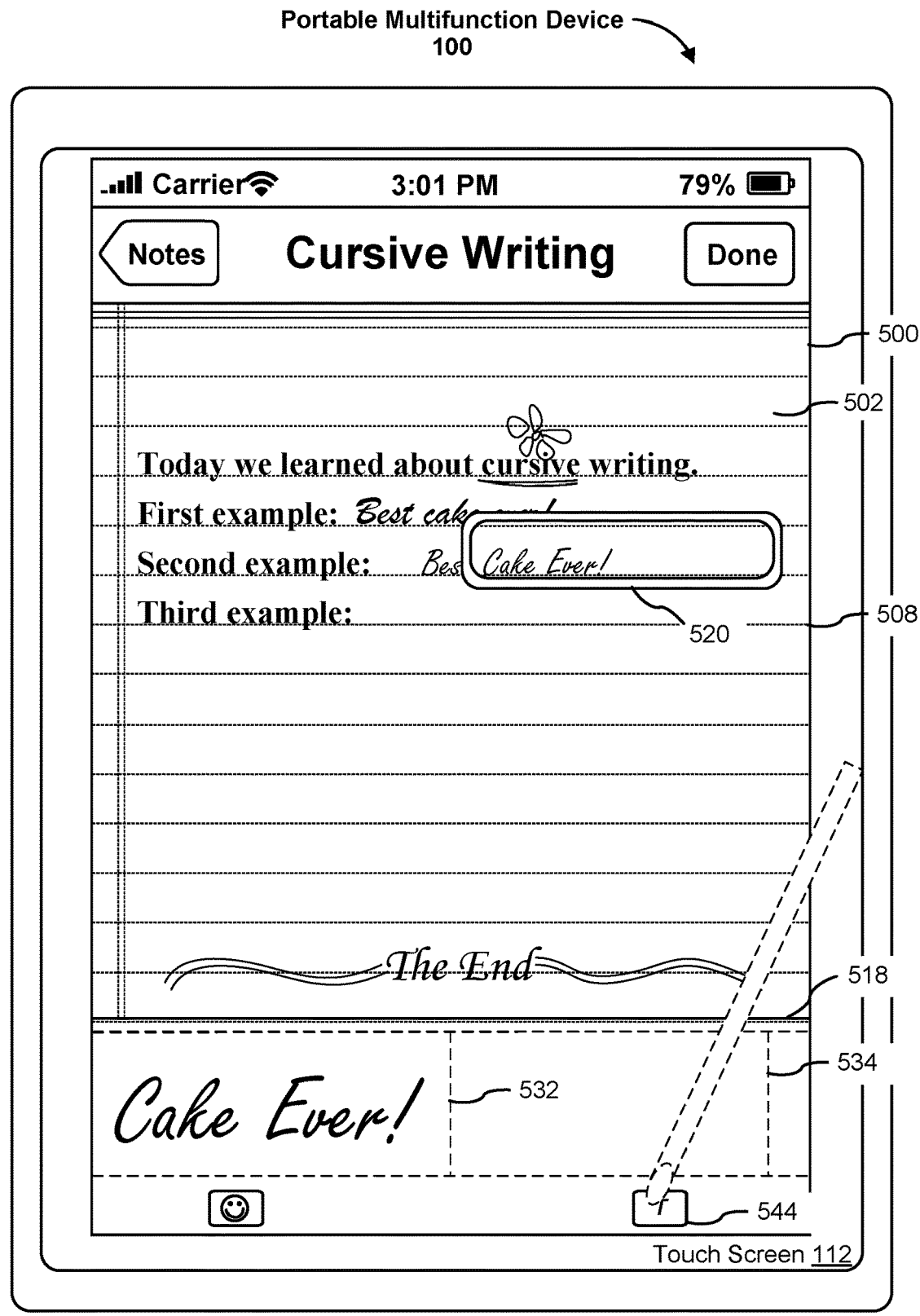
Figure 5S:
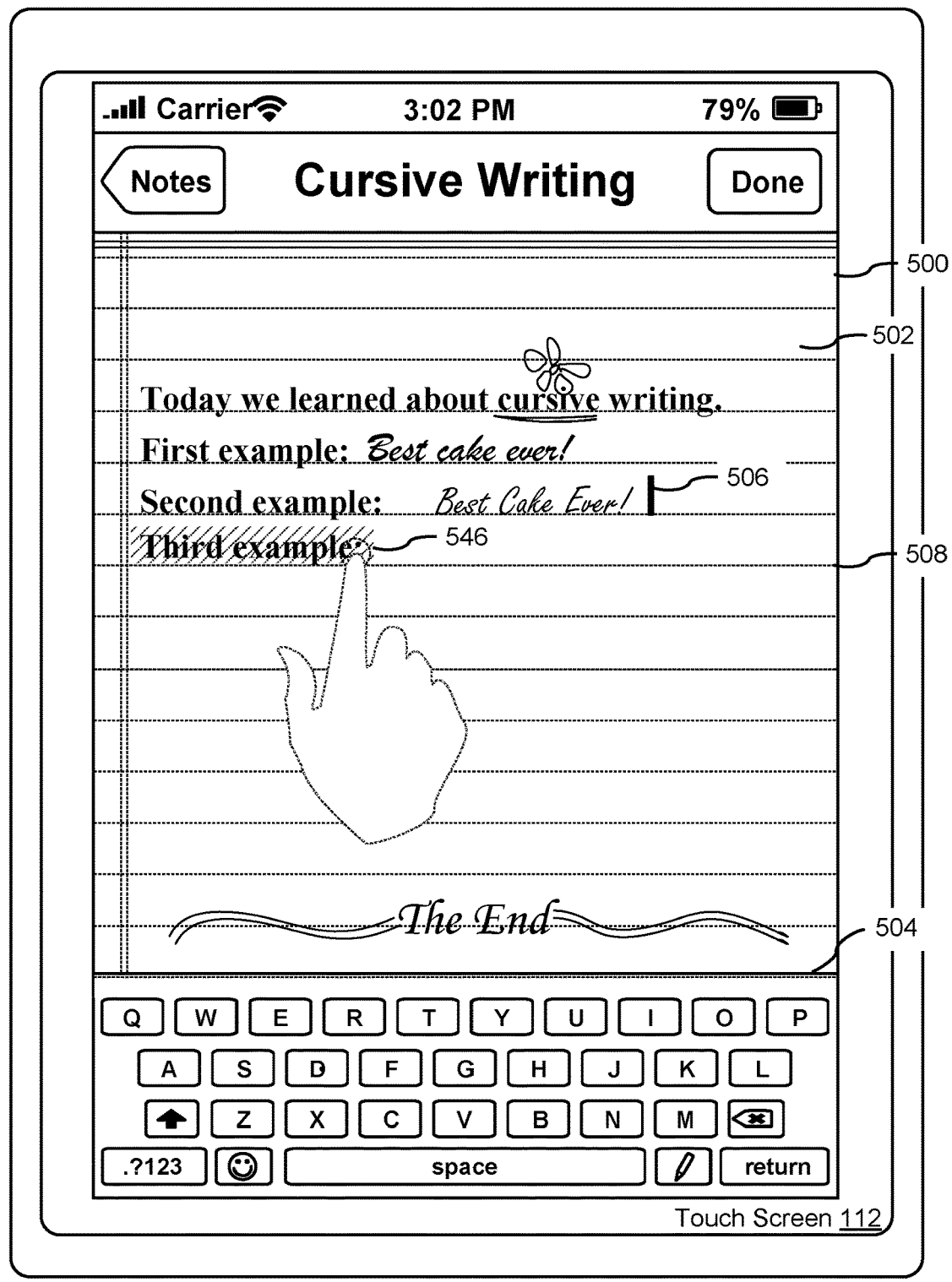

FIGS. 5R-5S illustrate that the device has entered a keyboard input mode (e.g., in response to selection of text input button 544 in FIG. 5R). When the device has entered the keyboard input mode, insertion cursor 506 is displayed, and positioned at the end of the last input (e.g., after the handwritten word block "Ever!"), as shown in FIG. 5S.

Figure 5T:
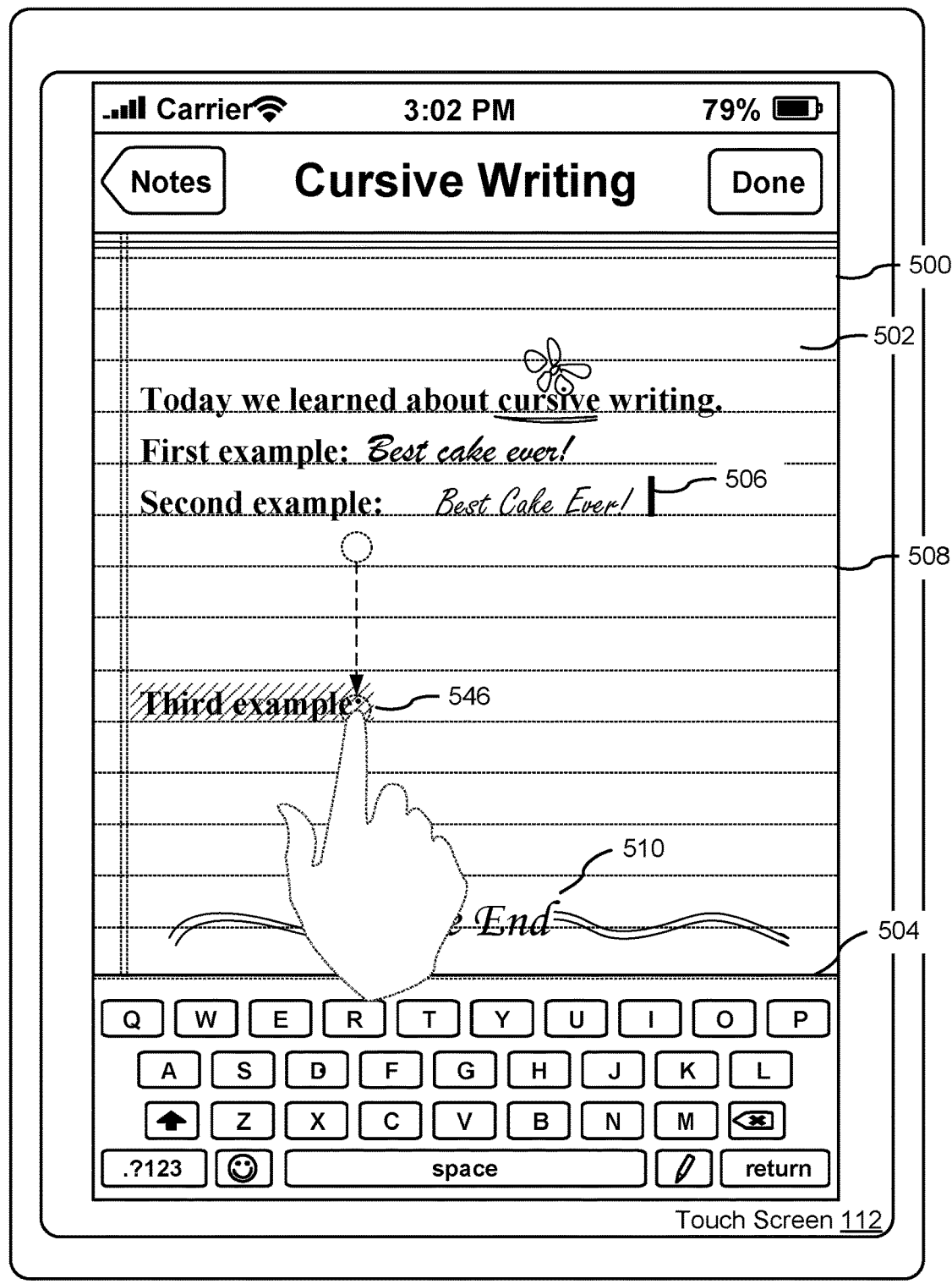

FIGS. 5S-5T illustrate that, the user can select (e.g., via a long press to bring up a selection loupe at the desired selection location, followed movement of the contact to expand the selection) typed text 546 (e.g., "Third example:") and drag (e.g., via another press input on the selection, followed by movement of the contact to drag) the selected typed text 546 from one location to another location on the document page (e.g., note page 502). In some embodiments, as shown in FIG. 5T, the selected text is dragged downward (e.g., in the vertical writing direction) across several lines. In some embodiments, dragging a selected object (e.g., typed text, handwritten word block(s), or a sketch) from a first location to a second location does not push other objects or text below the second location, as long as there is sufficient amount of unoccupied space between the second location and the other objects or text to accommodate the selected object at the second location. For example, as shown in FIG. 5T, handwritten text 510 is not pushed or reflown as a result of the movement of typed text 546. In some embodiments, dragging a selected object in the vertical direction (e.g., the direction perpendicular to the horizontal writing direction) signals to the device that only move of the selected object is to be triggered, and reflow of text is not to be triggered. In some embodiments, as long as an initial portion of the drag input includes a vertical movement component, content-move criteria is satisfied, and content-reflow is disabled for the drag input.

Figure 5U:
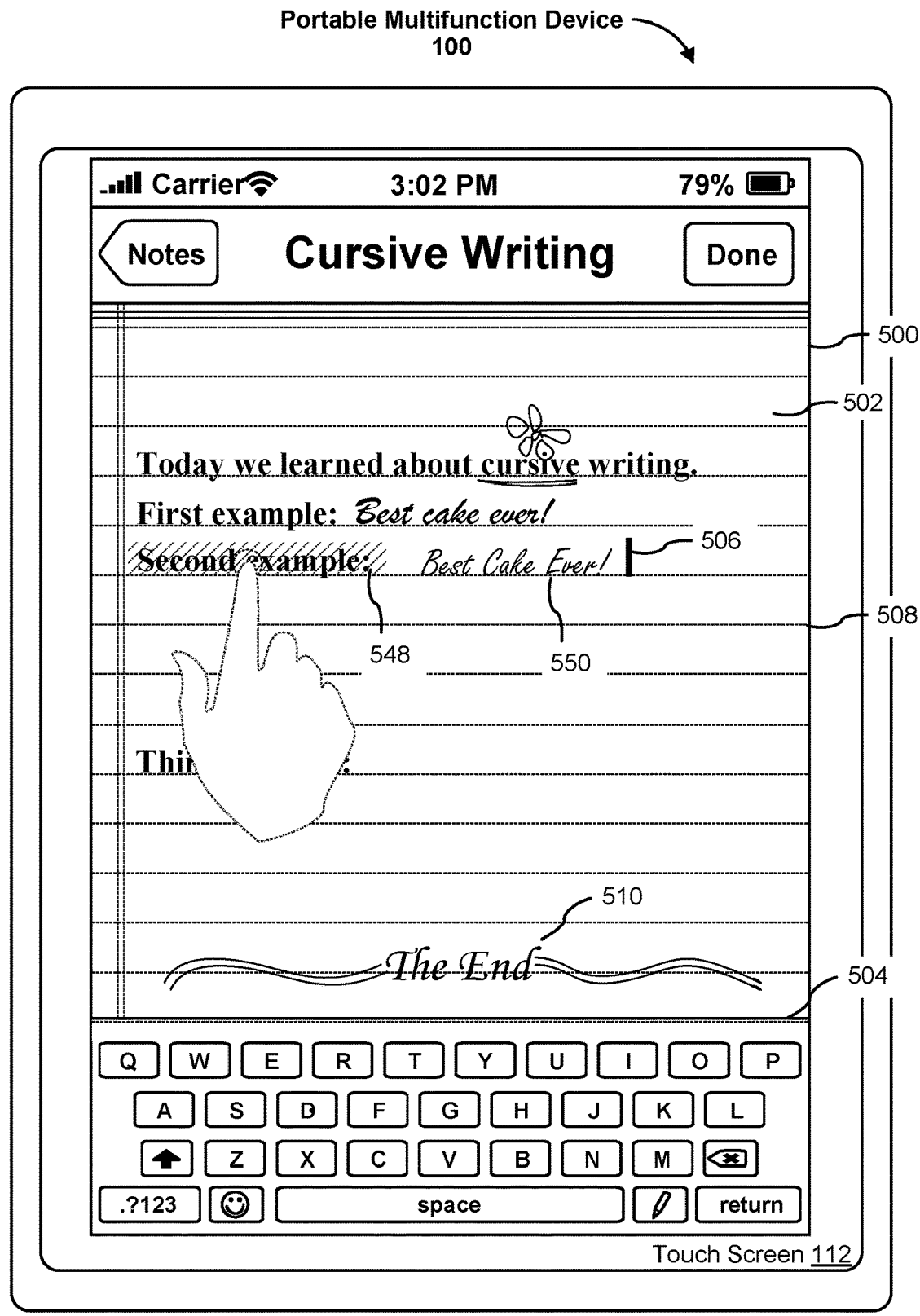

FIG. 5U illustrate that the user has selected (e.g., via a long press to bring up a selection loupe at the desired selection location, followed by movement of the contact to expand the selection) typed text 548 (e.g., "Second example:").

FIGS. 5V-5Z illustrate a process in which the user has dragged selected typed text 548 horizontally in the writing direction, and caused selected typed text 548 as well as handwritten word blocks following selected typed text 548 to be pushed horizontally in the writing direction and reflown into the next line.

Figure 5V:
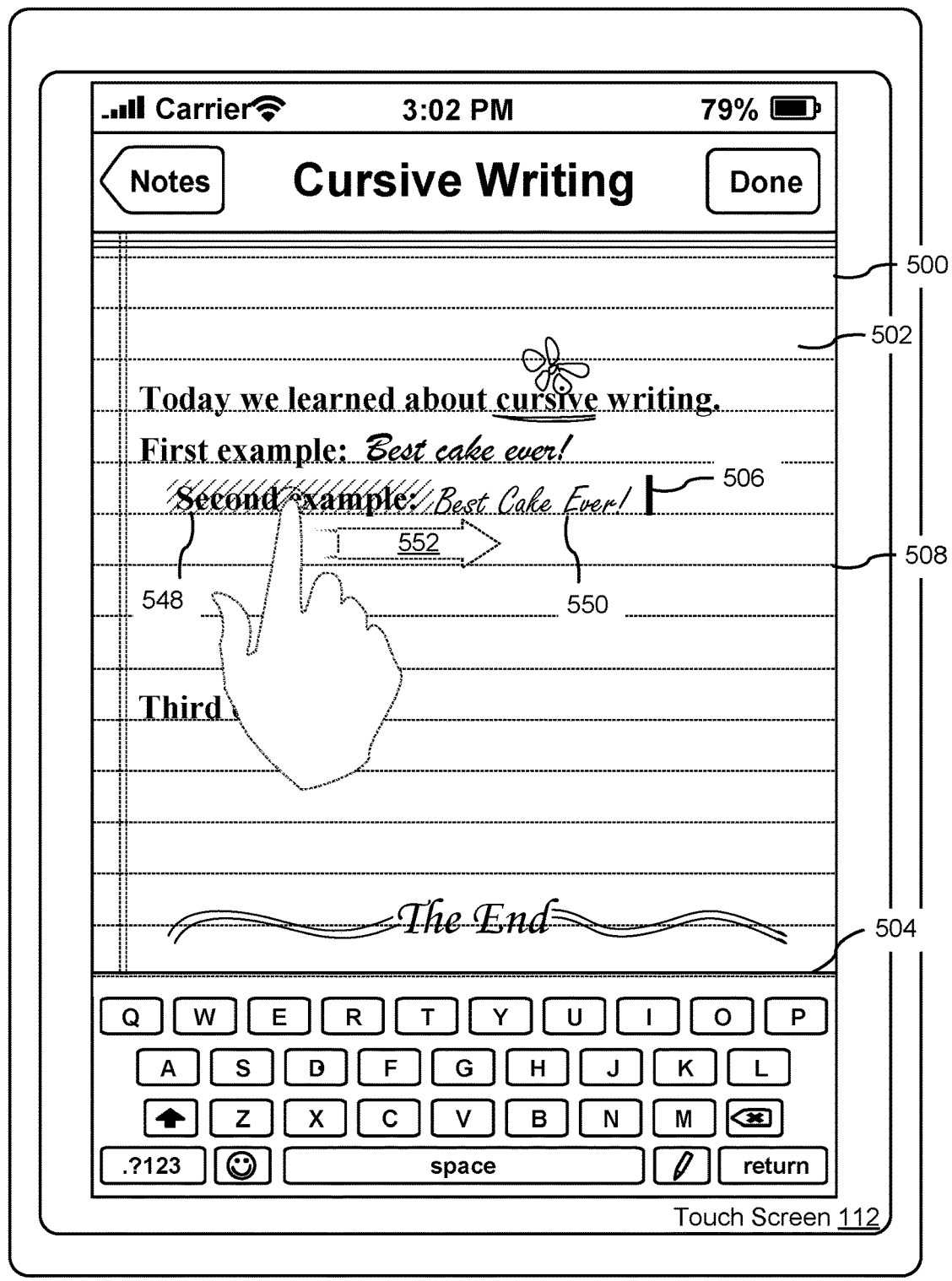

As shown in FIG. 5V, while selected typed text 548 is highlighted (to indicate its "selected" state), a drag gesture (e.g., drag gesture 552) is detected on selected typed text 548 (e.g., via a contact on selected typed text 548 followed by horizontal movement of the contact in the writing direction). In response to the drag gesture in the writing direction, selected typed text 548 moves in the writing direction in accordance with the movement of the contact of drag gesture 552. FIG. 5V shows that the unoccupied space between selected typed text 548 and handwritten word blocks 550 following selected typed text 548 is reduced as a result of the movement of selected typed text 548.

Figure 5W:
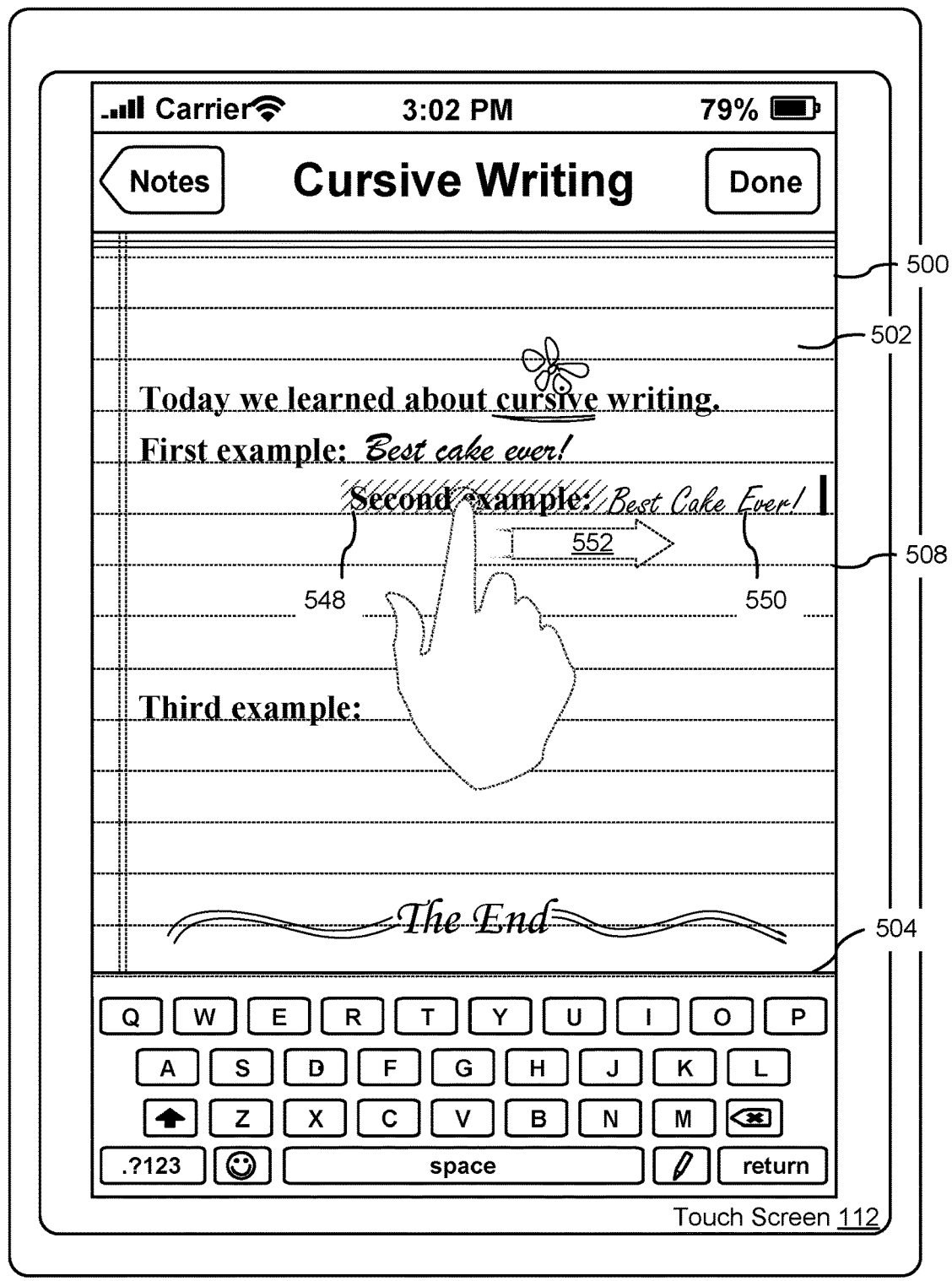

In FIG. 5W, as selected typed text 548 is dragged further along in the writing direction, handwritten word blocks 550 is pushed further along in the writing direction as well (and there is no more unoccupied space between selected typed text 548 and handwritten word blocks 550).

Figure 5X:
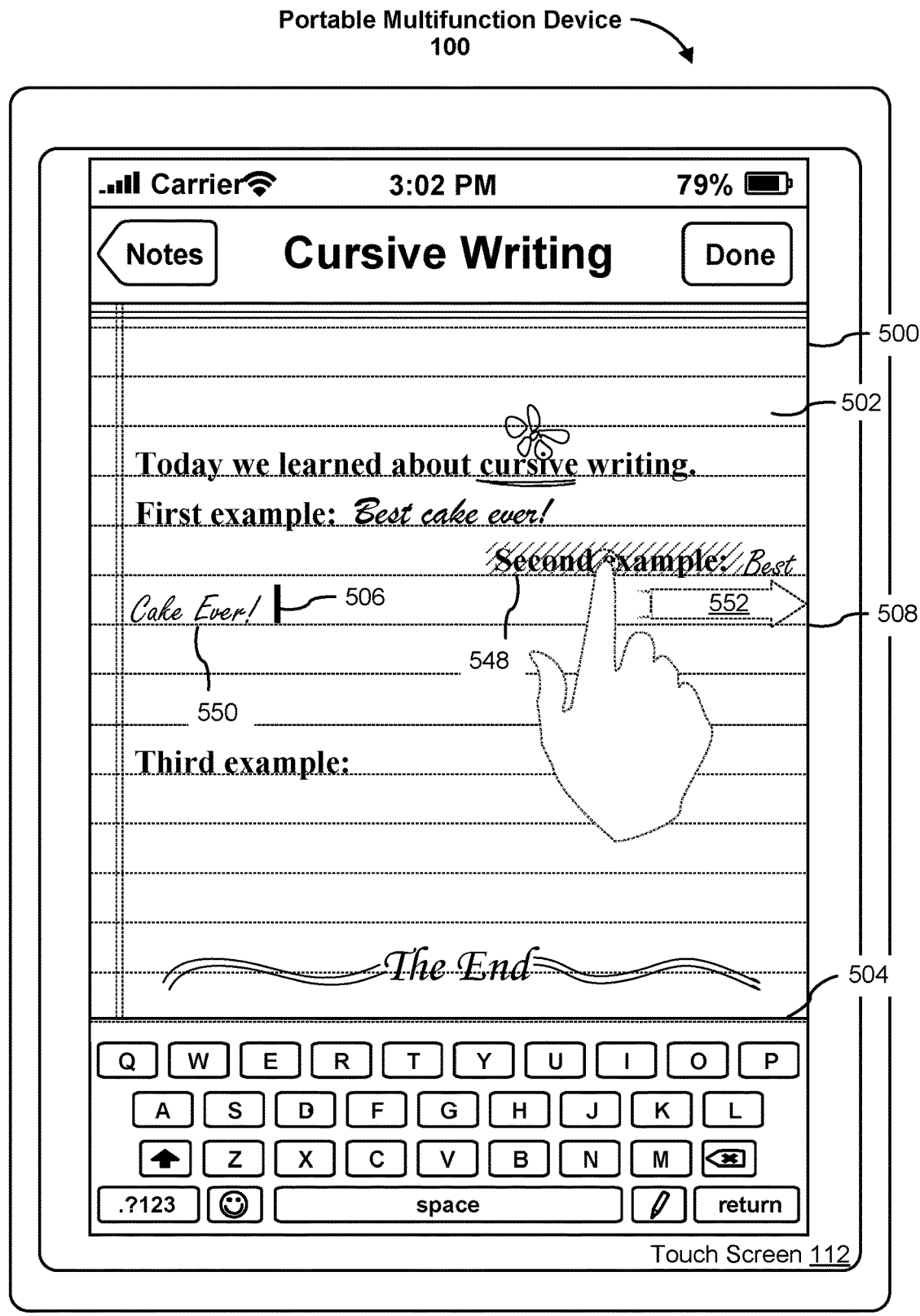

In FIG. 5X, as selected typed text 548 is dragged further along in the writing direction, and the remaining space in the current line can no longer accommodate the entirety of handwritten word blocks 550, handwritten word blocks 550 are wrapped around with portions (e.g., "Cake" and "Ever!") being pushed into the next line.

Figure 5Y:
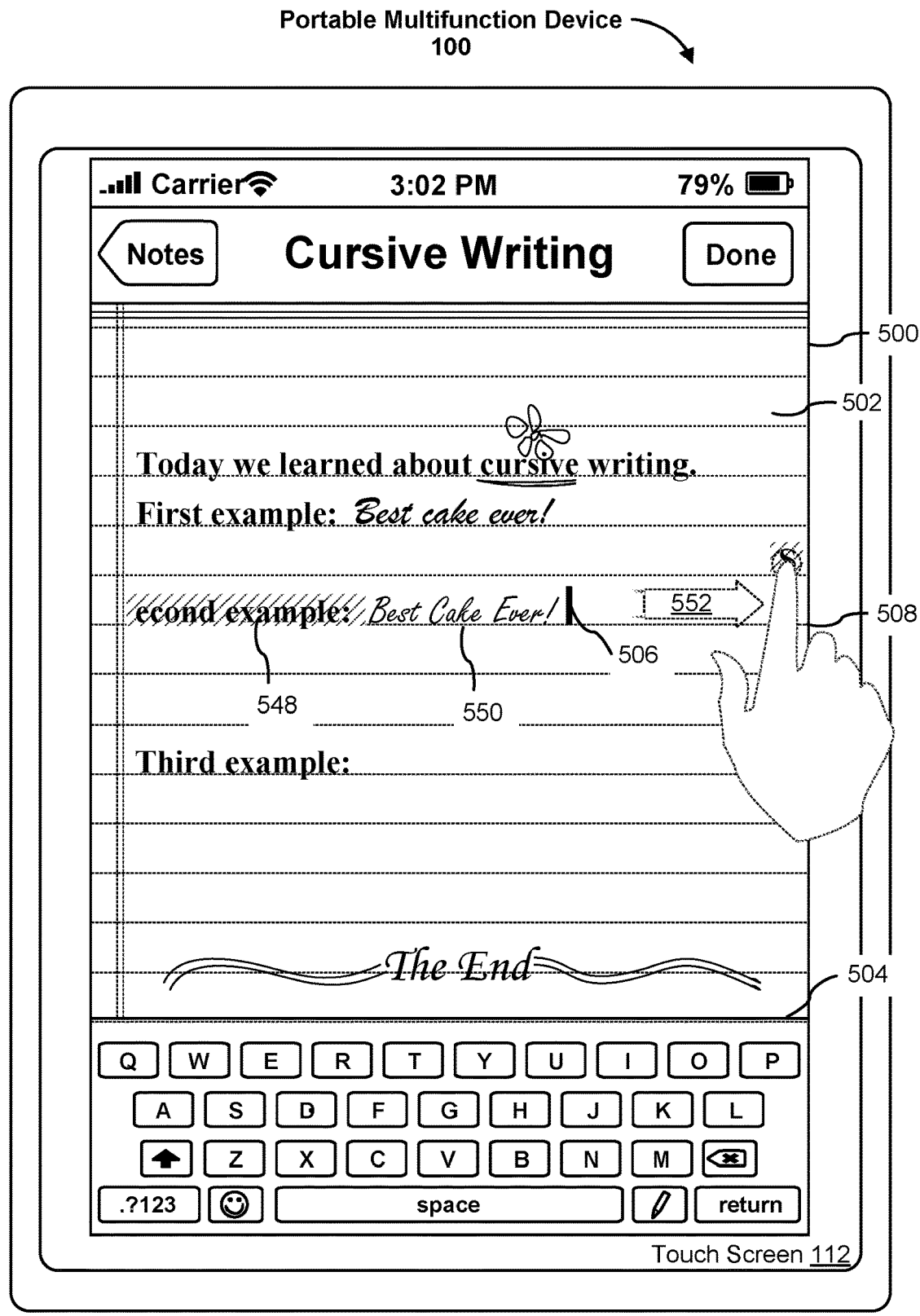

In FIG. 5Y, as selected typed text 548 is dragged further along in the writing direction, and the remaining space in the current line can no longer accommodate the entirety of selected typed text 548, selected typed text 548 is wrapped around with portions (e.g., "econd example") being pushed into the next line, and handwritten word blocks 550 are already completely pushed into the next line.

Figure 5Z:
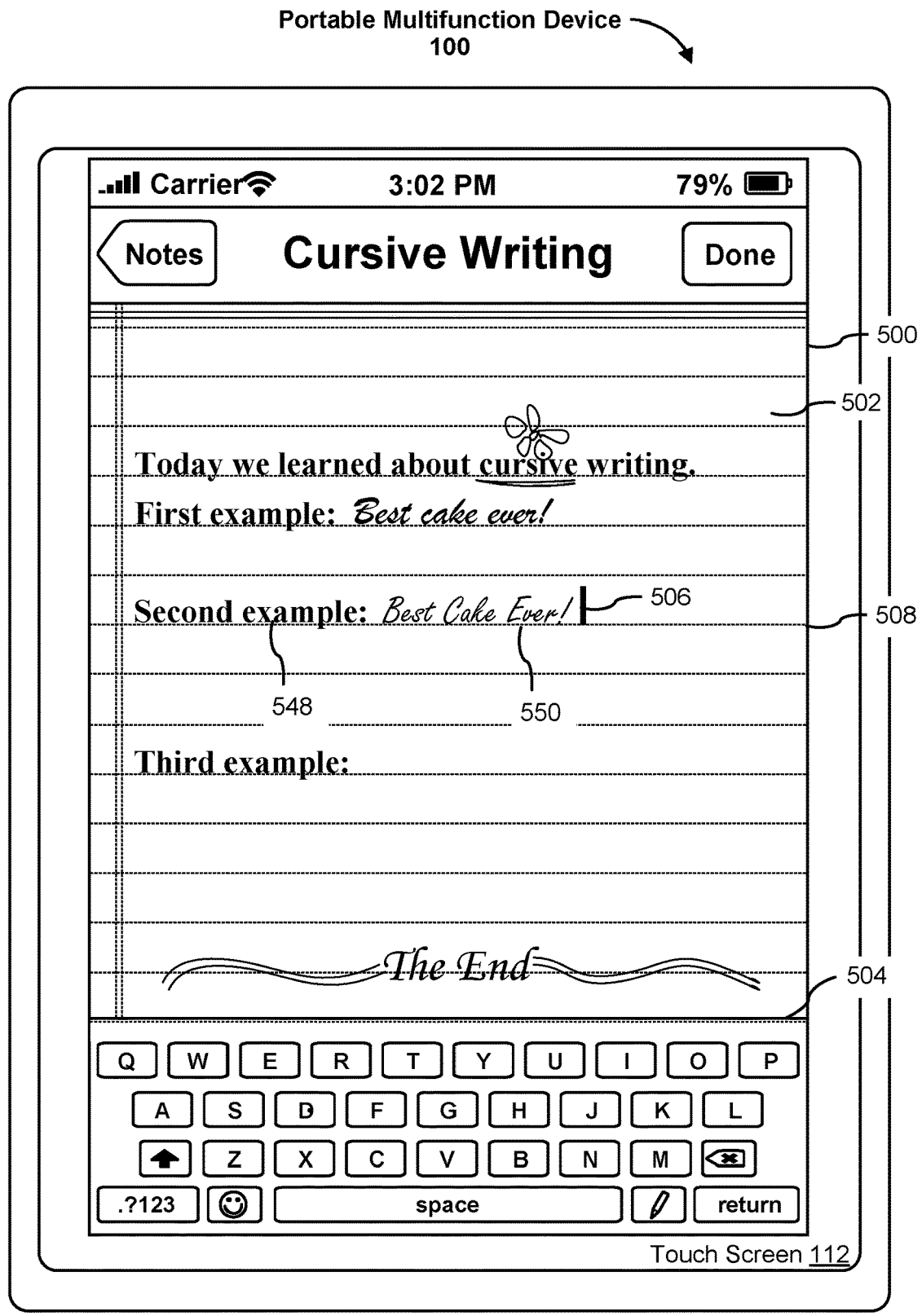
Figure 5A:
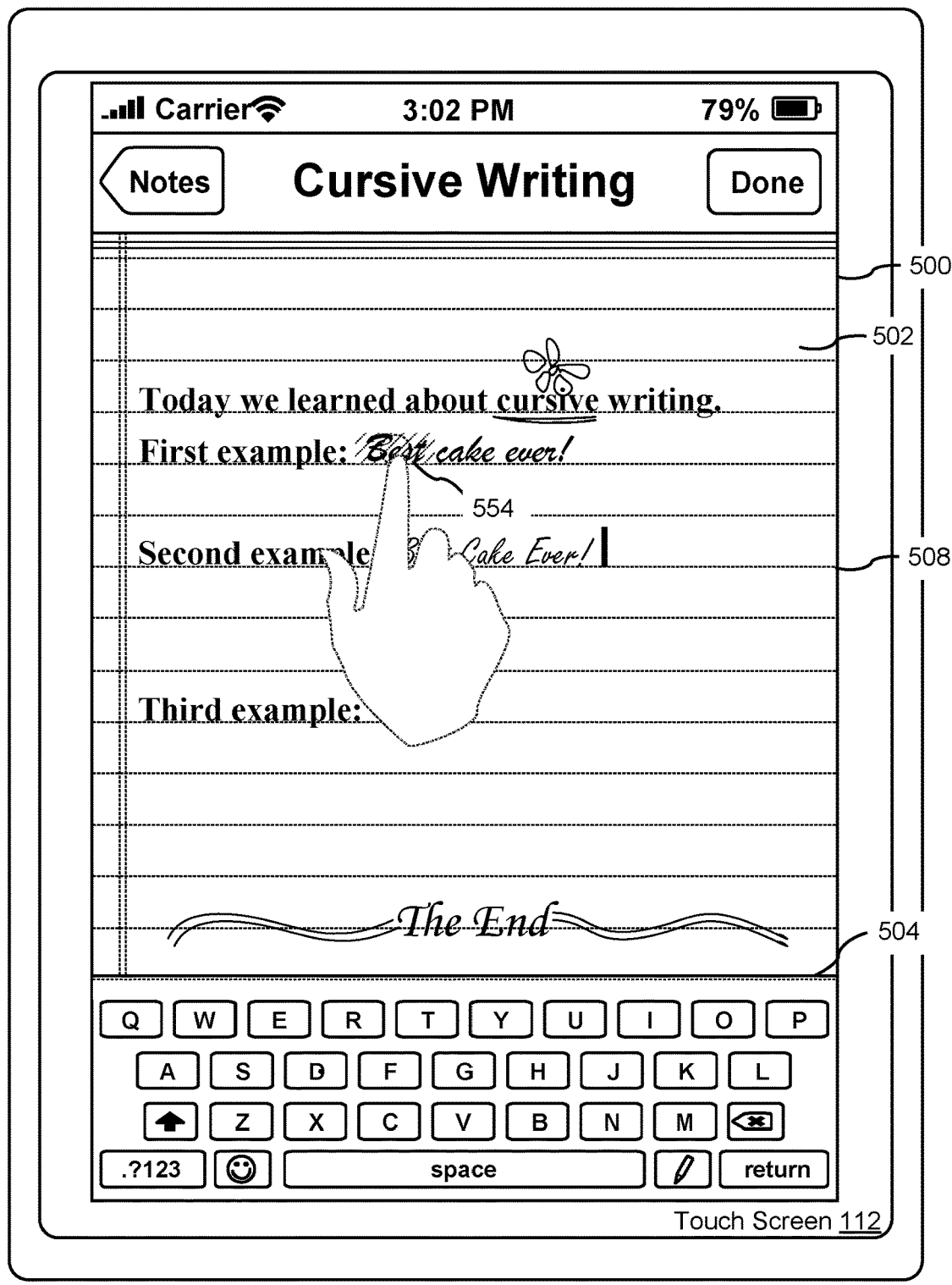
Figure 5A:
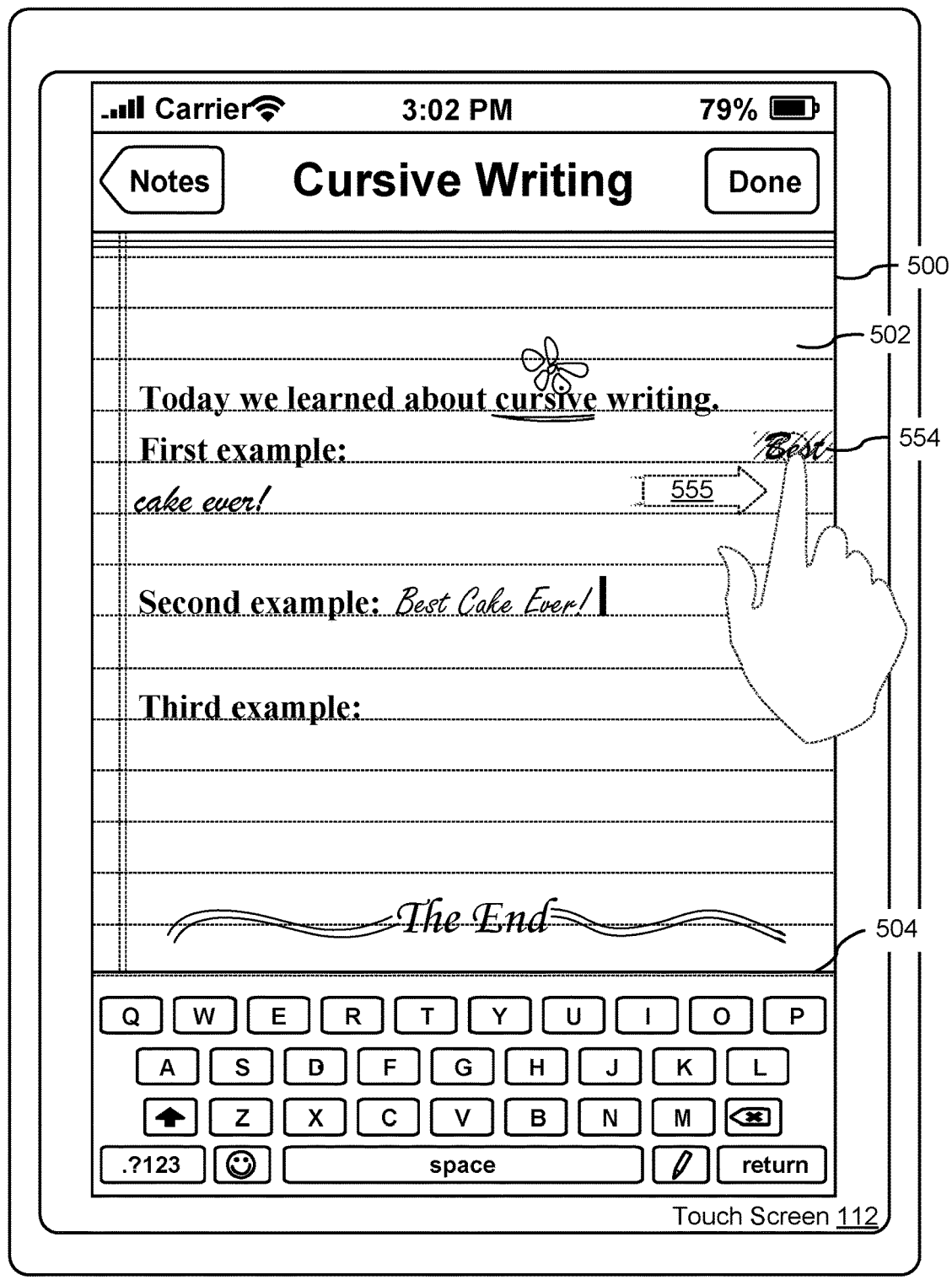
Figure 5A:
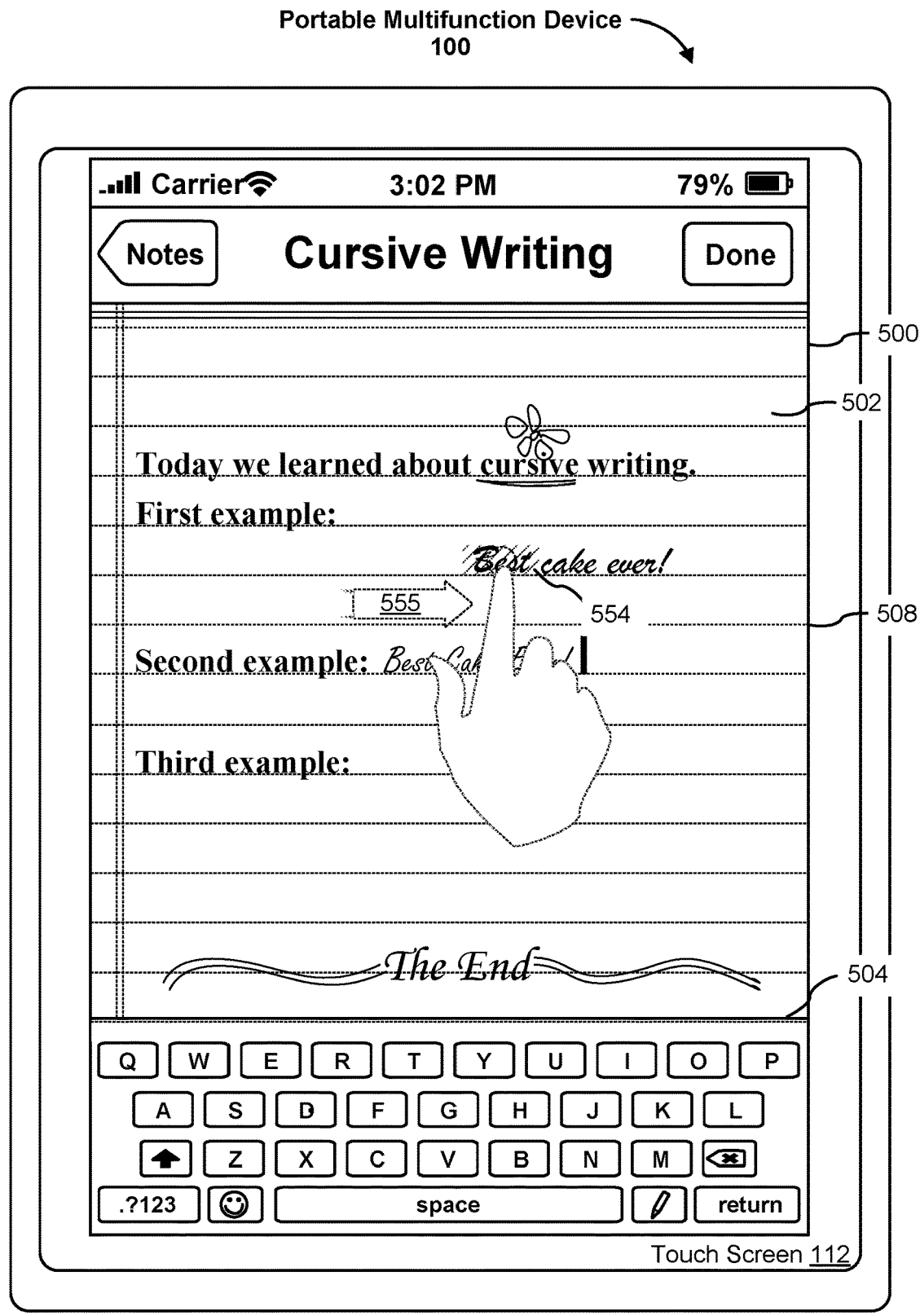
Figure 5A:
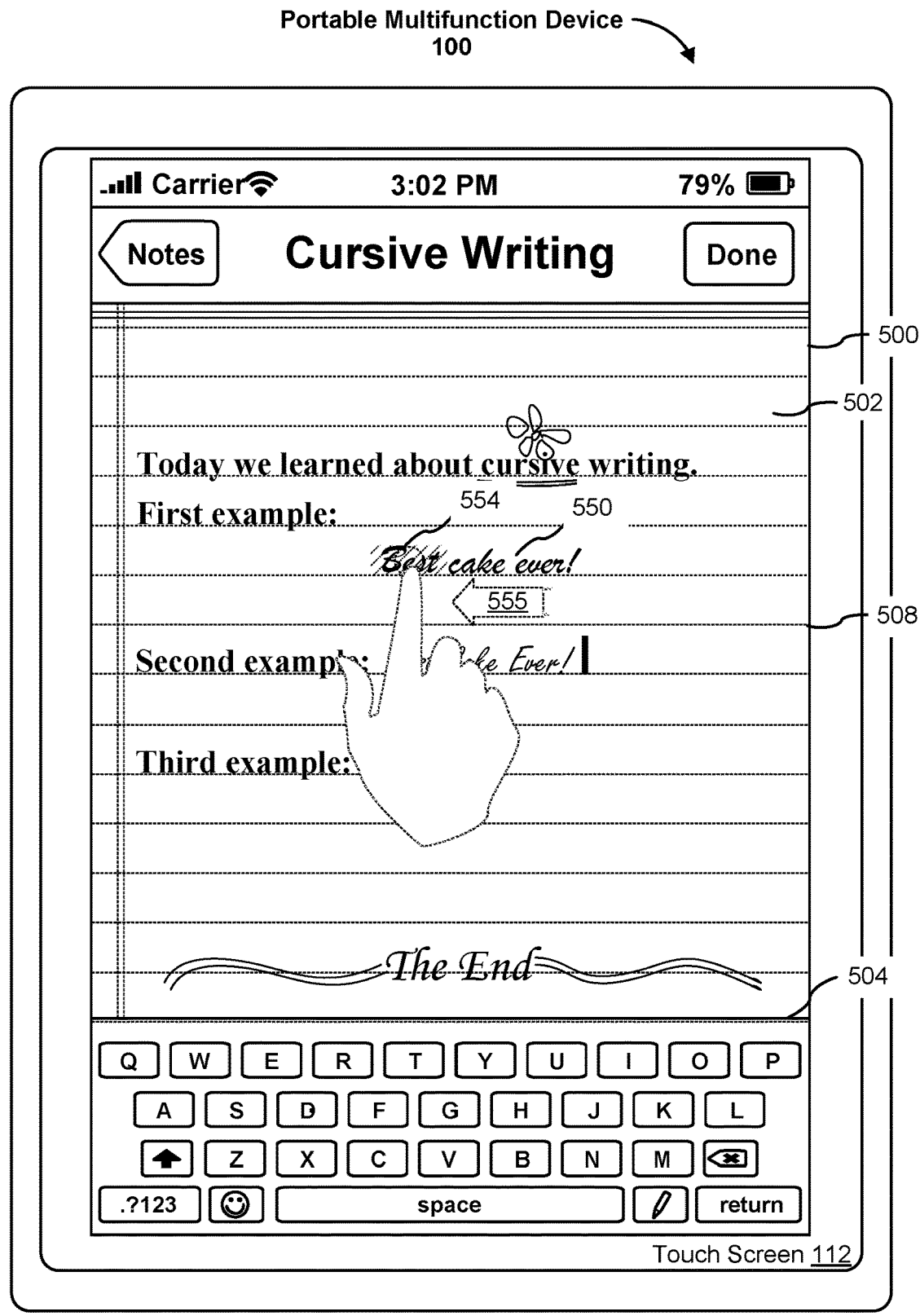
Figure 5A:
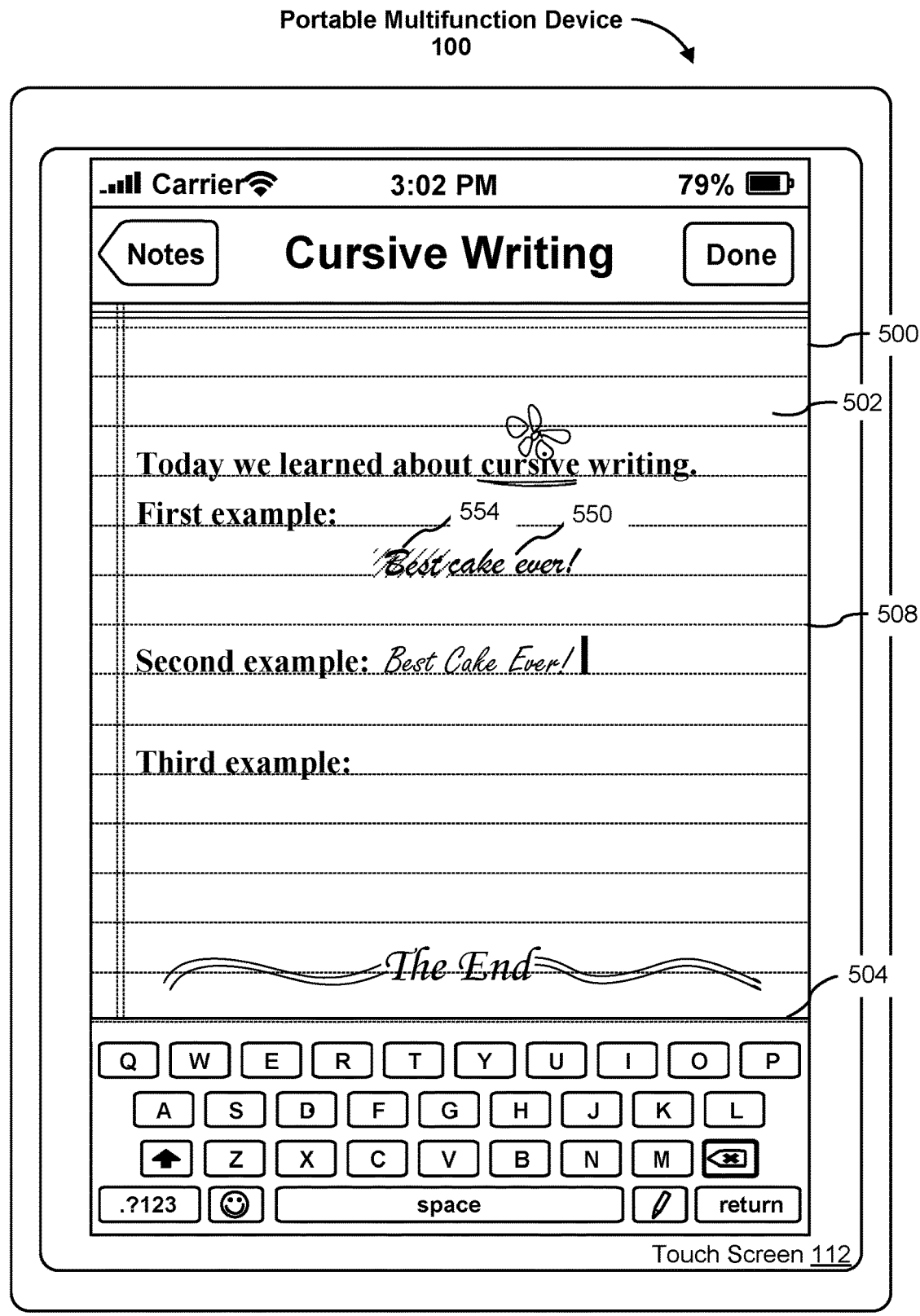
Figure 5A:
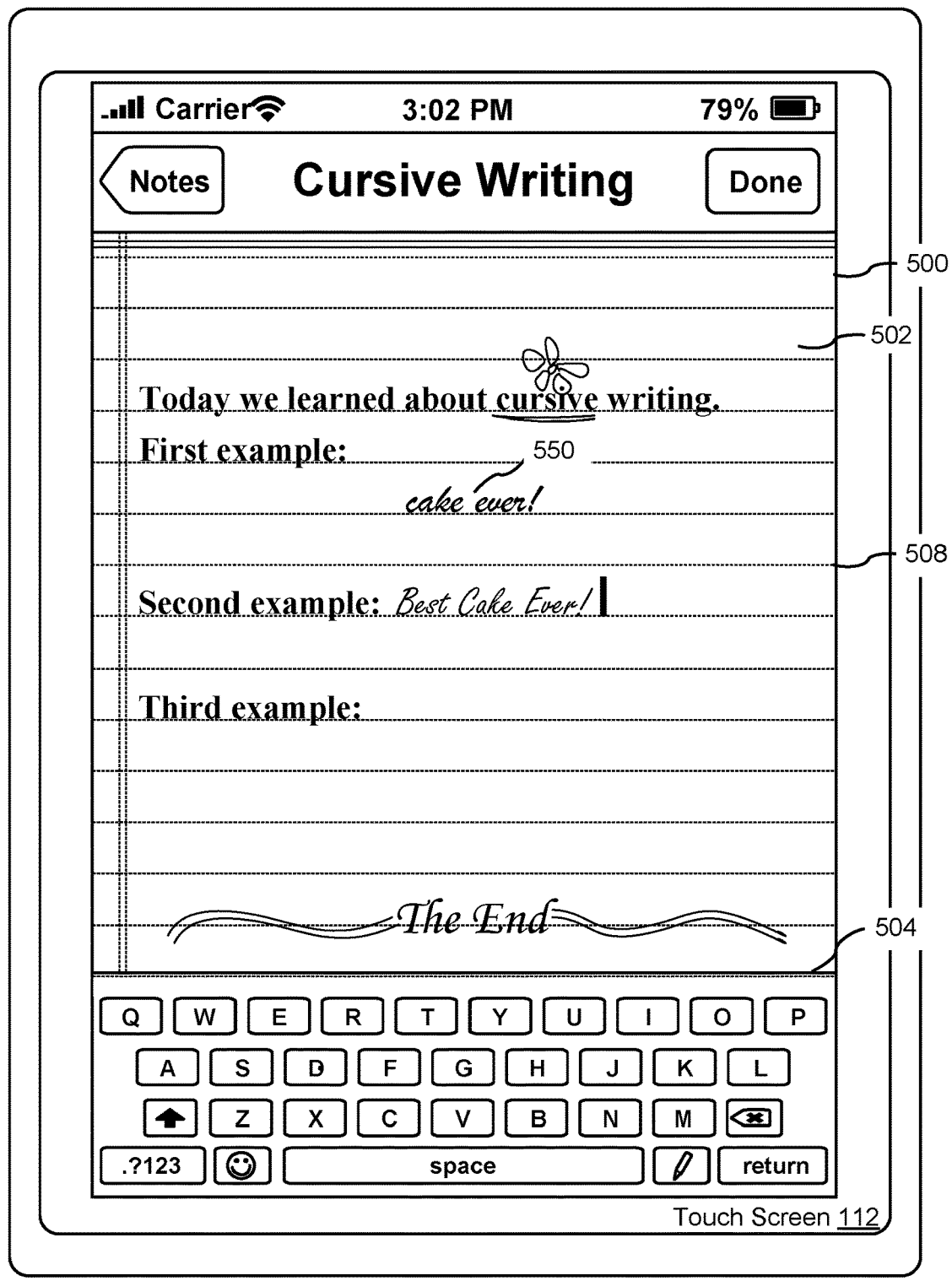
Figure 5A:
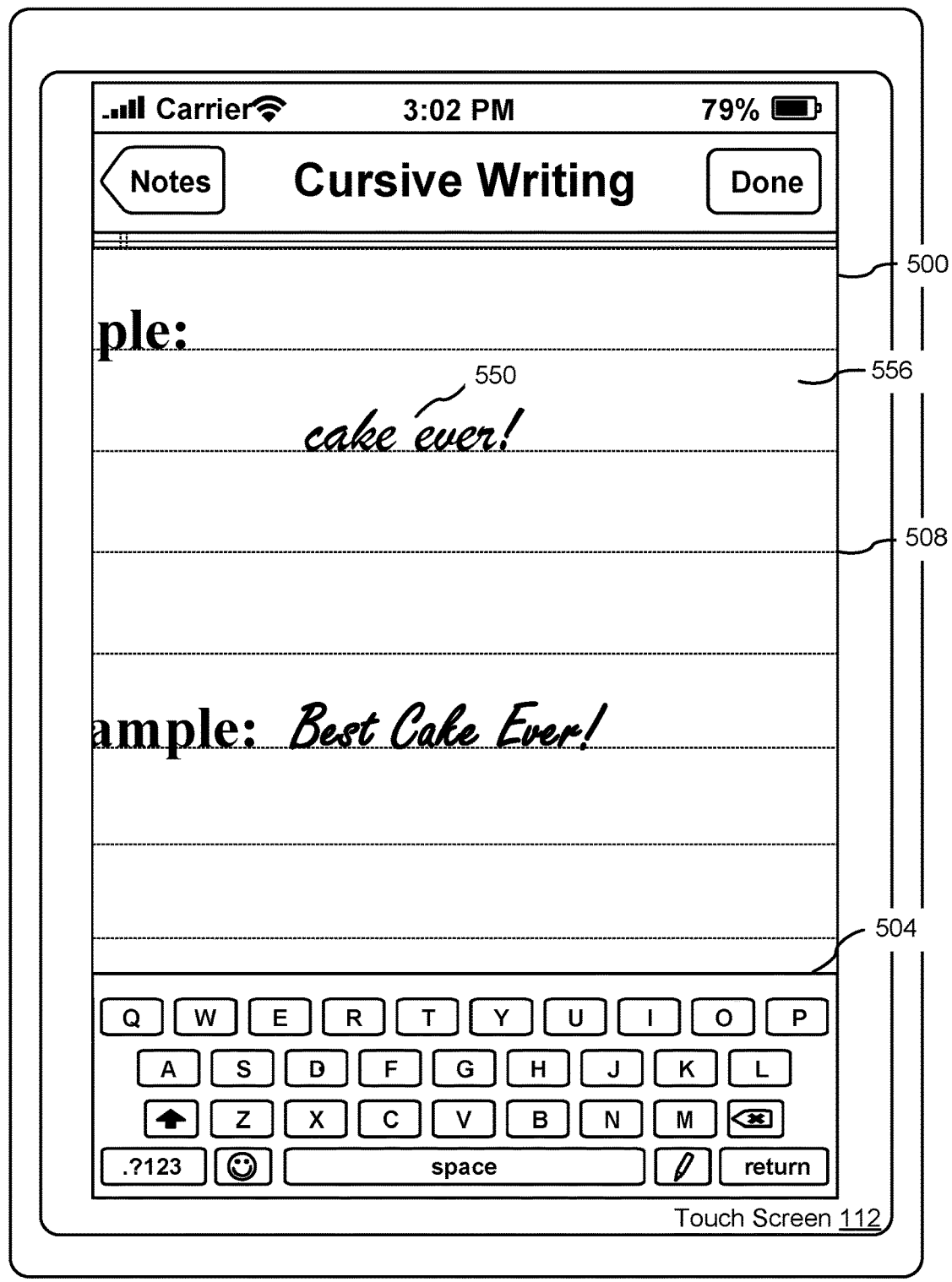
Figure 5A:
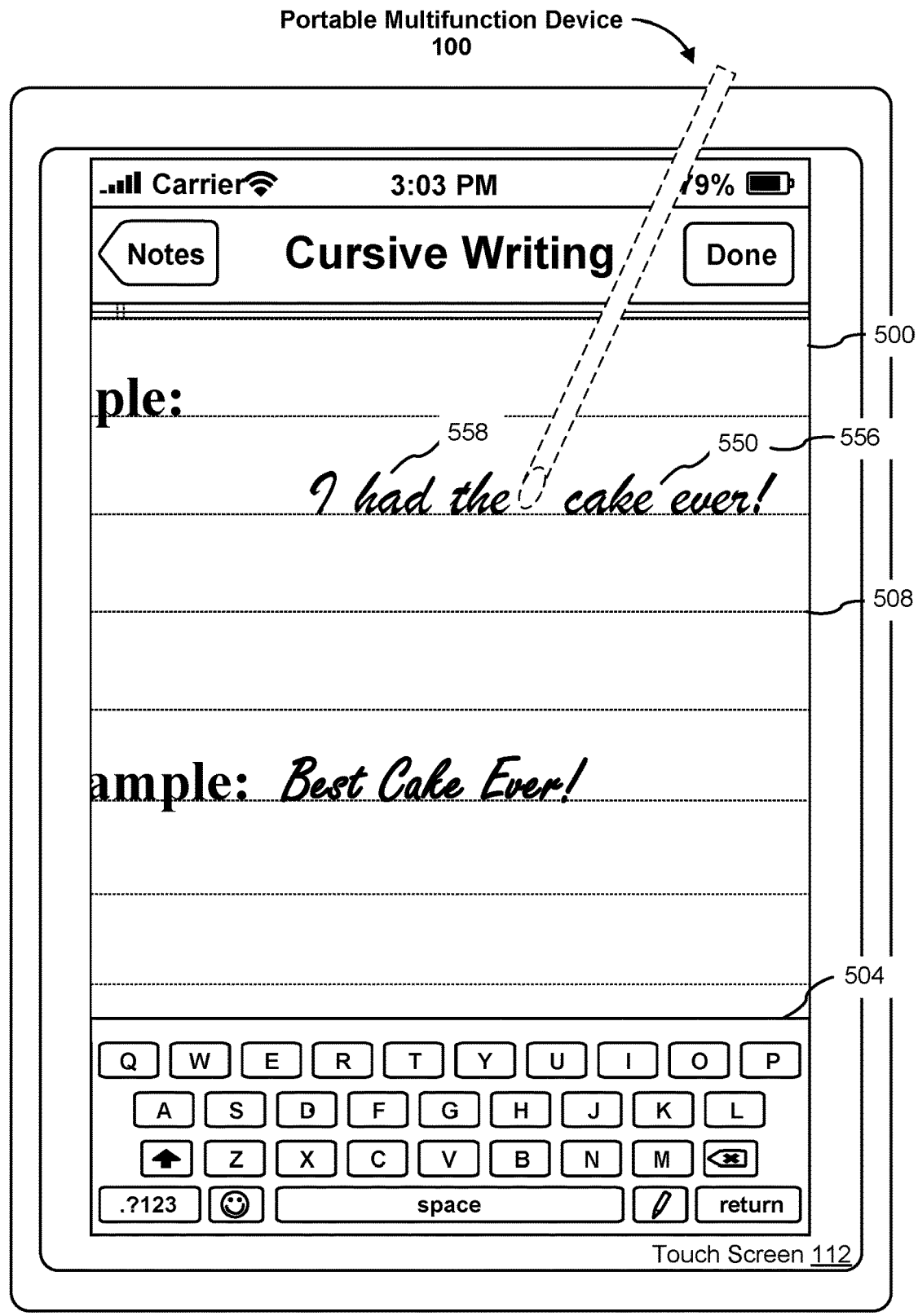
Figure 5A:
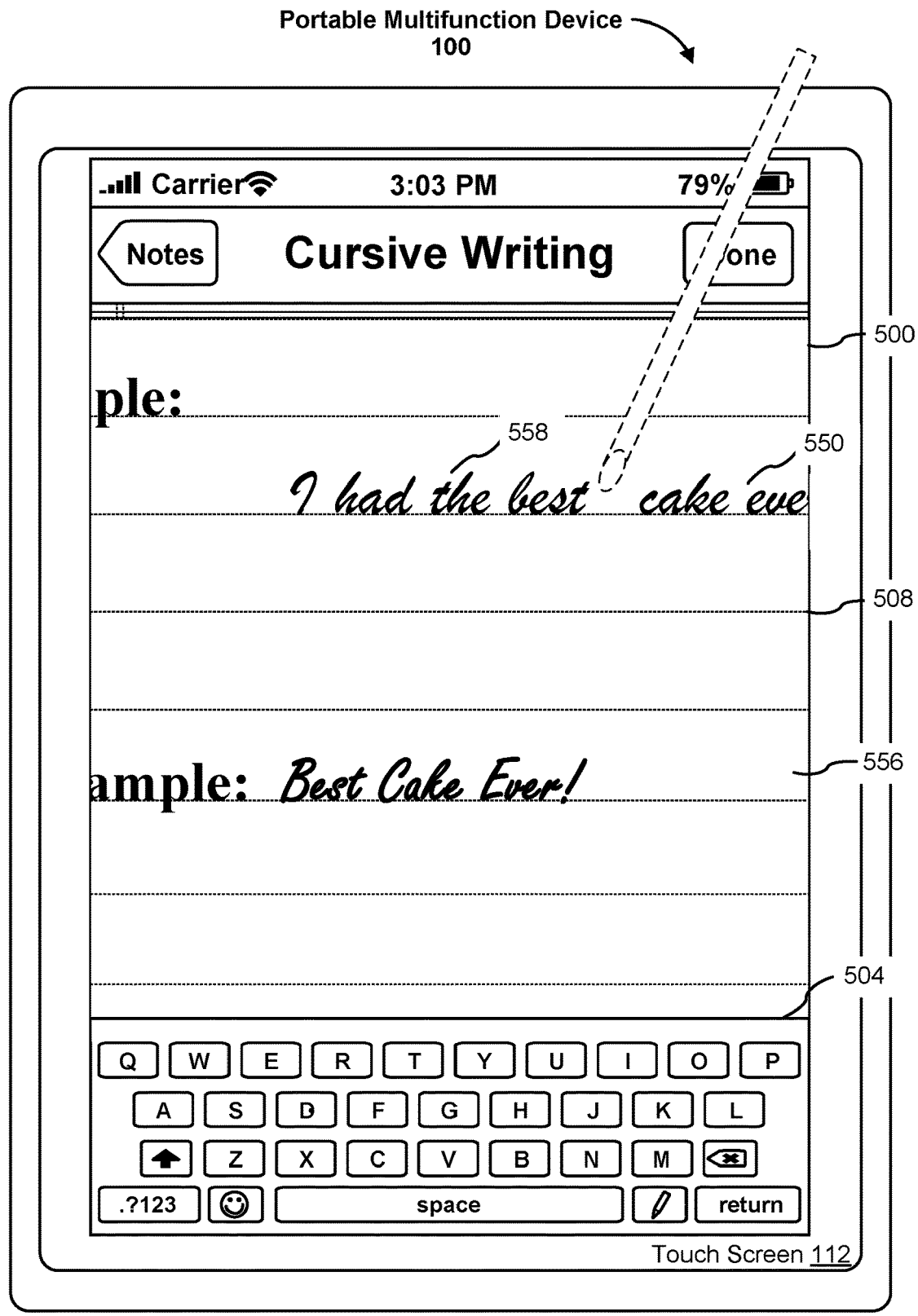
Figure 5A:
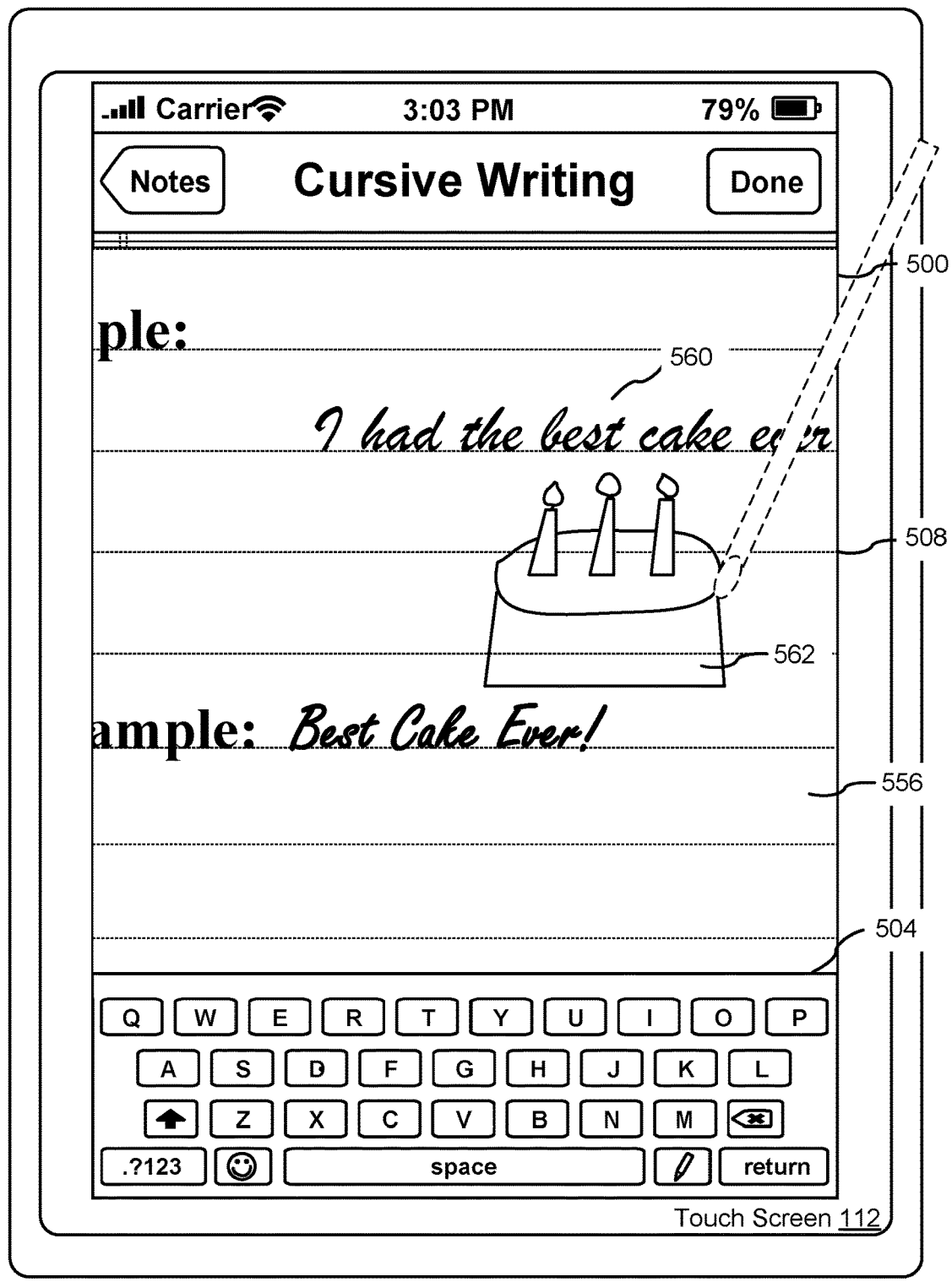
Figure 5A:
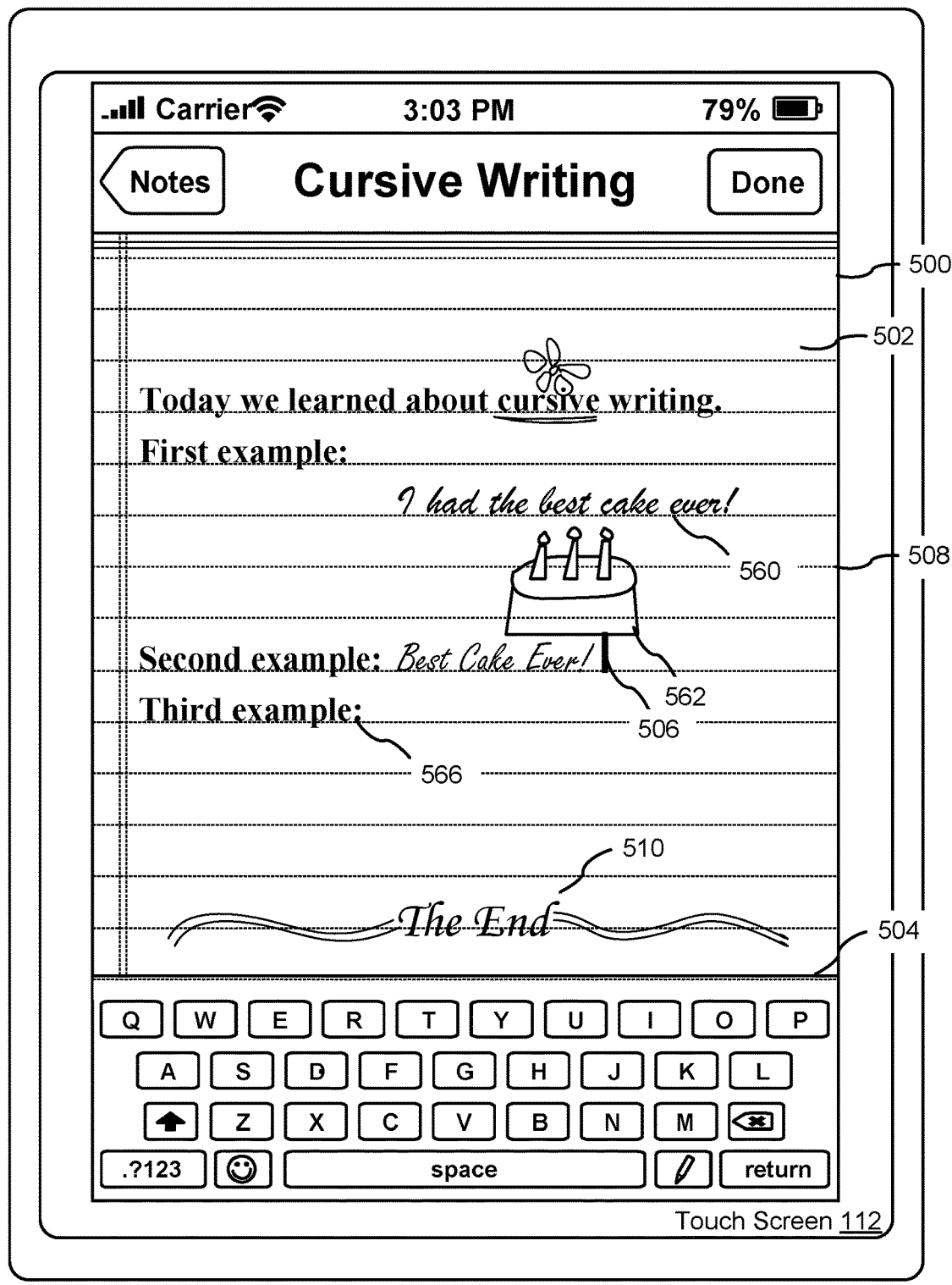
Figure 5A:
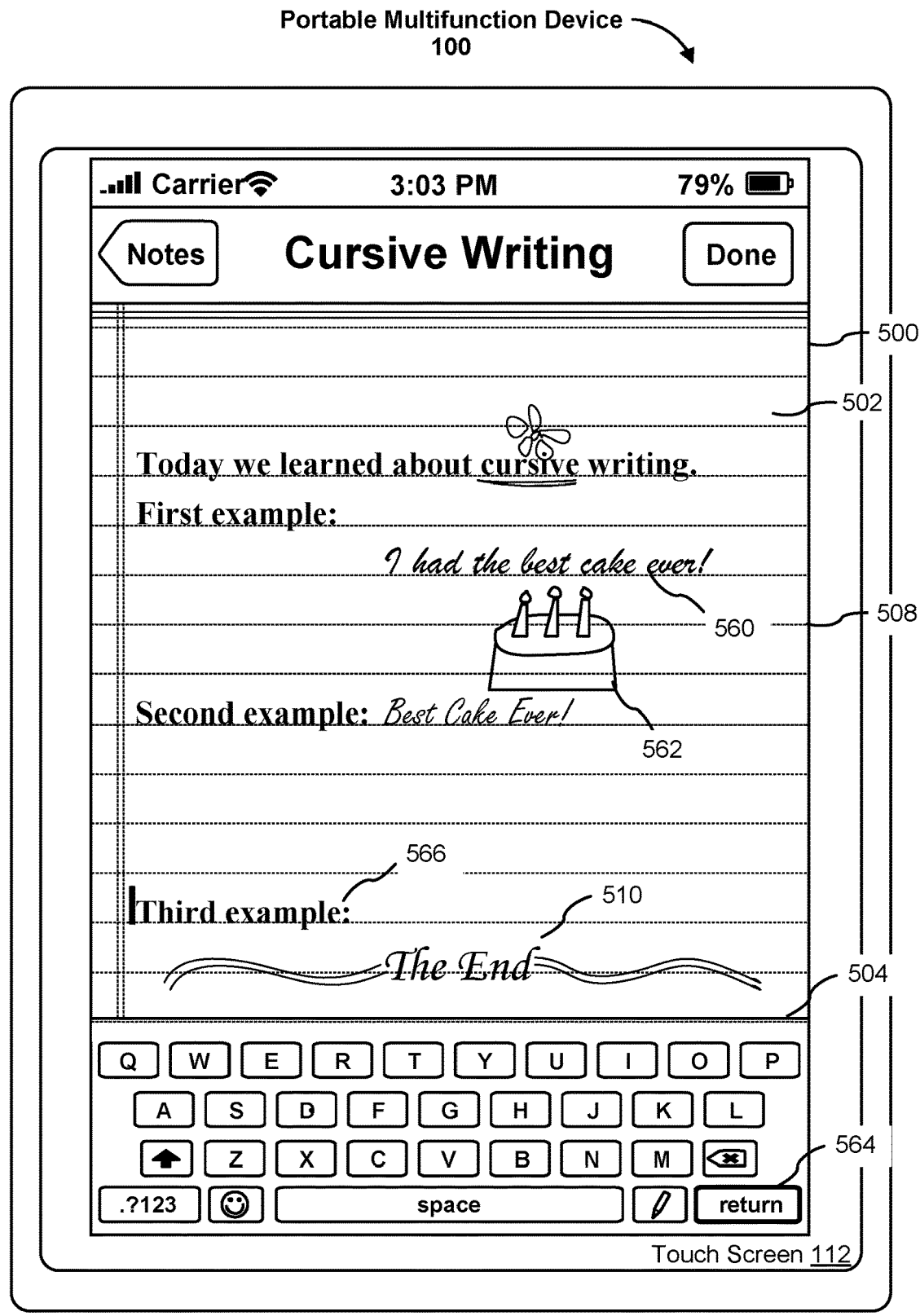
Figure 5A:
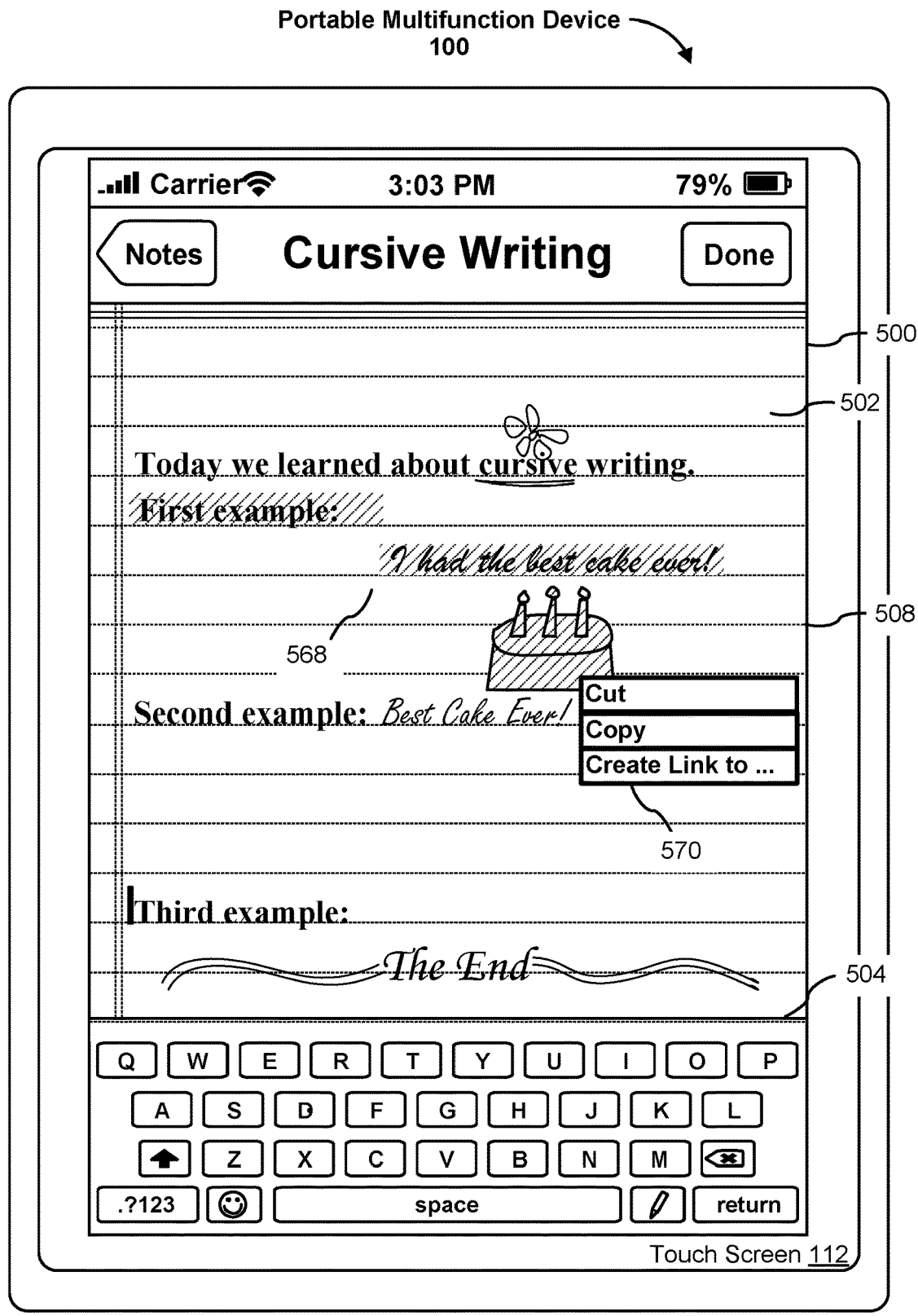
Figure 5A:
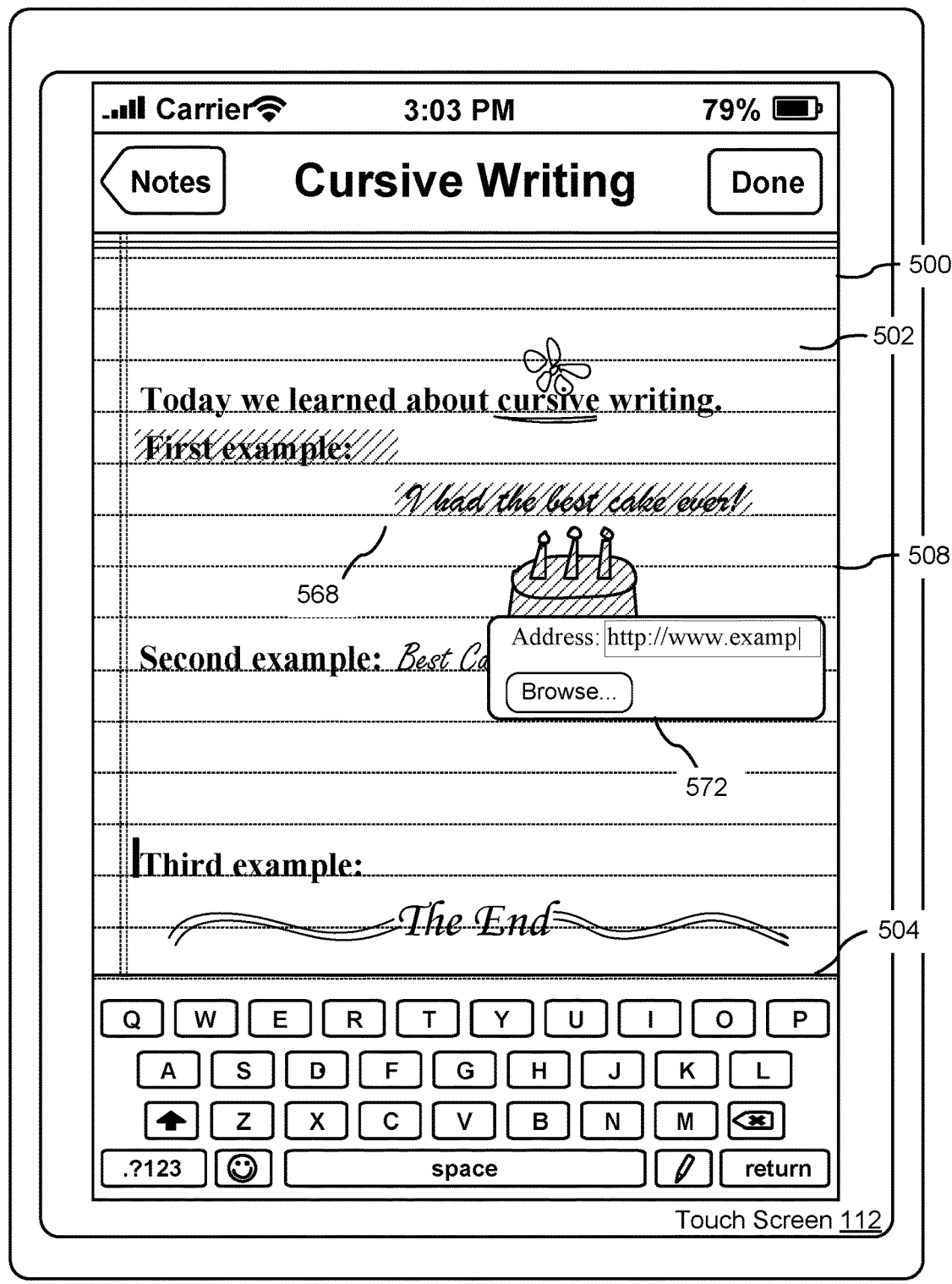
Figure 5A:
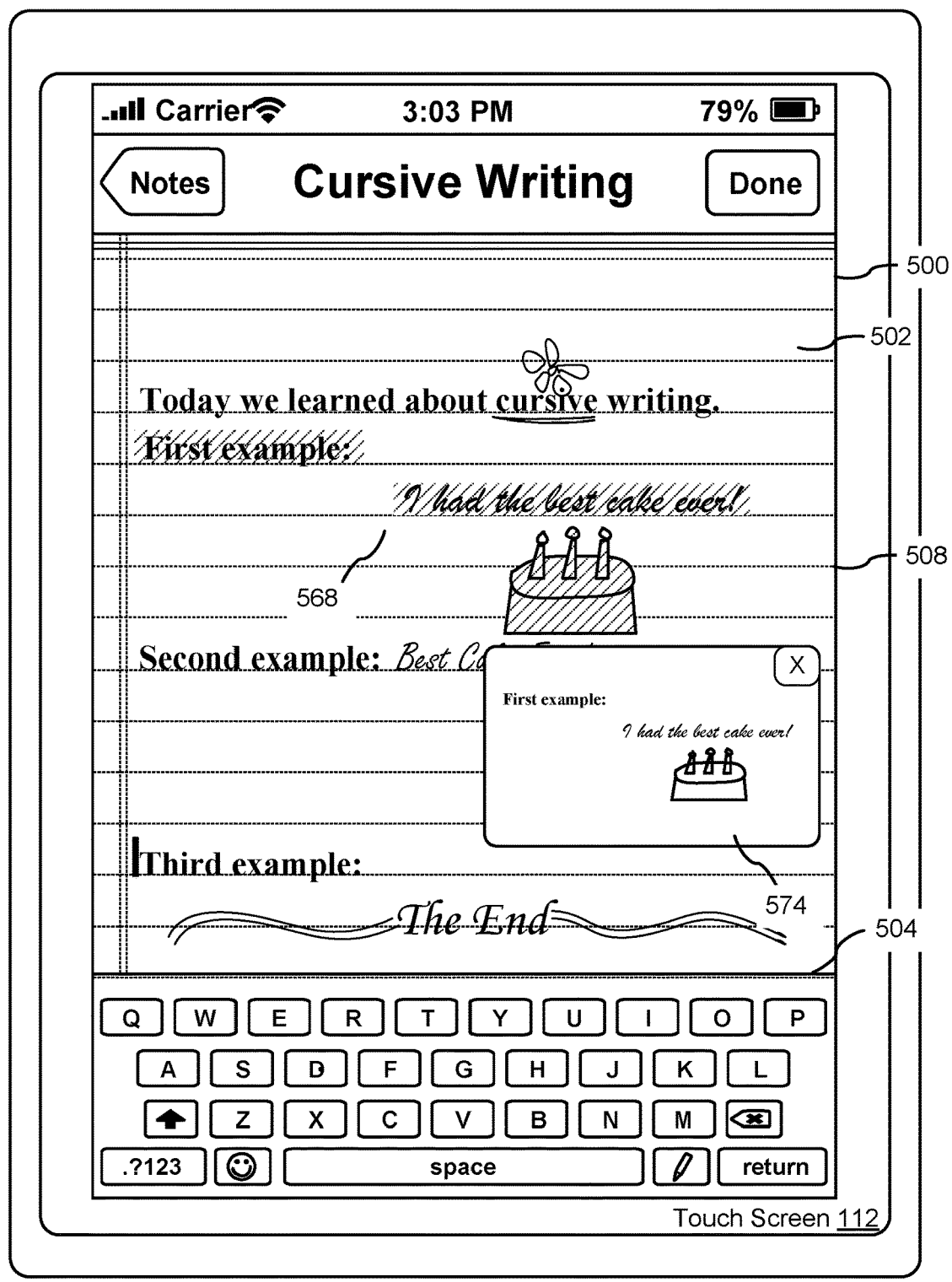
Figure 6A:
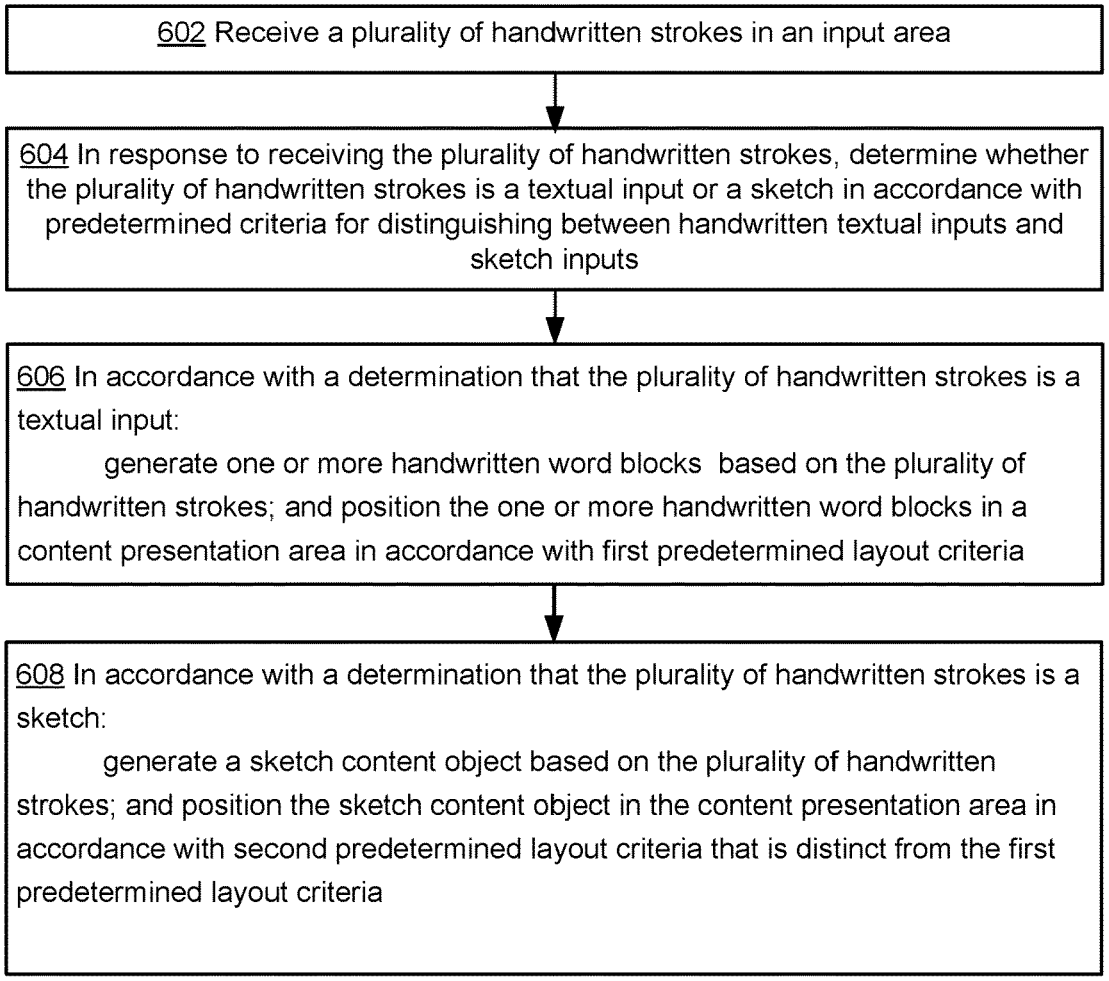

FIG. 5Z shows that, at the end of drag gesture 552, selected typed text 548 and handwritten word blocks 550 are both located in the next line, even though the contact remained within the line above (e.g., substantially no vertical movement of the contact) during the entirety of drag gesture 552. In addition, the relative order of typed text 548 and handwritten word blocks have been maintained during the drag gesture and at the end of the drag gesture. In some embodiments, insertion cursor 506 that is located after handwritten word blocks 550 is also pushed along with handwritten word blocks 550 during the drag gesture.

In some embodiments, if drag gesture continues but reverse the movement direction (e.g., the contact moves horizontally from right to left, while the contact is maintained on the selected typed text 548), the movement and reflow of typed text 548 and handwritten word blocks is reversed in direction, until the drag gesture is terminated.

FIG. 5AA illustrate that the user has selected (e.g., via a long press to bring up the selection loupe at the desired selection location) handwritten word block 554 (e.g., "Best"). FIGS. 5AB-5AC illustrate a process in which the user has dragged (e.g., with drag gesture 555) selected handwritten word block 554 (e.g., "Best") horizontally in the writing direction, and caused handwritten word blocks (e.g., "cake ever!") following selected word block 554 (e.g., "Best") to be pushed horizontally in the writing direction and reflown into the next line. In FIG. 5AC, handwritten word block 554 (e.g., "Best") continues to be dragged horizontally in the writing direction, and pushes the handwritten word blocks ("cake ever!") following selected word block 554 (e.g., "Best") further along in the writing direction.

FIG. 5AD illustrates that when the drag gesture (e.g., drag gesture 555) reverses its direction and drags handwritten word block 554 (e.g., "Best") horizontally in the reverse writing direction, handwritten word blocks ("cake ever!") also follows selected handwritten word block 554 and moves in the reverse writing direction. In some embodiments, handwritten word blocks 550 (e.g., "Best cake ever!") were treated as a group during a drag gesture on any part of handwritten word blocks 550 (e.g., during a drag gesture on handwritten word block 554 "Best") and therefore move horizontally with the drag gesture as a group, based on their temporal and/or spatial proximity to one another at a characteristic time (e.g., at the time of handwriting input to create the handwritten word blocks and/or at the time of the drag input).

In some embodiments (not shown in FIG. 5AD), when the drag gesture moves handwritten word blocks 550 horizontally in the reverse handwriting direction to a position next to the beginning of the current line, handwritten word blocks 550 wrap around with portions being pushed up to the end of the previous line. When the contact of the drag gesture reaches the beginning of the current line, handwritten word blocks 550 is pushed entirely to the end of the previous line. In some embodiments, if there is content (e.g., other handwritten word blocks, or typed characters) positioned next to handwritten word blocks 550 on the left, and as handwritten word blocks 550 is dragged horizontally in the reverse handwriting direction, handwritten word blocks 550 optionally pushes the content positioned adjacent to handwritten word blocks in the reverse handwriting direction as well.

FIGS. 5AE-5AF illustrate that selected handwritten word block 554 is deleted as a unit, and deletion of handwritten word block 554 causes the remaining word blocks in handwritten word block 550 to be shifted in the reverse handwriting direction. In this example, handwritten word blocks 550 are treated as a group, and the beginning position of the group used to accommodate handwritten word block 554 (e.g., "Best") before the deletion, and is now accommodating the remaining handwritten word blocks (e.g., "cake" and "ever!") in the group.

FIGS. 5AF-5AG illustrate a transition from an overview mode to a sketch mode of the notes application. In some embodiments, the overview mode is presented in an un-zoomed/unmagnified state (e.g., a full-width view, as shown in FIG. 5AF), and the sketch mode is presented in a zoomed/magnified state (e.g., zoomed to show a portion of the document page (e.g., zoomed portion 556) with a larger size, as shown in FIG. 5AG).

In some embodiments, the device switches between the overview mode and the sketch mode in response to pre-defined input. For example, while in the overview mode, the user can use a reverse pinch gesture (e.g., two contacts moving away from each other) on the displayed document page to cause the device to enter the sketch mode and zoom into the portion of the document page under the reverse pinch gesture. While in the sketch mode, the user can use a pinch gesture (e.g., two contacts moving toward each other) on the displayed portion of the document page to cause the device to enter the overview mode, and restore the display of the document page in an un-zoomed state.

FIGS. 5AG-5AI illustrate that, in the sketch mode, the user can enter handwritten text by writing directly in displayed portion of the document page. For example, as shown in FIG. 5AH, three new word blocks 558 (e.g., "I", "had", and "the") have been written in front of the existing word blocks "cake" "ever!" (e.g., word blocks 550, as shown in FIG. 5AG). In some embodiments, the as new handwritten text is inserted immediately in front of (e.g., is within a threshold distance of) existing handwritten text, the existing handwritten text is pushed further along in the writing direction to make room to accommodate the newly entered handwritten text. As shown in FIGS. 5AH-5AI, the existing handwritten word blocks (e.g., word blocks 500 "cake" "ever!") continue to move to the right as more handwritten words are written in front of the existing handwritten word blocks (e.g., word blocks 550).

In some embodiments, based on the spatial proximity of the newly entered handwritten word blocks (e.g., e.g., word blocks 558 "I had the best") and the existing handwritten word blocks (e.g., word blocks 550 "cake ever!"), the newly entered handwritten word blocks and the existing handwritten word blocks are joined into the same group (e.g., word blocks 560 "I had the best cake ever!"), such that they can be manipulated together later (e.g., be moved or reflown on the document page in response to a move-only gesture (e.g., a drag gesture with a vertical movement component going up or down the document page) or move-and-reflow gesture (e.g., a drag gesture in the horizontal writing direction or horizontal reverse writing direction)).

FIGS. 5AI-5AJ illustrate that, after input of the new handwritten word blocks (e.g., word blocks 558) are completed, the extra white space between the newly entered handwritten word blocks and the existing handwritten word blocks are removed from the document page (e.g., as shown in FIG. 5AJ), and the grouping of the newly entered handwritten word blocks and the existing handwritten word blocks is completed. In some embodiments, when handwritten text input is entered directly from the document page (and not from sketch/handwriting input area 518), the line spacing, character spacing, orientation, vertical and horizontal alignment of the handwritten text input are optionally adjusted in situ, in a similar manner as that described with respect to the handwritten text input entered via the sketch/handwriting input area 518.

FIG. 5AJ further illustrate that, a sketch can be drawn directly on the document page. In some embodiments, to distinguish between handwritten textual input and a sketch, a heuristic based on the space occupied by the handwritten strokes is used. For example, if all of the handwritten strokes that are grouped together based on their close and/or continuous temporal and spatial proximity to one another, fit within two adjacent guidelines of the document page, the group of handwritten strokes is treated as handwritten textual input. Once the group of handwritten strokes is determined to be handwritten textual input, further divisions of word blocks within the group are optionally performed based on the temporal and/or spatial breaks that existed or occurred during the input process. In contrast, if all of the handwritten strokes that are grouped together based on their close and/or continuous temporal and spatial proximity to one another, span beyond two adjacent guidelines of the document page, the group of handwritten strokes is treated as a sketch. The group of strokes drawn on the document page (e.g., the strokes forming a drawing of a cake with candles on it) is treated as a sketch (e.g., sketch 562), because the group of strokes span beyond two adjacent guidelines on the document page. In some embodiments, the user can specifically group multiple strokes into a sketch, e.g., by using a lasso gesture.

FIG. 5AJ-5AK illustrate a transition from the sketch mode back to the overview mode of the notes application (e.g., in response to a pinch gesture (e.g., two contacts moving toward each other) on the displayed portion of the document page).

FIGS. 5AK-5AL illustrate that, typed text input (e.g., three new line characters) has been entered in the document page (e.g., in front of typed text 566 "Third example:") via a carriage return button (e.g., carriage return 564) on virtual keyboard 504. In some embodiments, movement of typed text input in the vertical direction with insertions of new line characters does not push other content (e.g., handwritten text and sketch 510) below the typed text input, as long as there is unoccupied space between typed text that is being moved and the other content below it to accommodate the typed text that is being moved.

FIG. 5AM illustrate selection of content 568 (e.g., typed text, handwritten text, sketches, or a combination of two or more thereof) in the document page (e.g., content page 502). The selected content is highlighted to indicate its "selected" state, as shown in FIG. 5AM. In some embodiments, the selection of content 568 is made in response to a selection input (e.g., a long press to bring up a selection loupe at a desired location on the document page, and manual expansion of the boundaries of the selection loupe to include additional desired content items on the document page). While content (e.g., content 568) is selected on the document page, another input (e.g., a second long press on the selected content, or a hard press with a characteristic intensity above a respective deep press threshold) is received to bring up a menu (e.g., menu 570) associated with the selected content. In some embodiments, the menu includes menu options, such as cut, copy, create link to . . . , etc.

In some embodiments, as shown in FIG. 5AN, when the menu option for "create link to . . . " is selected from menu 570, a window (e.g., window 572) for entering a destination address for the link is presented. In some embodiments, the destination address is as web address, an address for a file in a file system directory, and/or one of the documents, attachments, or document pages associated with the notes application. In some embodiments, the user can browse a listing of possible destination documents, attachments, or document pages associated with the notes application or the device file system by selecting the "browse" button in window 572.

In some embodiments, once the destination address for the link has been specified in window 572, the link is created (with its anchor content being the selected content 568). When the link is selected from the document page (e.g., by the user tapping on any portion of content 568 in the document page), the device presents the content (e.g., webpage, document, attachment, or document page) located at the destination address in the user interface. In some embodiments, a preview of the content located at the destination address is optionally presented in response to an initial increase in intensity of a contact on content 568 (which is now also a link, and optionally highlighted to indicate its status as anchor content for the link), and a subsequent increase in intensity of the contact above a predefined threshold intensity causes the user interface to present the content located at the destination address (e.g., transition the user interface to a user interface that show the content located at the destination address as the main content).

In some embodiments, as shown in FIG. 5AO, when the menu option for "copy" is selected from menu 570, a clipboard (e.g., window 574) including the selected/copied content is presented. In some embodiments, the clipboard allows the user to manipulate the copied content within the clipboard before pasting the content to the document page. For example, in some embodiments, the user can replicate the content in the clipboard multiple times, apply different visual effect (e.g., stretch in the x or y dimensions, zoom, change the color or font, etc.) to the content, rotate the content, etc., before pasting the content to the document page.

FIGS. 5AP-5AR illustrate switching of user interface modes (e.g., a magnified sketch mode and an unmagnified overview mode) based on device rotational states (e.g., on a first side of a threshold device orientation, and on a second side of the threshold device orientation) in accordance with some embodiments. The device orientation is measured by an angle that is between the plane of the display (e.g., the plane of touch screen 112) and a reference plane (e.g., the horizontal plane, for example).

FIG. 5AP illustrates the transition from the overview mode shown in FIG. 5AF to the sketch mode shown in FIG. 5AQ, in response to a change in device orientation (also referred to as "device's tilt state"). While the device is in the overview mode, the device (e.g., portable multifunction device 100) is oriented such that the plane of the display (e.g., touch screen 112) is on a first side of a threshold device orientation (e.g., rotated counterclockwise above threshold device orientation 576); and when the device is re-oriented such that the plane of the display (e.g., touch screen 112) is on a second side of the threshold device orientation (e.g., rotated clockwise below threshold device orientation 576), the device transitions into the sketch mode.

In some embodiments, the threshold device orientation is dynamically selected based on an initial orientation of the device. For example, when the notes application is first started, the notes application is in the overview mode by default, and the threshold device orientation is selected to be between (e.g., in the middle of) the initial orientation of the device and the horizontal direction. In a more specific example, if the initial orientation of the device is 60 degrees away from the horizontal plane in the counterclockwise direction, the threshold device orientation is selected to be 30 degrees away from the horizontal plane in the counterclockwise direction. When the device is rotated in the clockwise direction to an orientation that is less than 30 degrees away from the horizontal plane (e.g., when the device is laid flat on a horizontal surface), the device switches to the magnified sketch mode in response. In some embodiments, the user enters into the sketch mode using another method (e.g., using a reverse pinch gesture), and the threshold orientation is dynamically selected based on the orientation of the device at the time when the reverse pinch gesture is detected (e.g., the threshold orientation is selected to be a predetermined angle above or below the orientation of the device).

FIG. 5AQ and the top portion of FIG. 5AR illustrate that, while the plane of the display (e.g., touch screen 112) is on the second side of the threshold device orientation (e.g., rotated clockwise below threshold device orientation 576), the device remains in the sketch mode, and the accepts sketch or handwritten text input directly on the zoomed portion of the document page that is displayed on the touch screen.

FIG. 5AR illustrates the transition from the sketch mode shown in FIG. 5AJ to the overview mode shown in FIG. 5AK, in response to a change in device orientation. While the device is in the sketch mode, the device (e.g., portable multifunction device 100) is oriented such that the plane of the display (e.g., touch screen 112) is on the second side of the threshold device orientation (e.g., rotated clockwise below threshold device orientation 576); and when the device is re-oriented such that the plane of the display (e.g., touch screen 112) is on the first side of the threshold device orientation (e.g., rotated counterclockwise above threshold device orientation 576), the device transitions into the overview mode. For example, after the user has entered some handwritten input in the sketch mode, the user can raise the device to see the whole document page in the overview mode, and decide if the layout of the content is satisfactory.

In some embodiments, instead of using a single threshold orientation as the threshold for separating first tilted states associated with the overview mode, and second tilted states associated with the sketch mode, two threshold orientations can be used to define an angular range that is associated with the sketch mode, and device tilt states within the angular range are associated with the sketch mode, and when the device is rotated outside of the angular range, overview mode is entered.

FIGS. 6A-6I are flow diagrams illustrating a method 600 of displaying handwritten content in a content page in accordance with some embodiments. The method 600 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is physically separate from the touch-sensitive surface. Some operations in method 600 are, optionally, combined and/or the order of some operations is, optionally, changed.

Typed text, handwritten text, and hand-drawn sketches are three distinct types of content on the note page. In some embodiments, by grouping handwritten strokes into handwritten word blocks or hand-drawn sketches, handwritten content can be treated in two different ways. In some embodiments, handwritten word blocks behave more like typed characters, and respond to text editing commands such as insertion, move, delete, text wrapping, new line, etc. in the same way as type characters would. In contrast, hand-drawn sketch behave more like an object that is placed on a canvas, and can be arranged with text in different ways, such as inline, fitted within text, or, anchored. Handwriting inputs need not be recognized (e.g., no handwriting recognition needs to be performed) and converted into typed words or characters when presented in the content page.

In some embodiments, the device receives (602) a plurality of handwritten strokes in an input area (e.g., the input area may be an area directly on the note page (e.g., note page 502), or a sketch/handwriting input area (e.g., sketch/handwriting input area 518 in FIG. 5E) separate from the note page, or a zoomed view of a region on the note page (e.g., zoomed view 556 in FIG. 5AG)).

In response to receiving the plurality of handwritten strokes, the device determines (604) whether the plurality of handwritten strokes is a textual input or a sketch in accordance with predetermined criteria for distinguishing between handwritten textual inputs and sketch inputs. For example, in some embodiments, the criteria for distinguishing between handwritten textual inputs and sketch inputs are based on whether the plurality of strokes fit within two adjacent writing guide-lines. Handwriting recognition needs not be performed to determine that the input is textual. In some embodiments, temporal and spatial relationships (e.g., temporal and spatial proximity and gaps) of the strokes are used to determine whether the input strokes are textual or sketch. In some embodiments, the user does not need to do anything special to trigger a handwritten textual input mode versus a sketch input mode before putting down a first stroke. The strokes for textual input and sketches are optionally provided in the same input area (e.g., note page 502, sketch/handwriting input area 518, or zoomed view o556).

In accordance with a determination that the plurality of handwritten strokes is a textual input: the device generates (606) one or more handwritten word blocks (e.g., word blocks "Best", "cake", and "ever!" in FIG. 5L) based on the plurality of handwritten strokes, and positions the one or more handwritten word blocks in a content presentation area (e.g., note page 502 in FIG. 5L) in accordance with first predetermined layout criteria. For example, the first predetermined layout criteria includes a criterion for laying out handwritten text on the note page (e.g., for setting a particular word spacing between the handwritten word blocks, straightening the word blocks to fit evenly between guide-lines, adding automatic indentation or bullet listing that has been applied, etc.). In some embodiments, the handwritten word blocks are treated like characters on the note page and observe the same spacing and alignment requirements imposed on typed characters.

In accordance with a determination that the plurality of handwritten strokes is a sketch: the device generates (608) a sketch content object (e.g., sketch 512 in FIG. 5B, or sketch 562 in FIG. 5AJ) based on the plurality of handwritten strokes, and positions the sketch content object in the content presentation area in accordance with second predetermined layout criteria that is distinct from the first predetermined layout criteria. For example, the second layout criteria include criteria for cropping and/or resizing the sketch after completion of sketch, moving the sketch closer to nearby content on the content page, keeping the sketch where it was created, and/or allowing overlap between sketch and typed text while not allowing overlap between handwritten text and typed text, etc.

In some embodiments, after positioning the one or more handwritten word blocks in the content presentation area, the device receives (810) typed input for inserting one or more typed characters in the content presentation area. In response to receiving the typed input, the device determines whether a first region to be occupied by the one or more typed characters (e.g., the first region can be determined based on the location of the cursor, e.g., cursor 506) in the content presentation area and a second region currently occupied by the one or more handwritten word blocks satisfy first layout-update criteria. For example, in some embodiments, the first layout-update criteria includes a criterion that is satisfied when the one or more typed characters are to be inserted at a position in front of and adjacent to (e.g., in the same line(s) occupied by, and within a threshold distance from) the one or more handwritten word blocks, and the unoccupied space between the insertion cursor location and the beginning of the one or more handwritten word blocks is not sufficiently sized to accommodate all of the typed characters when regular text layout criteria and the first predetermined layout criteria for handwritten text input are observed. In accordance with a determination that the first region and the second region satisfy the first layout-update criteria, the device shifts the one or more handwritten word blocks in a writing direction associated with the content presentation area to accommodate the one or more typed characters (e.g., shifting the one or more handwritten word blocks in the writing direction (e.g., from left to right) along the current line that is occupied by the one or more word blocks, while observing the first predetermined layout criteria).

In some embodiments, after shifting the one or more handwritten word blocks in the writing direction associated with the content presentation area by a respective amount (e.g., after shifting the word blocks from left to right in the current line and when the handwritten word blocks can no longer be completely accommodated by the current line), the device shifts (612) at least one of the one or more handwritten word blocks to a next line below a current line occupied by the one or more handwritten word blocks in the content presentation area (e.g., the handwritten word blocks are wrapped at the end of the current line and some of the word blocks overflow into the next line as more typed characters are inserted in front of the one or more word blocks).

In some embodiments, after positioning the one or more handwritten word blocks in the content presentation area, the device receives (614) handwriting input for inserting one or more additional handwritten word blocks in the content presentation area (e.g., receiving additional plurality of handwritten strokes that form one or more handwritten word blocks). In response to receiving the handwriting input, the device determines whether a third region to be occupied by the one or more additional handwritten word blocks (e.g., the third region can be determined based on the location of the cursor or location of the additional strokes) in the content presentation area and the second region currently occupied by the one or more handwritten word blocks satisfy the first layout-update criteria. For example, in some embodiments, the first layout-update criteria includes a criterion that is satisfied when the one or more additional handwritten word blocks are to be inserted at a position in front of and adjacent to (e.g., in the same line(s) occupied by, and within a threshold distance from) the one or more existing handwritten word blocks, and the unoccupied space between the insertion cursor location and the beginning of the one or more existing handwritten word blocks is not sufficiently sized to accommodate all of the additional handwritten word blocks when the first predetermined layout criteria for handwritten text input are observed. In accordance with a determination that the third region and the second region satisfy the first layout-update criteria, the device shifts the one or more handwritten word blocks in the writing direction associated with the content presentation area to accommodate the one or more additional handwritten word blocks (e.g., shifting the one or more handwritten word blocks in the writing direction (e.g., from left to right) along the current line that is occupied by the one or more word blocks, while observing the first predetermined layout criteria, as shown by the additional word blocks 558 and existing word blocks 550 in FIG. 5AH-5AI).

In some embodiments, after shifting the one or more handwritten word blocks in the writing direction associated with the content presentation area by a respective amount (e.g., after shifting the existing word blocks from left to right in the current line and when the handwritten word blocks can no longer be completely accommodated by the current line), the device shifts (616) at least one of the one or more handwritten word blocks to a next line below a current line occupied by the one or more handwritten word blocks in the content presentation area (e.g., the existing handwritten word blocks are wrapped at the end of the current line and some of the word blocks overflow into the next line as more handwritten word blocks are inserted in front of the one or more existing word blocks).

In some embodiments, the device groups (618) the one or more additional handwritten word blocks and the one or more handwritten word blocks into a group that is manipulated as a unit (e.g., moved together as a group in response to a drag input).

In some embodiments, the content presentation area includes (620) existing typed text prior to receiving the plurality of handwritten strokes. Positioning the one or more handwritten word blocks in the content presentation area in accordance with the first predetermined layout criterion includes: determining that the second region to be occupied by the one or more handwritten word blocks in the content presentation area and a fourth region currently occupied by the existing typed text in content presentation area satisfy the first layout-update criteria, and in accordance with the determination that the second region and the fourth region satisfy the first layout-update criteria: shifting the typed text in the writing direction associated with the content presentation area to accommodate the one or more handwritten word blocks (e.g., shifting the existing typed text in the writing direction (e.g., from left to right) along the current line that is occupied by the existing typed text); and inserting the one or more word blocks in front of the existing typed text in the content presentation area. In some embodiments, the first layout-update criteria includes a criterion that is satisfied when the one or more handwritten word blocks are to be inserted at a position in front of and adjacent to (e.g., in the same line(s) occupied by, and within a threshold distance from) the typed text, and the unoccupied space between the insertion cursor location and the beginning of the existing typed text is not sufficiently sized to accommodate all of the handwritten word blocks when the first predetermined layout criteria for handwritten text input are observed.

In some embodiments, after shifting the existing typed text in the writing direction associated with the content presentation area by a respective amount, the device shifts (622) at least some of the existing typed text to a next line below a current line occupied by the existing typed text in the content presentation area.

In some embodiments, after positioning the sketch content object in the content presentation area, the device receives (624) typed input for inserting one or more typed characters in the content presentation area. In response to receiving the typed input, the device determines whether a fourth region to be occupied by the one or more typed characters (e.g., the fourth region can be determined based on the location of the cursor, e.g., cursor 506) in the content presentation area and a fifth region currently occupied by the sketch content object satisfy second layout-update criteria. In some embodiments, the second layout-update criteria includes a criterion that is satisfied when the one or more typed characters are to be inserted at a position near (e.g., within a threshold distance from) the sketch content object, and the unoccupied space between the insertion cursor location and the sketch content object is not sufficiently sized to accommodate all of the typed characters when regular text layout criteria and the second predetermined layout criteria for the sketch content object are observed. In accordance with the determination that the fourth region and the fifth region satisfy the second layout-update criteria, the device arranges the one or more typed characters and the sketch content object in the content presentation area in accordance with the predetermined second layout criteria (e.g., moving the sketch content object and the typed text around the content presentation area such that the sketch content object and the typed text observe the setting for text wrapping (e.g., tight, square, in-line, etc.) around the sketch objects).

In some embodiments, after positioning the sketch content object in the content presentation area, the device receives (626) handwriting input for inserting one or more additional handwritten word blocks in the content presentation area (e.g., receiving additional plurality of handwritten strokes that form one or more handwritten word blocks). In response to receiving the handwriting input, the device determines whether a sixth region to be occupied by the one or more additional handwritten word blocks in the content presentation area and the fifth region currently occupied by the sketch content object satisfy the second layout-update criteria. In some embodiments, the second layout-update criteria includes a criterion that is satisfied when the one or more additional handwritten word blocks are to be inserted at a position near (e.g., within a threshold distance from) the sketch content object, and the unoccupied space between the insertion cursor location and the sketch content object is not sufficiently sized to accommodate all of the additional handwritten word blocks when the second predetermined layout criteria for the sketch content object are observed. In accordance with the determination that the sixth region and the fifth region satisfy the second layout-update criteria, the device arranges the one or more additional handwritten word blocks and the sketch content object in the content presentation area in accordance with the predetermined second layout criteria (e.g., move the sketch content object and the one or more additional handwritten word blocks around the content presentation area such that the sketch content object and the additional handwritten word blocks observe the setting for text wrapping (e.g., tight, square, in-line, etc.) around the sketch objects).

In some embodiments, the content presentation area includes (628) existing typed text prior to receiving the plurality of handwritten strokes. Positioning the sketch content object in the content presentation area in accordance with the second predetermined layout criterion includes overlaying at least a portion of the sketch content object on the existing typed text in the content presentation area (e.g., sketch 512 overlaid on typed text "cursive", as shown in FIG. 5B).

In some embodiments, the device groups (630) the sketch content object and at least the portion of the existing typed text into a group that is manipulated as a unit (e.g., moved together as a group in response to a drag input, deleted together in response to a deletion input).

In some embodiments, positioning the one or more handwritten word blocks in the content presentation area includes (632) positioning the one or more handwritten word blocks in a respective line in the content presentation area. The device detects selection of at least one of the one or more handwritten word blocks (e.g., selection of word block 554 in FIG. 5AA). While the at least one of the one or more handwritten word blocks is selected, the device receives a drag input (e.g., drag input 555 in FIG. 5AB) directed to the selected at least one of the one or more handwritten word blocks (e.g., selected word block 554 in FIG. 5AB). In accordance with a determination that the drag input meets content-reflow criteria, where the content-reflow criteria includes a criterion that is met when the drag input includes a movement of a focus selector along the respective line (e.g., a movement of the focus selector horizontally in the writing direction, or a movement of the focus selector horizontally in the reverse writing direction) currently occupied by the one or more handwritten word blocks in the content presentation area (e.g., the drag input 555 includes a contact (corresponding to a focus selector) that moves horizontally along the current line occupied by the word blocks (including the selected word block 554) in FIG. 5AB), the device shifts the one or more handwritten word blocks along the respective line (e.g., in the writing direction or the reverse writing direction) in accordance with the drag input (e.g., as shown in FIGS. 5AA-5AB).

In some embodiments, the one or more handwritten word blocks are (634) shifted in the writing direction in accordance with the drag input. After shifting the one or more handwritten word blocks along the respective line in the writing direction associated with the content presentation area by a respective amount, the device shifts at least one of the one or more handwritten word blocks to a next line below the respective line in the content presentation area (e.g., as shown in FIGS. 5AA-5AB).

In some embodiments, the device maintains (636) space previously occupied by the one or more handwritten word blocks in the respective line as white space during the shifting of the one or more handwritten word blocks (e.g., white space is created before the handwritten word block 554 during the reflow of the handwritten word blocks "Best cake ever!", as shown in FIGS. 5AA-5AB).

In some embodiments, the one or more handwritten word blocks are (638) shifted in the reverse writing direction along the respective line. After shifting the one or more handwritten word blocks along the respective line in the reverse writing direction associated with the content presentation area by a respective amount, the device shifts at least one of the one or more handwritten word blocks to a previous line above the respective line in the content presentation area.

In some embodiments, the device shifts (640) content positioned after the one or more handwritten word blocks in the reverse writing direction into space previously occupied by the one or more handwritten word blocks in the respective line during the shifting of the one or more handwritten word blocks.

In some embodiments, in accordance with a determination that the drag input meets content-move criteria, where the content-move criteria includes a criterion that is met when the drag input includes a movement of a focus selector from the respective line currently occupied by the one or more handwritten word blocks to a location outside of the respective line (e.g., a movement of the focus selector in a direction substantially perpendicular to the writing direction), the device moves (642) the selected at least one of the one or more handwritten word blocks from a first location to a second location in the content presentation area in accordance with the drag input (e.g., move from a location in a first line to a location in a second line some distance above or below the first line, where the locations need not be vertically aligned). In some embodiments, the drag gesture would satisfy the content-move criteria as long as an initial portion of the drag input includes a vertical movement component, subsequent portions of the drag input can have both horizontal and/or vertical movement components. In other words, the vertical movement component in the initial portion of the drag gesture disables reflow, and enables move of the selected handwritten textual content.

In some embodiments, moving the selected at least one of the one or more handwritten word blocks includes (644): moving the selected at least one of the one or more handwritten word blocks (e.g., the move is applied to only the selected word block, rather than the whole group) to a location after first existing typed text in the content presentation area; and shifting content between the selected at least one of the one or more handwritten word blocks and the first existing typed text in the reverse writing direction in the content presentation area to fill in the space created by the movement of the selected at least one of the one or more handwritten word blocks.

In some embodiments, moving the selected at least one of the one or more handwritten word blocks includes (646): moving the selected at least one of the one or more handwritten word blocks (e.g., the move is applied to only the selected word block, rather than the whole group) to a location in front of second existing typed text; and shifting the second existing typed text in the writing direction in the content presentation area to create space to accommodate the selected at least one of the one or more handwritten word blocks.

In some embodiments, determining whether the plurality of handwritten strokes is a textual input or a sketch in accordance with predetermined criteria for distinguishing between handwritten textual inputs and sketch inputs includes (648) determining that the plurality of handwritten strokes is a textual input when the plurality of handwritten strokes fit within a single line height represented in the content input area (e.g., the height between two adjacent guidelines 508 in note page 502 in FIG. 5A, or the height between two adjacent guidelines represented in sketch/handwriting input area 518 in FIG. 5E).

In some embodiments, generating one or more handwritten word blocks based on the plurality of handwritten strokes includes (650) generating one or more handwritten word blocks based on temporal and spatial relationships between the plurality of handwritten strokes (e.g., in some embodiments, spatial and temporal proximity between sequential strokes are optionally used to group strokes into the same word block, while spatial and temporal gaps between sequential strokes are optionally used to segment strokes into adjacent word blocks).

In some embodiments, determining whether the plurality of handwritten strokes is a textual input or a sketch is (652) not based on handwriting recognition (e.g., handwriting recognition need not be performed, and the word blocks need not be converted to typed text or words in a dictionary).

In some embodiments, generating one or more handwritten word blocks based on the plurality of handwritten strokes is (654) not based on handwriting recognition (e.g., in some embodiments, handwriting recognition is not performed, and the word blocks are not converted to typed text or words in a dictionary).

It should be understood that the particular order in which the operations in FIGS. 6A-6G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, and 900) are also applicable in an analogous manner to method 600 described above with respect to FIGS. 6A-6G. For example, the contacts, gestures, and user interface objects described above with reference to method 600 optionally have one or more of the characteristics of the contacts, gestures, and user interface objects described herein with reference to other methods described herein (e.g., methods 700, 800, and 900). For brevity, these details are not repeated here.

FIGS. 7A-7B are flow diagrams illustrating a method 700 of displaying handwritten content in a content page in accordance with some embodiments. The method 700 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is physically separate from the touch-sensitive surface. Some operations in method 700 are, optionally, combined and/or the order of some operations is, optionally, changed.

In some embodiments, continued horizontal scrolling of the zoomed sketch input area causes automatic vertical reposition of the input position indicator to the next line, when the scrolling reaches the edge of the note page. In some embodiments, the scrolling of the zoomed sketch input area is not caused by entering handwriting input into the sketch/handwriting input area, but by dragging the space and content within the sketch/handwriting input area in a horizontal direction.

In some embodiments, the device concurrently displays (702) a handwriting input area (e.g., sketch/handwriting input area 518 in FIG. 5K) separate from the content page (e.g., content page 502), and an input position indicator (e.g., input position indicator 520) overlaid on the content page, where the input position indicator encloses an area of the content page that is shown in the handwriting input area (e.g., as illustrated in FIG. 5K). The device receives (704) one or more inputs (e.g., handwriting inputs or scrolling inputs) that cause scrolling of content in the handwriting input area in a first direction (e.g., scrolling of content from right to left, or scrolling of content from left to right). In response to detecting that the scrolling of the content in the handwriting input area in the first direction meets a predetermined threshold condition (e.g., edge of content page is sufficiently close to scroll boundary indicator 540, as shown in FIG. 5N), the device moves (706) the input position indicator to a first new position over the content page (e.g., new position of input position indicator 520 shown in FIG. 5O) that is displaced from a previous position of the input position indicator (e.g., previous position of input position indicator 520 shown in FIG. 5N) in a second direction (e.g., a direction from top to bottom, or a direction from bottom to top) distinct from the first direction (e.g., a direction from right to left, or a direction from left to right).

In some embodiments, the first direction is (708) a direction along a predetermined writing direction associated with the content page (e.g., either in the horizontal writing direction or in the reverse horizontal writing direction), and the second direction is a direction perpendicular to the predetermined writing direction associated with the content page (e.g., either in the vertical upward direction or in the vertical downward direction).

In some embodiments, receiving the one or more inputs that cause the scrolling of the content in the handwriting input area in the first direction further includes (710): receiving a plurality of handwritten strokes in the handwriting input area, where the handwritten strokes fill the handwriting input area in a direction opposite the first direction (e.g., the handwritten strokes fill the handwriting input area from left to right) and cause the scrolling of the content in the handwriting input area in the first direction (e.g., the content already in the handwriting input are scrolls from right to left, as shown in FIGS. 5K-5L).

In some embodiments, in response to receiving the plurality of handwritten strokes in the handwriting input area: the device displays (712) one or more handwritten word blocks generated in accordance with the plurality of handwritten strokes in the content page (e.g., as shown in FIG. 5L), moves the input position indicator (e.g., input position indicator 520 in FIG. 5L) on the content page in a direction opposite the first direction (e.g., moving the input position indicator from left to right) in accordance with the scrolling of the handwriting input area, before moving the input position indicator to the first new position that is displaced from the previous position in the second direction (e.g., moving the input position indicator in the current line until the right edge of the content page, and then move the input position indicator to the beginning of the next line).

In some embodiments, receiving the one or more inputs that cause the scrolling of the content in the handwriting input area in the first direction further includes (714): receiving one or more inputs (e.g., drag input 536 in FIG. 5M, drag input 534 in FIG. 5N) that drag the area of the content page that is shown in the handwriting input area (e.g., sketch/handwriting input area 518) in the first direction (e.g., from right to left, as shown in FIGS. 5M and 5N).

In some embodiments, receiving the one or more inputs that drag the area of the content page that is shown in the handwriting input area in the first direction includes (716) detecting movement of a focus selector (e.g., contacts in the drag gesture 536 and 534) in a reverse writing direction (e.g., from right to left), where the movement passes a scroll boundary indicator (e.g., scroll boundary indicator 534) presented in the handwriting input area (e.g., as shown in FIGS. 5M and 5N).

In some embodiments, the predetermined threshold condition includes (718) a condition that is met when the one or more inputs cause the input position indicator to reach within a threshold distance from an edge of the content page in the first direction (e.g., as shown in FIG. 5N, the drag input causes the representation of the right edge 540 of the content page 502 to reached a threshold distance within scroll boundary indicator 534).

In some embodiments, the first new position is (720) at the beginning of a new line on the content page (e.g., as shown in FIG. 5O).

In some embodiments, the device presents (722) a representation of the edge of the content page (e.g., the representation of the right edge 540 of the content page 502 in FIG. 5N) and a scroll boundary indicator (e.g., scroll boundary indicator 534 in FIG. 5N) in the handwriting input area (e.g., sketch/handwriting input are 518) before moving the input position indicator to the first new position that is displaced from the previous position in the second direction (e.g., as shown in FIG. 5O).

In some embodiments, the first direction is (724) the horizontal direction associated with the content page and the second direction is the vertical direction associated with the content page.

In some embodiments, the first direction is (726) from right to left and the second direction is from top to bottom of the content page. (e.g., horizontal scrolling forward causes the input position indicator to move down to the next line).

In some embodiments, the first direction is (728) from left to right and the second direction is from bottom to top of the content page. (e.g., horizontal scrolling backward causes the input position indicator to move up to the previous line).

It should be understood that the particular order in which the operations in FIGS. 7A-7B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, and 900) are also applicable in an analogous manner to method 700 described above with respect to FIGS. 7A-7B. For example, the contacts, gestures, and user interface objects described above with reference to method 700 optionally have one or more of the characteristics of the contacts, gestures, and user interface objects described herein with reference to other methods described herein (e.g., methods 600, 800, and 900). For brevity, these details are not repeated here.

Figure 8C:
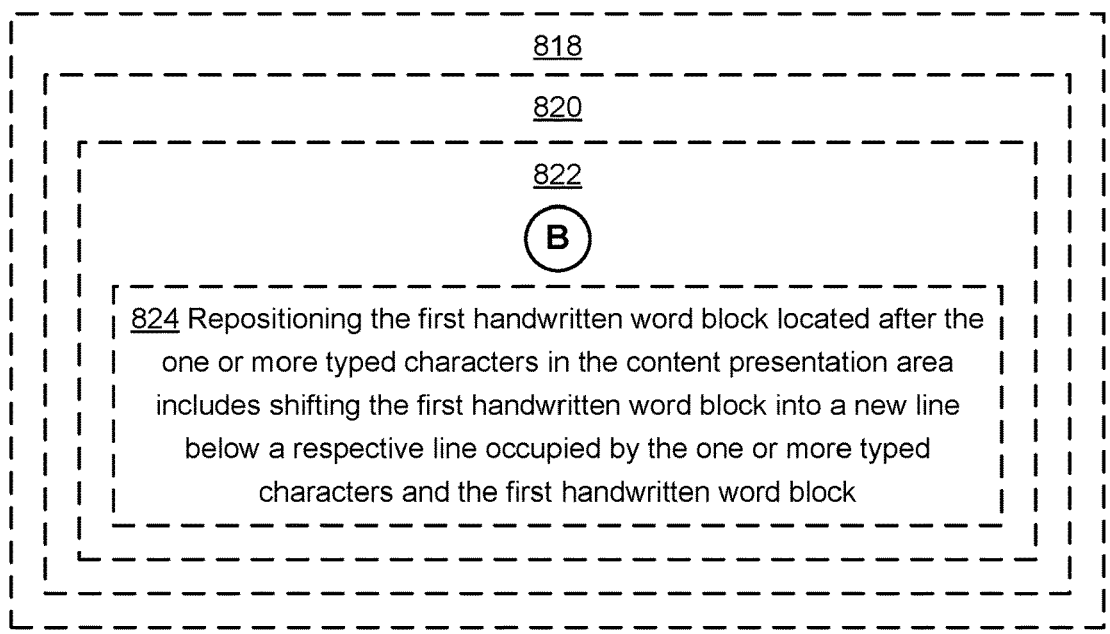

FIGS. 8A-8C are flow diagrams illustrating a method 800 of displaying handwritten content in a content page in accordance with some embodiments. The method 800 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is physically separate from the touch-sensitive surface. Some operations in method 800 are, optionally, combined and/or the order of some operations is, optionally, changed.

In some embodiments, once a handwriting input is recognized as a handwritten textual input and converted to one or more handwritten word blocks, the handwritten word blocks can be dragged horizontally to create more white space before the handwritten word blocks, while pushing text (handwritten or typed) following the dragged handwritten word blocks further along the writing direction. The dragged handwritten text and the pushed text move and wrap on the document page like regular typed text (e.g., when white space is inserted in front of the regular typed text by a number of space characters). During the dragging and reflow process, the handwritten word blocks maintain their handwritten appearance and are not converted to typed text. The sequential order of the content objects (e.g., handwritten word blocks and typed text) is maintained during the dragging and the reflow of the content objects. The dragging and reflow of the content objects differ from dragging to move a content object.

In some embodiments, the device receives (802) a plurality of handwritten strokes in an input area (e.g., the input area may be an area directly on the note page (e.g., note page 502), or a sketch/handwriting input area (e.g., sketch/handwriting input area 518 in FIG. 5E) separate from the note page, or a zoomed view of a region on the note page (e.g., zoomed view 556 in FIG. 5AG)). In response to receiving the plurality of handwritten strokes: the device generates (804) one or more handwritten word blocks (e.g., handwritten word blocks "Best", "cake", ever!" that are located after typed text "First example:" in FIG. 5AA) based on the plurality of handwritten strokes. The device further positions the one or more handwritten word blocks in a content presentation area (e.g., note page 502 in FIG. 5AA) along a writing direction (e.g., from left to right) associated with the content presentation area (e.g., the content presentation area and the input area are optionally the same area in some embodiments). The device receives (806) a first drag input (e.g., drag gesture 555) that drags a first handwritten word block (e.g., word block 554 "Best" in FIG. 5AB) of the one or more handwritten word blocks horizontally in the writing direction (e.g., drag gesture 555 drags word block 554 from left to right in content page 502 in FIG. 5AB). In response to the first drag input, the device inserts (808) an amount of white space in front of the first handwritten word block along the writing direction in accordance with a distance that the first handwritten word block is dragged in the writing direction (e.g., as shown in FIGS. 5AA-5AB).

In some embodiments, when the first drag input is received, the content presentation area includes (810) one or more content objects (e.g., word blocks "cake", and "ever!" in FIG. 5AA, or other content objects (e.g., other typed text or handwritten word blocks that are not separated from the first word block by a sufficient amount of unoccupied space)) positioned after the first handwritten word block (e.g., word block 554 "Best" in FIG. 5AA) along the writing direction. In response to the first drag input, the device repositions the one or more content objects located after the first handwritten word block in the content presentation area, such that a sequential order of the first handwritten word block and the one or more content objects located after the first handwritten word block is preserved during the dragging of the first handwritten word block and the repositioning of the one or more content objects in the content presentation area (e.g., as illustrated in FIGS. 5AA-5AB).

In some embodiments, the one or more content objects located after the first handwritten word block includes (812) one or more of: a handwritten word block and a typed character.

In some embodiments, repositioning of the one or more content objects located after the first handwritten word block in the content presentation area includes (814) reflowing the one or more content objects in the content presentation area such that at least one of the one or more content object is repositioned into a new line below a respective line currently occupied by the first handwritten word block (e.g., as shown in FIG. 5AB).

In some embodiments, after inserting an amount of white space in front of the first handwritten word block along the writing direction in accordance with a distance that the first handwritten word block is dragged in the writing direction: the device detects (816) a second drag input (e.g., a new drag gesture other than the first drag input (e.g., drag gesture 555 in FIGS. 5AB-5AC)), or a portion of drag gesture 555 with a reversal in movement direction, as shown in FIG. 5AC-5AD) that drags the first handwritten word block horizontally in a reverse writing direction (e.g., from right to left) associated with the content presentation area. In response to the second drag input, the device further shifts the first handwritten word block (and, in some embodiments, the one or more content objects that have been repositioned in response to the first drag input) along the reverse writing direction in accordance with a distance that the first handwritten word block is dragged along the reverse writing direction by the second drag input (e.g., as illustrated in FIGS. 5AC-5AD).

In some embodiments, the device receives (818) typed input inserting one or more typed characters at a position before the first handwritten word block in the writing direction. In response to receiving the typed input, the device reflows the first handwritten word and one or more content objects located after the first handwritten word block in the writing direction in the content presentation area to accommodate the one or more typed characters.

In some embodiments, the device receives (820) a third drag input (e.g., drag gesture 552 in FIGS. 5V-5W) that drags the one or more typed characters (e.g., typed text 548 in FIGS. 5V-5W) horizontally in the writing direction (e.g., from left to right) in the content presentation area. In response to the third drag input (e.g., drag gesture 552 in FIGS. 5V-5W), the device inserts an amount of white space in front of the one or more typed characters along the writing direction in accordance with a distance that the one or more typed characters are dragged in the writing direction (e.g., as shown in FIGS. 5U-5W).

In some embodiments, in response to the third drag input (e.g., drag gesture 552 in FIGS. 5V-5W), the device repositions (822) the first handwritten word (and the one or more content objects, if any) located after the one or more typed characters in the content presentation area, such that a sequential order of the one or more typed characters and first handwritten word block (and the one or more content objects, if any) located after the one or more typed characters is preserved during the dragging of the one or more typed characters and the repositioning of the first handwritten word block (and the one or more content objects) in the content presentation area (e.g., as illustrated in FIGS. 5V-5W).

In some embodiments, repositioning the first handwritten word block (and the one or more content objects, if any) located after the one or more typed characters in the content presentation area includes (824) shifting the first handwritten word block (and the one or more content objects, if any) into a new line below a respective line occupied by the one or more typed characters and the first handwritten word block (e.g., as shown in FIGS. 5W-5Y).

It should be understood that the particular order in which the operations in FIGS. 8A-8C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, and 900) are also applicable in an analogous manner to method 800 described above with respect to FIGS. 8A-8C. For example, the contacts, gestures, and user interface objects described above with reference to method 800 optionally have one or more of the characteristics of the contacts, gestures, and user interface objects described herein with reference to other methods described herein (e.g., methods 600, 700, and 900). For brevity, these details are not repeated here.

FIGS. 9A-9B are flow diagrams illustrating a method 900 of displaying handwritten content in a content page (switching from sketch mode to overview mode in response to tilting of the device) in accordance with some embodiments. The method 800 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is physically separate from the touch-sensitive surface. Some operations in method 900 are, optionally, combined and/or the order of some operations is, optionally, changed.

In some embodiments, while the device is in a first titled state (e.g., the device is rotated clockwise below a threshold orientation, as shown in top of FIG. 5AR), the device displays (902) a content page (e.g., content page 502) in a sketch mode, the displaying comprising displaying a zoomed view of a first portion of the content page (e.g., zoomed view 556 in FIG. 5AJ), and configuring the zoomed view of the first portion of the content page to accept user inputs modifying content in the portion of the content page (e.g., while in the sketch mode, the zoomed view accepts handwritten strokes for textual input and sketch input directly, e.g., without requiring a separate sketch/handwriting input area (e.g., sketch/handwriting input area 518)). In some embodiments, a virtual keyboard is displayed while the device is in the sketch mode (e.g., as shown in FIG. 5AJ), and the user can enter typed input in the displayed first portion of the content page using the virtual keyboard.

While displaying the content page in the sketch mode, the device detects (904) that the device is tilted from the first tilted state to a second titled state (e.g., rotated counterclockwise above the threshold orientation, as shown in bottom of FIG. 5AR) distinct from the first titled state. In response to detecting that the device is titled from the first tilted state to the second tilted state, the device displays (906) the content page in an overview mode (e.g., as shown in FIG. 5AR), the displaying comprising zooming out to display an overview of the content page (e.g., as shown in FIG. 5AR).

In some embodiments, displaying the content page in the overview mode includes (908) displaying an input position indicator (e.g., input position indicator 506 in FIG. 5AK) over the overview of the content page to indicate the first portion of the content page previously displayed in the zoomed view.

In some embodiments, while displaying the content page in the overview mode: the device detects (910) a user input moving the input position indicator to a second portion of the content page that is different from the first portion of the content page; and while the input position indicator is located at the second portion of the content page, the device detects that the device is tilted from the second tilted state to a third tilted state (e.g., back to the first tilted state or to another tilted state that is also associated with the sketch mode). In response to detecting that the device is tilted from the second tilted state to the third tilted state, the device displays the content page in the sketch mode, the displaying comprising: displaying a zoomed view of the second portion of the content page; and configuring the zoomed view of the second portion of the content page to accept user inputs modifying content in the second portion of the content page.

In some embodiments, the first tilted state and the third titled state are (912) on the same side of the second tilted state. For example, in some embodiments, a threshold orientation for switching between the overview mode and the sketch mode is defined to be an orientation between a first tilted state associated with the sketch mode and a second tilted state associated with the overview mode (as shown in FIGS. 5AP and 5AR), and to switch back to the sketch mode from the overview mode, the device needs to be rotated from the second tilted state (e.g., the tilted state associated with the overview mode) back to the same side of the threshold orientation as the first tilted state (e.g., the tilted state associated with the sketch mode). Therefore, the first tilted state and the third tilted state are on the same side of the second tilted state.

In some embodiments, the second tilted state and the third tilted state are (914) on different sides of the first tilted state. For example, in some embodiments, two threshold orientations for switching between the overview mode and the sketch mode are defined, and one of the threshold orientations is on a first side of the first tilted state, and the other threshold orientation is on the other side of the first tilted state. The angular range between the two threshold orientations is a range in which tilting of the device will not cause the device to switching out of the sketch mode. If the device rotates in the clockwise direction into the angular range associated with the sketch mode, the device switches from the overview mode to the sketch mode. If the device continues to rotate in the clockwise direction and exits the angular range associated with the sketch mode, the device switches back from the sketch mode to the overview mode. Therefore, the second tilted state and the third tilted state are on the same side of the second tilted state.

In some embodiments, prior to displaying the content page in the sketch mode while the device is in the first tilted state: the device displays (916) the content page in the overview mode, and while displaying the content page in the overview mode, the device detects a reverse pinch gesture directed to the first portion of the content page. The device enters the sketch mode in response to detecting the reverse pinch gesture directed to the first portion of the content page.

In some embodiments, after entering the sketch mode in response to detecting the reverse pinch gesture directed to the first portion of the content page: while displaying the content page in the sketch mode, the device detects (918) a pinch gesture directed to the first portion of the content page, and enters the overview mode in response to detecting the pinch gesture directed to the first portion of the content page.

In some embodiments, the device determines (920) a threshold orientation for switching between the overview mode and the sketch mode based on an orientation of the device at a time when the reverse pinch gesture is detected (e.g., the threshold orientation is optionally a predetermined angle away (e.g., in the clockwise direction, or in the counterclockwise direction) from the orientation of the device at a time when the reverse pinch gesture is detected). In some embodiments, the device has two threshold orientations, one above and the other below the orientation of the device at the time when the reverse pinch gesture is detected, and the angular range between the two threshold orientation defines the range in which tilting of the device will not cause switching from the sketch mode to the overview mode, while tilting from within to outside of the angular range (e.g., in either the clockwise direction or the counterclockwise direction) will cause the switching from the sketch mode to the overview mode.

It should be understood that the particular order in which the operations in FIGS. 9A-9B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, and 800) are also applicable in an analogous manner to method 800 described above with respect to FIGS. 9A-9B. For example, the contacts, gestures, and user interface objects described above with reference to method 900 optionally have one or more of the characteristics of the contacts, gestures, and user interface objects described herein with reference to other methods described herein (e.g., methods 600, 700, and 800). For brevity, these details are not repeated here.

Figure 10:
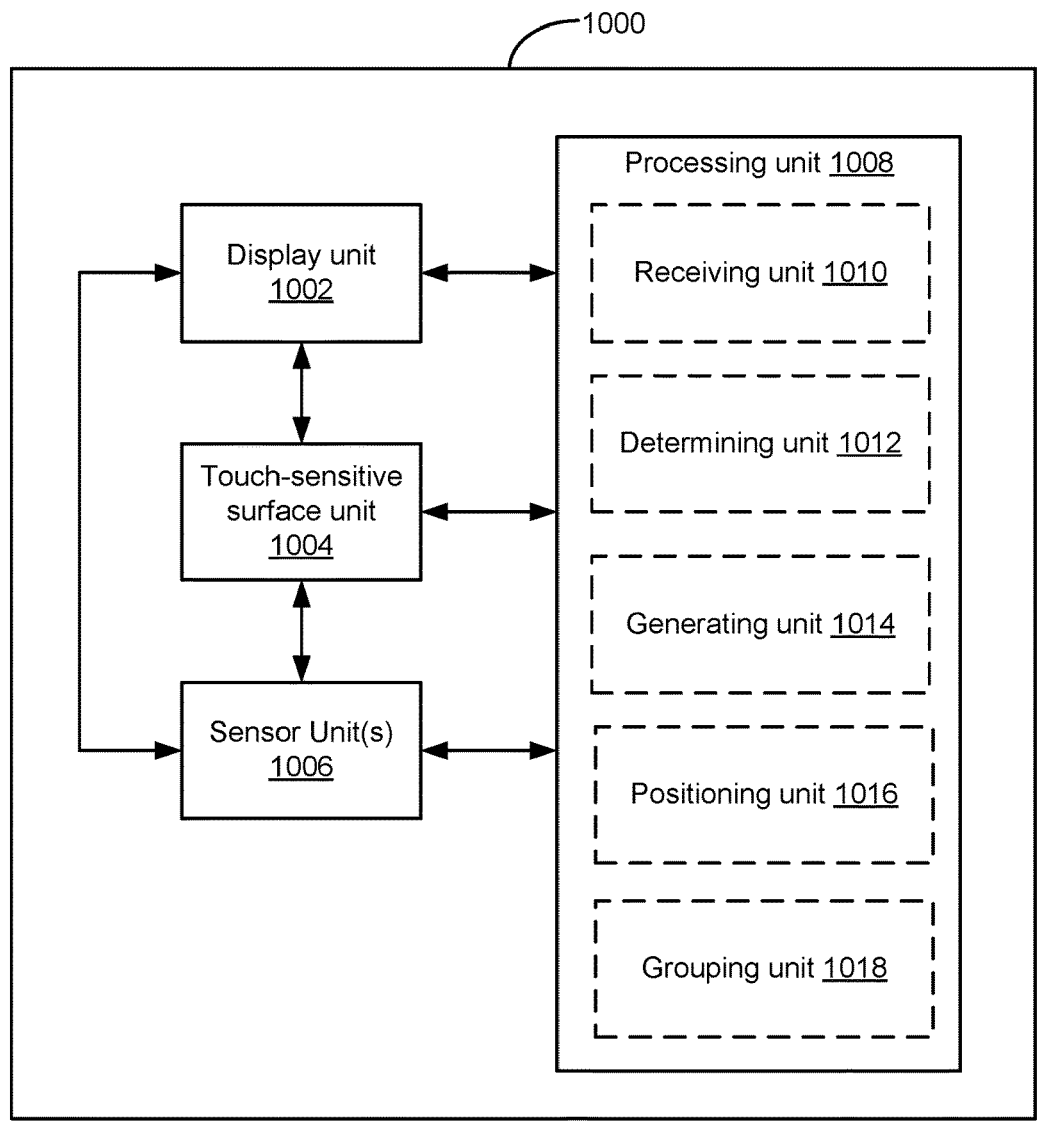
FIG. 10 is a functional block diagram of an electronic device in accordance with some embodiments.

In accordance with some embodiments, FIG. 10 shows a functional block diagram of an electronic device 1000 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 1000 includes a display unit 1002, a touch-sensitive surface unit 1004, and a processing unit 1008 coupled with the display unit 1002 and the touch-sensitive surface unit 1004.

In some embodiments, the processing unit 1008 includes a receiving unit 1010, a determining unit 1012, a generating unit 1014, a positioning unit 1016, and a grouping unit 1018.

The processing unit 1008 is configured to receive (e.g., with the receiving unit 1010) a plurality of handwritten strokes in an input area. In response to receiving the plurality of handwritten strokes, the processing unit 1008 is configured to determine (e.g., with the determining unit 1012) whether the plurality of handwritten strokes is a textual input or a sketch in accordance with predetermined criteria for distinguishing between handwritten textual inputs and sketch inputs. In accordance with a determination that the plurality of handwritten strokes is a textual input, the processing unit 1008 is configured to generate (e.g., with the generating unit 1014) one or more handwritten word blocks based on the plurality of handwritten strokes, and position (e.g., with the positioning unit 1016) the one or more handwritten word blocks in a content presentation area in accordance with first predetermined layout criteria. In accordance with a determination that the plurality of handwritten strokes is a sketch, the processing unit 1008 is configured to generate (e.g., with the generating unit 1014) a sketch content object based on the plurality of handwritten strokes and position (e.g., with the positioning unit 1016) the sketch content object in the content presentation area in accordance with second predetermined layout criteria that is distinct from the first predetermined layout criteria.

In some embodiments, the processing unit 1008 is configured to, after positioning (e.g., with the positioning unit

1016) the one or more handwritten word blocks in the content presentation area, receive (e.g., with the receiving unit 1010) typed input for inserting one or more typed characters in the content presentation area. In response to receiving the typed input, the processing unit 1008 is configured to determine (e.g., with the determining unit 1012) whether a first region to be occupied by the one or more typed characters in the content presentation area and a second region currently occupied by the one or more handwritten word blocks satisfy first layout-update criteria. In accordance with a determination that the first region and the second region satisfy the first layout-update criteria, the processing unit 1008 is configured to shift (e.g., with the positioning unit 1016) the one or more handwritten word blocks in a writing direction associated with the content presentation area to accommodate the one or more typed characters.

In some embodiments, the processing unit 1008 is configured to, after shifting the one or more handwritten word blocks in the writing direction associated with the content presentation area by a respective amount, shift (e.g., with the positioning unit 1016) at least one of the one or more handwritten word blocks to a next line below a current line occupied by the one or more handwritten word blocks in the content presentation area.

In some embodiments, the processing unit 1008 is configured to, after positioning the one or more handwritten word blocks in the content presentation area, receive (e.g., with the receiving unit 1010) handwriting input for inserting one or more additional handwritten word blocks in the content presentation area. In response to receiving the handwriting input, the processing unit 1008 is configured to determine (e.g., with the determining unit 1012) whether a third region to be occupied by the one or more additional handwritten word blocks in the content presentation area and the second region currently occupied by the one or more handwritten word blocks satisfy the first layout-update criteria. In accordance with a determination that the third region and the second region satisfy the first layout-update criteria, the processing unit 1008 is configured to shift (e.g., with the positioning unit 1016) the one or more handwritten word blocks in the writing direction associated with the content presentation area to accommodate the one or more additional handwritten word blocks.

In some embodiments, the processing unit 1008 is configured to, after shifting the one or more handwritten word blocks in the writing direction associated with the content presentation area by a respective amount, shift (e.g., with the positioning unit 1016) at least one of the one or more handwritten word blocks to a next line below a current line occupied by the one or more handwritten word blocks in the content presentation area.

In some embodiments, the processing unit 1008 is configured to group (e.g., with the grouping unit 1018) the one or more additional handwritten word blocks and the one or more handwritten word blocks into a group that is manipulated as a unit.

In some embodiments, the content presentation area includes existing typed text prior to receiving the plurality of handwritten strokes, and positioning the one or more handwritten word blocks in the content presentation area in accordance with the first predetermined layout criterion includes: determining that the second region to be occupied by the one or more handwritten word blocks in the content presentation area and a fourth region currently occupied by the existing typed text in content presentation area satisfy the first layout-update criteria; and in accordance with the determination that the second region and the fourth region satisfy the first layout-update criteria: shifting (e.g., with the positioning unit 1016) the typed text in the writing direction associated with the content presentation area to accommodate the one or more handwritten word blocks; and inserting (e.g., with the positioning unit 1016) the one or more word blocks in front of the existing typed text in the content presentation area.

In some embodiments, the processing unit 1008 is configured to, after shifting the existing typed text in the writing direction associated with the content presentation area by a respective amount, shift (e.g., with the positioning unit 1016) at least some of the existing typed text to a next line below a current line occupied by the existing typed text in the content presentation area.

In some embodiments, the processing unit 1008 is configured to, after positioning the sketch content object in the content presentation area, receive (e.g., with the receiving unit 1010) typed input for inserting one or more typed characters in the content presentation area. In response to receiving the typed input, the processing unit 1008 is configured to determine (e.g., with the determining unit 1012) whether a fourth region to be occupied by the one or more typed characters in the content presentation area and a fifth region currently occupied by the sketch content object satisfy second layout-update criteria. In accordance with the determination that the fourth region and the fifth region satisfy the second layout-update criteria, the processing unit 1008 is configured to arrange (e.g., with the positioning unit 1016) the one or more typed characters and the sketch content object in the content presentation area in accordance with the predetermined second layout criteria.

In some embodiments, the processing unit 1008 is configured to, after positioning the sketch content object in the content presentation area, receive handwriting input for inserting one or more additional handwritten word blocks in the content presentation area; in response to receiving the typed input, determine (e.g., with the determining unit 1012) whether a sixth region to be occupied by the one or more additional handwritten word blocks in the content presentation area and the fifth region currently occupied by the sketch content object satisfy the second layout-update criteria. In accordance with the determination that the sixth region and the fifth region satisfy the second layout-update criteria, the processing unit 1008 is configured to arrange (e.g., with the positioning unit 1016) the one or more additional handwritten word blocks and the sketch content object in the content presentation area in accordance with the predetermined second layout criteria.

In some embodiments, the content presentation area includes existing typed text prior to receiving the plurality of handwritten strokes, and positioning the sketch content object in the content presentation area in accordance with the second predetermined layout criterion includes overlaying at least a portion of the sketch content object on the existing typed text in the content presentation area.

In some embodiments, the processing unit 1008 is configured to group (e.g., with the grouping unit 1018) the sketch content object and at least the portion of the existing typed text into a group that is manipulated as a unit.

In some embodiments, positioning the one or more handwritten word blocks in the content presentation area includes positioning the one or more handwritten word blocks in a respective line in the content presentation area, and the processing unit 1008 is configured to detect selection of at least one of the one or more handwritten word blocks. While the at least one of the one or more handwritten word blocks is selected, the processing unit 1008 is configured to receive (e.g., with the receiving unit 1010) a drag input directed to the selected at least one of the one or more handwritten word blocks. In accordance with a determination that the drag input meets content-reflow criteria, such that the content-reflow criteria includes a criterion that is met when the drag input includes a movement of a focus selector along the respective line currently occupied by the one or more handwritten word blocks in the content presentation area, the processing unit 1008 is further configured to shift (e.g., with the positioning unit 1016) the one or more handwritten word blocks along the respective line in accordance with the drag input.

In some embodiments, the one or more handwritten word blocks are shifted in the writing direction in accordance with the drag input, and the processing unit 1008 is configured to, after shifting the one or more handwritten word blocks along the respective line in the writing direction associated with the content presentation area by a respective amount, shift (e.g., with the positioning unit 1016) at least one of the one or more handwritten word blocks to a next line below the respective line in the content presentation area.

In some embodiments, the processing unit 1008 is configured to maintain (e.g., with the positioning unit 1016) space previously occupied by the one or more handwritten word blocks in the respective line as white space during the shifting of the one or more handwritten word blocks.

In some embodiments, the one or more handwritten word blocks are shifted (e.g., with the positioning unit 1016) in the reverse writing direction along the respective line, and wherein the processing unit 1008 is configured to, after shifting the one or more handwritten word blocks along the respective line in the reverse writing direction associated with the content presentation area by a respective amount, shift (e.g., with the positioning unit 1016) at least one of the one or more handwritten word blocks to a previous line above the respective line in the content presentation area.

In some embodiments, the processing unit 1008 is configured to shift (e.g., with the positioning unit 1016) content positioned after the one or more handwritten word blocks in the reverse writing direction into space previously occupied by the one or more handwritten word blocks in the respective line during the shifting of the one or more handwritten word blocks.

In some embodiments, the processing unit 1008 is configured to, in accordance with a determination that the drag input meets content-move criteria, where the content-move criteria includes a criterion that is met when the drag input includes a movement of a focus selector from the respective line currently occupied by the one or more handwritten word blocks to a location outside of the respective line, move (e.g., with the positioning unit 1016) the selected at least one of the one or more handwritten word blocks from a first location to a second location in the content presentation area in accordance with the drag input.

In some embodiments, moving the selected at least one of the one or more handwritten word blocks includes moving the selected at least one of the one or more handwritten word blocks to a location after first existing typed text in the content presentation area; and shifting content between the selected at least one of the one or more handwritten word blocks and the first existing typed text in the reverse writing direction in the content presentation area to fill in the space created by the movement of the selected at least one of the one or more handwritten word blocks.

In some embodiments, moving the selected at least one of the one or more handwritten word blocks includes moving the selected at least one of the one or more handwritten word blocks to a location in front of second existing typed text; and shifting the second existing typed text in the writing direction in the content presentation area to create space to accommodate the selected at least one of the one or more handwritten word blocks.

In some embodiments, determining whether the plurality of handwritten strokes is a textual input or a sketch in accordance with predetermined criteria for distinguishing between handwritten textual inputs and sketch inputs includes determining that the plurality of handwritten strokes is a textual input when the plurality of handwritten strokes fit within a single line height represented in the content input area.

In some embodiments, generating one or more handwritten word blocks based on the plurality of handwritten strokes includes generating one or more handwritten word blocks based on temporal and spatial relationships between the plurality of handwritten strokes.

In some embodiments, determining whether the plurality of handwritten strokes is a textual input or a sketch is not based on handwriting recognition.

In some embodiments, generating one or more handwritten word blocks based on the plurality of handwritten strokes is not based on handwriting recognition.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6G are, optionally, implemented by components depicted in FIGS. 1A-1B. For example, determining operation 604 and generating operation 606 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 11:
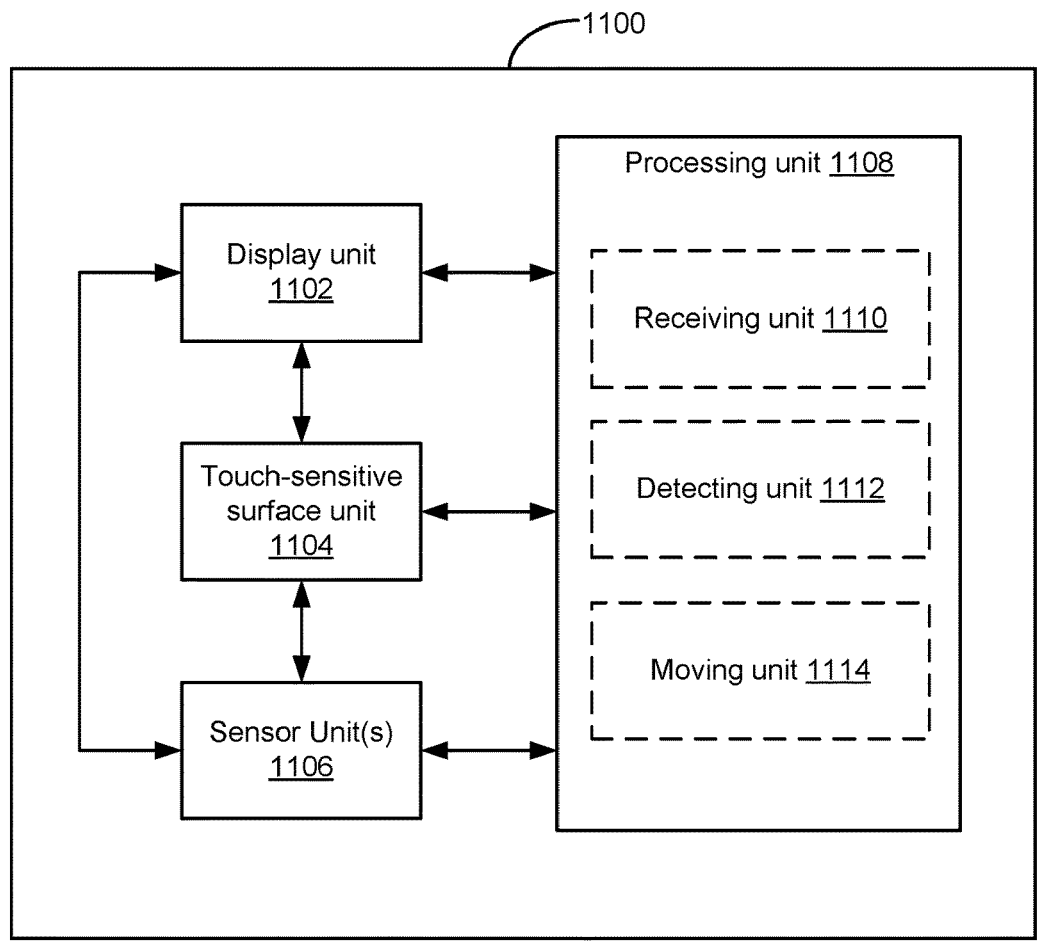
FIG. 11 is a functional block diagram of an electronic device in accordance with some embodiments.

In accordance with some embodiments, FIG. 11 shows a functional block diagram of an electronic device 1100 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, an electronic device 1100 includes a display unit 1102, a touch-sensitive surface unit 1104 configured to receive one or more inputs, and a processing unit 1108 coupled with the display unit 1102 and the touch-sensitive surface unit 1104.

In some embodiments, the processing unit 1108 includes a receiving unit 1110, a detecting unit 1112, and a moving unit 1114.

The processing unit 1108 is configured to concurrently display on the display unit 1102, a handwriting input area separate from the content page, and an input position indicator overlaid on the content page, wherein the input position indicator encloses an area of the content page that is shown in the handwriting input area. The processing unit 1108 is also configured to receive (e.g., with the receiving unit 1110) the one or more inputs that cause scrolling of content in the handwriting input area in a first direction. In response to detecting that the scrolling of the content in the handwriting input area in the first direction meets a predetermined threshold condition, the processing unit 1108 is configured to move (e.g., with the moving unit 1114) the input position indicator to a first new position over the content page that is displaced from a previous position of the input position indicator in a second direction distinct from the first direction.

In some embodiments, the first direction is a direction along a predetermined writing direction associated with the content page, and the second direction is a direction perpendicular to the predetermined writing direction associated with the content page.

In some embodiments, receiving the one or more inputs that cause the scrolling of the content in the handwriting input area in the first direction further comprises receiving a plurality of handwritten strokes in the handwriting input area, where the handwritten strokes fill the handwriting input area in a direction opposite the first direction and cause the scrolling of the content in the handwriting input area in the first direction.

In some embodiments, the processing unit 1108 is configured to, in response to receiving the plurality of handwritten strokes in the handwriting input area, display on the display unit 1102 one or more handwritten word blocks generated in accordance with the plurality of handwritten strokes in the content page. The processing unit 1108 is configured to move (e.g., with the moving unit 1114) the input position indicator on the content page in a direction opposite the first direction in accordance with the scrolling of the handwriting input area, before moving the input position indicator to the first new position that is displaced from the previous position in the second direction.

In some embodiments, receiving the one or more inputs that cause the scrolling of the content in the handwriting input area in the first direction further comprises receiving one or more inputs that drag the area of the content page that is shown in the handwriting input area in the first direction.

In some embodiments, receiving the one or more inputs that drag the area of the content page that is shown in the handwriting input area in the first direction includes detecting movement of a focus selector in a reverse writing direction, where the movement passes a scroll boundary indicator presented in the handwriting input area.

In some embodiments, the predetermined threshold condition includes a condition that is met when the one or more inputs cause the input position indicator to reach within a threshold distance from an edge of the content page in the first direction.

In some embodiments, the first new position is at the beginning of a new line on the content page.

In some embodiments, the processing unit 1108 is configured to present (e.g., with the display unit 1102) a representation of the edge of the content page and a scroll boundary indicator in the handwriting input area before moving the input position indicator to the first new position that is displaced from the previous position in the second direction.

In some embodiments, the first direction is the horizontal direction associated with the content page and the second direction is the vertical direction associated with the content page.

In some embodiments, the first direction is from right to left and the second direction is from top to bottom of the content page.

In some embodiments, the first direction is from left to right and the second direction is from bottom to top of the content page.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 7A-7B are, optionally, implemented by components depicted in FIGS. 1A-1B. For example, receiving operation 704 and moving operation 706 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 12:
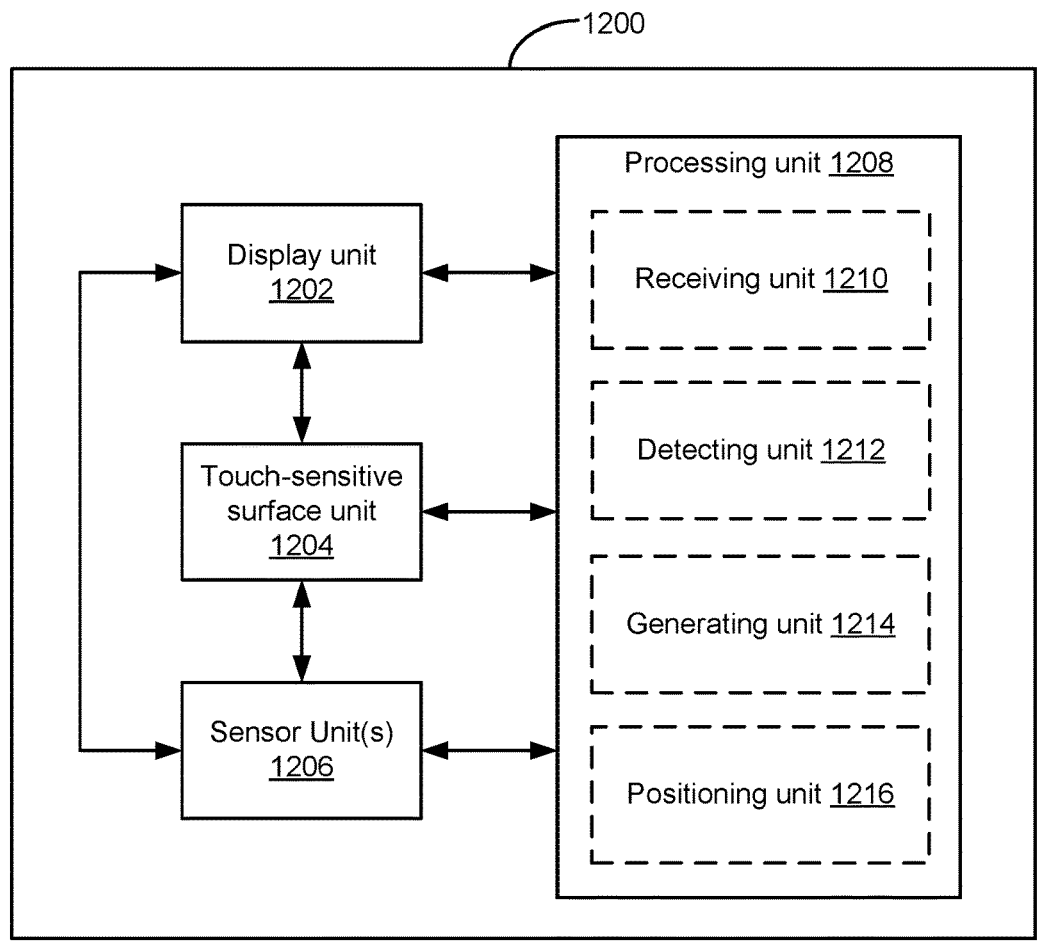
FIG. 12 is a functional block diagram of an electronic device in accordance with some embodiments.

In accordance with some embodiments, FIG. 12 shows a functional block diagram of an electronic device 1200 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

As shown in FIG. 12, an electronic device 1200 includes a display unit 1202, a touch-sensitive surface unit 1204, and a processing unit 1208 coupled with the display unit 1202 and the touch-sensitive surface unit 1204.

In some embodiments, the processing unit 1208 includes a receiving unit 1210, a detecting unit 1212, a generating unit 1214, and a positioning unit 1216.

The processing unit 1208 is configured to receive (e.g., with the receiving unit 1210) a plurality of handwritten strokes in an input area. In response to receiving the plurality of handwritten strokes, the processing unit 1208 is configured to generate (e.g., with the generating unit 1214) one or more handwritten word blocks based on the plurality of handwritten strokes, position (e.g., with the positioning unit 1216) the one or more handwritten word blocks in a content presentation area along a writing direction associated with the content presentation area, receive (e.g., with the receiving unit 1210) a first drag input that drags a first handwritten word block of the one or more handwritten word blocks horizontally in the writing direction, and in response to the first drag input, insert (e.g., with the positioning unit 1216) an amount of white space in front of the first handwritten word block along the writing direction in accordance with a distance that the first handwritten word block is dragged in the writing direction.

In some embodiments, when the first drag input is received, the content presentation area includes one or more content objects positioned after the first handwritten word block along the writing direction, and the processing unit 1208 is configured to, in response to the first drag input, reposition (e.g., with the positioning unit 1216) the one or more content objects located after the first handwritten word block in the content presentation area, such that a sequential order of the first handwritten word block and the one or more content objects located after the first handwritten word block is preserved during the dragging of the first handwritten word block and the repositioning of the one or more content objects in the content presentation area.

In some embodiments, the one or more content objects located after the first handwritten word block includes one or more of: a handwritten word block and a typed character.

In some embodiments, repositioning of the one or more content objects located after the first handwritten word block in the content presentation area includes reflowing the one or more content objects in the content presentation area such that at least one of the one or more content object is repositioned into a new line below a respective line currently occupied by the first handwritten word block.

In some embodiments, the processing unit 1208 is configured to, after inserting an amount of white space in front of the first handwritten word block along the writing direction in accordance with a distance that the first handwritten word block is dragged in the writing direction, detect (e.g., with the detecting unit 1212) a second drag input that drags the first handwritten word block horizontally in a reverse writing direction associated with the content presentation area; and in response to the second drag input, shift (e.g., the positioning unit 1216) the first handwritten word block along the reverse writing direction in accordance with a distance that the first handwritten word block is dragged along the reverse writing direction by the second drag input.

In some embodiments, the processing unit 1208 is configured to receive (e.g., with the receiving unit 1210) typed input inserting one or more typed characters at a position before the first handwritten word block in the writing direction. In response to receiving the typed input, the processing unit 1208 is configured to reflow the first handwritten word and one or more content objects located after the first handwritten word block in the writing direction in the content presentation area to accommodate the one or more typed characters.

In some embodiments, the processing unit 1208 is configured to receive a third drag input that drags the one or more typed characters horizontally in the writing direction in the content presentation area, and in response to the third drag input, insert an amount of white space in front of the one or more typed characters along the writing direction in accordance with a distance that the one or more typed characters are dragged in the writing direction.

In some embodiments, the processing unit 1208 is configured to, in response to the third drag input, reposition (e.g., with the positioning unit 1216) the first handwritten word located after the one or more typed characters in the content presentation area, such that a sequential order of the one or more typed characters and first handwritten word block located after the one or more typed characters is preserved during the dragging of the one or more typed characters and the repositioning of the first handwritten word block in the content presentation area.

In some embodiments, repositioning the first handwritten word block located after the one or more typed characters in the content presentation area includes shifting the first handwritten word block into a new line below a respective line occupied by the one or more typed characters and the first handwritten word block.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8C are, optionally, implemented by components depicted in FIGS. 1A-1B. For example, generating operation 804 and receiving operation 806 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 13:
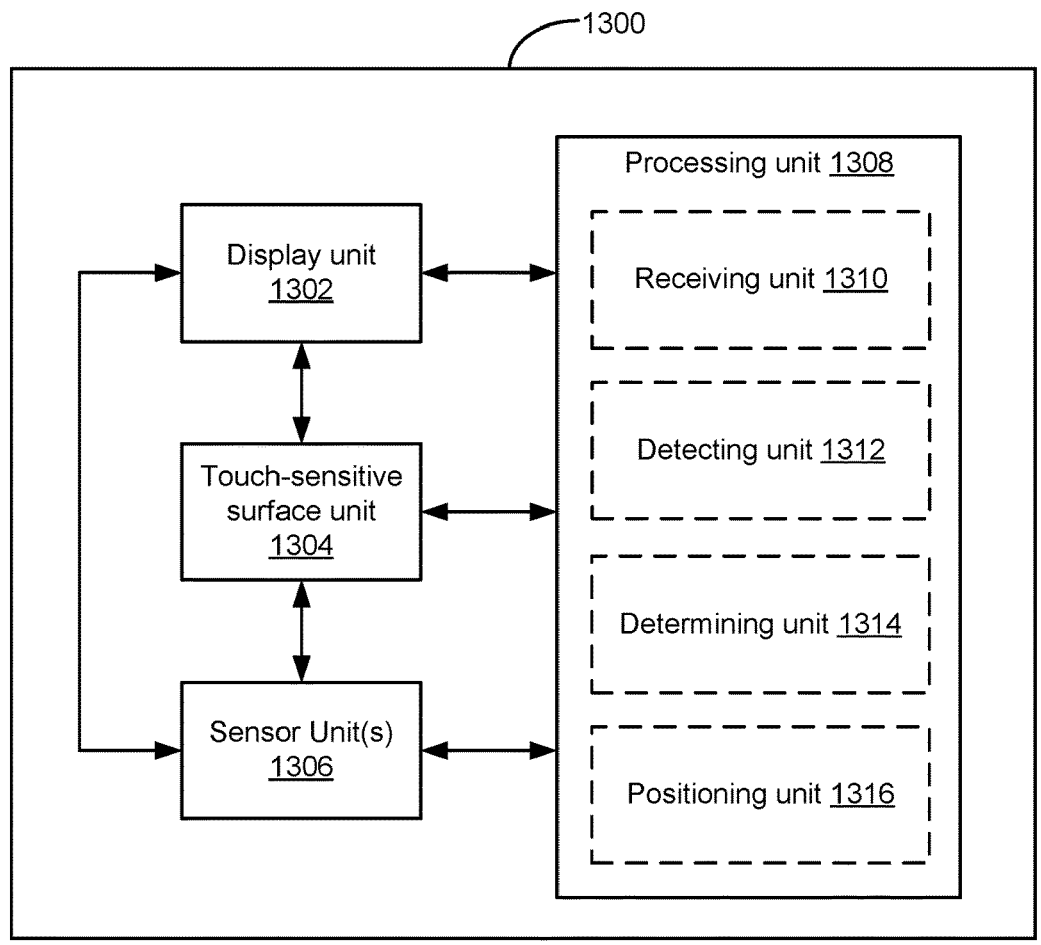
FIG. 13 is a functional block diagram of an electronic device in accordance with some embodiments.

In accordance with some embodiments, FIG. 13 shows a functional block diagram of an electronic device 1300 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 1300 includes a display unit 1302, a touch-sensitive surface unit 1304, and a processing unit 1308 coupled with the display unit 1302 and the touch-sensitive surface unit 1304.

In some embodiments, the processing unit 1308 includes a receiving unit 1310, a detecting unit 1312, a determining unit 1314, and a positioning unit 1316.

The processing unit 1308 is configured to, while the device is in a first titled state, display on the display unit 1302 the content page in a sketch mode, including to display on the display unit 1302 a zoomed view of a first portion of the content page, and to configure (e.g., with the positioning unit 1316) the zoomed view of the first portion of the content page to accept user inputs modifying content in the portion of the content page. While displaying the content page in the sketch mode, the processing unit 1308 is configured to detect (e.g., with the detecting unit 1312) that the device is tilted from the first tilted state to a second titled state distinct from the first tilted state. In response to detecting that the device is titled from the first tilted state to the second tilted state, the processing unit 1308 is configured to display on the display unit 1302 the content page in an overview mode, including zoom out to display an overview of the content page.

In some embodiments, displaying the content page in the overview mode includes displaying an input position indicator over the overview of the content page to indicate the first portion of the content page previously displayed in the zoomed view.

In some embodiments, the processing unit 1308 is configured to, while displaying the content page in the overview mode: detect (e.g., with the detecting unit 1312) a user input moving the input position indicator to a second portion of the content page that is different from the first portion of the content page. While the input position indicator is located at the second portion of the content page, the processing unit 1308 is configured to detect (e.g., with the detecting unit 1312) that the device is tilted from the second tilted state to a third tilted state. In response to detecting that the device is tilted from the second tilted state to the third tilted state, the processing unit 1308 is configured to display on the display unit 1302 the content page in the sketch mode, including to display on the display unit 1302 a zoomed view of the second portion of the content page and to configure (e.g., with the positioning unit 1316) the zoomed view of the second portion of the content page to accept user inputs modifying content in the second portion of the content page.

In some embodiments, the first tilted state and the third titled state are on the same side of the second tilted state.

In some embodiments, the second tilted state and the third tilted state are on different sides of the first tilted state.

In some embodiments, the processing unit 1308 is configured to, prior to displaying the content page in the sketch mode while the device is in the first tilted state, display on the display unit 1302 the content page in the overview mode. While displaying the content page in the overview mode, the processing unit 1308 is configured to detect (e.g. with the detecting unit 1312) a reverse pinch gesture directed to the first portion of the content page and enter the sketch mode in response to detecting the reverse pinch gesture directed to the first portion of the content page.

In some embodiments, the processing unit 1308 is configured to, after entering the sketch mode in response to detecting the reverse pinch gesture directed to the first portion of the content page, while displaying the content page in the sketch mode, detect (e.g., with the detecting unit 1312) a pinch gesture directed to the first portion of the content page and enter the overview mode in response to detecting the pinch gesture directed to the first portion of the content page.

In some embodiments, the processing unit 1308 is configured to determine (e.g., with the determining unit 1314) a threshold orientation for switching between the overview mode and the sketch mode based on an orientation of the device at a time when the reverse pinch gesture is detected.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9B are, optionally, implemented by components depicted in FIGS. 1A-1B. For example, detecting operation 910 and determining operation 920 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A non-transitory computer readable storage medium storing one or more programs, the one or more programs comprising instructions, which when executed by an electronic device with a display, one or more processors, memory, and a touch-sensitive surface, cause the electronic device to:
   while the electronic device is in a first tilted state, display a content page in a sketch mode, the displaying comprising:

displaying a zoomed view of a first portion of the content page, and configuring the zoomed view of the first portion of the content page to accept user inputs modifying content in the first portion of the content page;

while displaying the content page in the sketch mode, detect that the electronic device is tilted from the first tilted state to a second tilted state distinct from the first tilted state; and in response to detecting that the electronic device is tilted from the first tilted state to the second tilted state, display the content page in an overview mode, the displaying comprising:

zooming out to display an overview of the content page;

wherein displaying the content page in the overview mode includes displaying an input position indicator over the overview of the content page to indicate the first portion of the content page previously displayed in the zoomed view;

while displaying the content page in the overview mode:

detect on the touch-sensitive surface of the electronic device a user input moving the input position indicator to a second portion of the content page that is different from the first portion age; and while the input position indicator is located at the second portion of the content page, detect that the electronic device is tilted from the second tilted state to a third tilted state; and in response to detecting that the electronic device is tilted from the second tilted state to the third tilted state, display the content page in the sketch mode, wherein displaying the content page in the sketch mode includes:

displaying a zoomed view of the second portion of the content page; and configuring the zoomed view of the second portion of the content page to accept user inputs modifying content in the second portion of the content page.

2. The non-transitory computer readable storage medium of claim 1, wherein the first tilted state, second tilted state and third tilted state correspond to respective first, second and third orientations of the electronic device, and the first tilted state and the third tilted state are on the same side of the second tilted state.

3. The non-transitory computer readable storage medium of claim 1, wherein the first tilted state, second tilted state and third tilted state correspond to respective first, second and third orientations of the electronic device, and the second tilted state and the third tilted state are on different sides of the first tilted state.

4. The non-transitory computer readable storage medium of claim 1, wherein the one or more programs include instructions, which when executed by the electronic device cause the electronic device to:

prior to displaying the content page in the sketch mode while the electronic device is in the first tilted state:

display the content page in the overview mode; and while displaying the content page in the overview mode, detect on the touch-sensitive surface of the electronic device a reverse pinch gesture directed to the first portion of the content page; and enter the sketch mode in response to detecting the reverse pinch gesture directed to the first portion of the content page.

5. The non-transitory computer readable storage medium of claim 4, wherein the one or more programs include instructions, which when executed by the electronic device, cause the electronic device to:

after entering the sketch mode in response to detecting the reverse pinch gesture directed to the first portion of the content page:

while displaying the content page in the sketch mode, detect a pinch gesture directed to the first portion of the content page; and enter the overview mode in response to detecting the pinch gesture directed to the first portion of the content page.

6. The non-transitory computer readable storage medium of claim 4, wherein the one or more programs include instructions, which when executed by the electronic device, cause the electronic device to:

determine a threshold orientation for switching between the overview mode and the sketch mode based on an orientation of the electronic device at a time when the reverse pinch gesture is detected.

7. An electronic device, comprising:

a display;

a touch-sensitive surface;

one or more processors;

memory; and one or more programs, wherein the one or more programs are stored in the memory and configured to be executed by the one or more processors, the one or more programs including instructions for:

while the electronic device is in a first tilted state, display a content page in a sketch mode, the displaying comprising:

displaying a zoomed view of a first portion of the content page, and configuring the zoomed view of the first portion of the content page to accept user inputs modifying content in the first portion of the content page;

while displaying the content page in the sketch mode, detect that the electronic device is tilted from the first tilted state to a second tilted state distinct from the first tilted state; and in response to detecting that the electronic device is tilted from the first tilted state to the second tilted state, display the content page in an overview mode, the displaying comprising:

zooming out to display an overview of the content page;

wherein displaying the content page in the overview mode includes displaying an input position indicator over the overview of the content page to indicate the first portion of the content page previously displayed in the zoomed view;

while displaying the content page in the overview mode:

detecting on the touch-sensitive surface of the electronic device a user input moving the input position indicator to a second portion of the content page that is different from the first portion of the content page; and while the input position indicator is located at the second portion of the content page, detecting that the electronic device is tilted from the second tilted state to a third tilted state; and in response to detecting that the electronic device is tilted from the second tilted state to the third tilted state, displaying the content page in the sketch mode, wherein displaying the content page in the sketch mode includes:

displaying a zoomed view of the second portion of the content page; and configuring the zoomed view of the second portion of the content page to accept user inputs modifying content in the second portion of the content page.

8. The electronic device of claim 7, wherein the first tilted state, second tilted state and third tilted state correspond to respective first, second and third orientations of the electronic device, and the first tilted state and the third tilted state are on the same side of the second tilted state.

9. The electronic device of claim 7, wherein the first tilted state, second tilted state and third tilted state correspond to respective first, second and third orientations of the electronic device, and the second tilted state and the third tilted state are on different sides of the first tilted state.

10. The electronic device of claim 7, wherein the one or more programs include instructions for:

prior to displaying the content page in the sketch mode while the electronic device is in the first tilted state:
displaying the content page in the overview mode; and
while displaying the content page in the overview mode, detecting on the touch-sensitive surface of the electronic device a reverse pinch gesture directed to the first portion of the content page; and
entering the sketch mode in response to detecting the reverse pinch gesture directed to the first portion of the content page.

11. The electronic device of claim 10, wherein the one or more programs include instructions for:

after entering the sketch mode in response to detecting the reverse pinch gesture directed to the first portion of the content page:
while displaying the content page in the sketch mode, detecting a pinch gesture directed to the first portion of the content page; and
entering the overview mode in response to detecting the pinch gesture directed to the first portion of the content page.

12. The electronic device of claim 10, wherein the one or more programs include instructions for:

determining a threshold orientation for switching between the overview mode and the sketch mode based on an orientation of the electronic device at a time when the reverse pinch gesture is detected.

13. A method, comprising:

at an electronic device having one or more processors, memory, and a display:
while the electronic device is in a first tilted state, displaying a content page in a sketch mode, comprising:
displaying a zoomed view of a first portion of the content page, and
configuring the zoomed view of the first portion of the content page to accept user inputs modifying content in the first portion of the content page;
while displaying the content page in the sketch mode, detecting that the electronic device is tilted from the first tilted state to a second tilted state distinct from the first tilted state; and
in response to detecting that the electronic device is tilted from the first tilted state to the second tilted state, displaying the content page in an overview mode, comprising:
zooming out to display an overview of the content page;
wherein displaying the content page in the overview mode includes displaying an input position indicator over the overview of the content page to indicate the first portion of the content page previously displayed in the zoomed view;
while displaying the content page in the overview mode:
detecting on a touch-sensitive surface of the electronic device a user input moving the input position indicator to a second portion of the content page that is different from the first portion of the content and
while the input position indicator is located at the second portion of the content page, detecting that the electronic device is tilted from the second tilted state to a third tilted state; and
in response to detecting that the electronic device is tilted from the second tilted state to the third tilted state, displaying the content page in the sketch mode, wherein displaying the content page in the sketch mode includes:
displaying a zoomed view of the second portion of the content page; and
configuring the zoomed view of the second portion of the content page to accept user inputs modifying content in the second portion of the content page.

14. The method of claim 13, wherein the first tilted state, second tilted state and third tilted state correspond to respective first, second and third orientations of the electronic device, and the first tilted state and the third tilted state are on the same side of the second tilted state.

15. The method of claim 13, wherein the first tilted state, second tilted state and third tilted state correspond to respective first, second and third orientations of the electronic device, and the second tilted state and the third tilted state are on different sides of the first tilted state.

16. The method of claim 13, further comprising:

prior to displaying the content page in the sketch mode while the electronic device is in the first tilted state:
displaying the content page in the overview mode; and
while displaying the content page in the overview mode, detecting on the touch-sensitive surface of the electronic device a reverse pinch gesture directed to the first portion of the content page; and
entering the sketch mode in response to detecting the reverse pinch gesture directed to the first portion of the content page.

17. The method of claim 16, further comprising:

after entering the sketch mode in response to detecting the reverse pinch gesture directed to the first portion of the content page:
while displaying the content page in the sketch mode, detecting a pinch gesture directed to the first portion of the content page; and
entering the overview mode in response to detecting the pinch gesture directed to the first portion of the content page.

18. The method of claim 16, further comprising:

determining a threshold orientation for switching between the overview mode and the sketch mode based on an orientation of the electronic device at a time when the reverse pinch gesture is detected.

* * * * *